(12) United States Patent
Munshi et al.

(10) Patent No.: US 9,781,083 B2
(45) Date of Patent: *Oct. 3, 2017

(54) SYSTEM AND METHOD OF EFFICIENTLY GENERATING AND TRANSMITTING ENCRYPTED DOCUMENTS

(71) Applicant: Amaani, LLC, Sugarland, TX (US)

(72) Inventors: Amaani Munshi, Sugarland, TX (US); Imtiaz Munshi, Sugarland, TX (US)

(73) Assignee: Amaani, LLC, Sugar Land, TX (US)

( * ) Notice: Subject to any disclaimer, the term of this patent is extended or adjusted under 35 U.S.C. 154(b) by 13 days.

This patent is subject to a terminal disclaimer.

(21) Appl. No.: 15/074,988

(22) Filed: Mar. 18, 2016

(65) Prior Publication Data

US 2016/0308840 A1 Oct. 20, 2016

Related U.S. Application Data

(63) Continuation-in-part of application No. 14/327,413, filed on Jul. 9, 2014, now Pat. No. 9,596,219, which is a continuation of application No. 13/088,414, filed on Apr. 17, 2011, now Pat. No. 8,806,190.

(60) Provisional application No. 62/266,031, filed on Dec. 11, 2015, provisional application No. 62/135,120, filed on Mar. 18, 2015, provisional application No. 61/325,792, filed on Apr. 19, 2010.

(51) Int. Cl.
| | |
|---|---|
| *H04L 29/06* | (2006.01) |
| *H04L 12/58* | (2006.01) |
| *H04W 4/12* | (2009.01) |
| *H04L 9/32* | (2006.01) |

(52) U.S. Cl.
CPC ........ *H04L 63/0428* (2013.01); *H04L 9/3226* (2013.01); *H04L 51/066* (2013.01); *H04L 51/08* (2013.01); *H04L 63/083* (2013.01); *H04W 4/12* (2013.01); *H04L 63/0435* (2013.01); *H04L 63/205* (2013.01)

(58) Field of Classification Search
CPC . H04L 63/0428; H04L 63/0435; H04L 63/04; H04L 9/3226; H04L 51/066; H04L 63/083; H04L 63/205; H04L 51/08; H04W 4/12

See application file for complete search history.

(56) References Cited

U.S. PATENT DOCUMENTS

| | | | |
|---|---|---|---|
| 6,751,670 B1 * | 6/2004 | Patterson | H04L 63/0428 705/51 |
| 2005/0090282 A1 * | 4/2005 | Murayama | H04M 1/72552 455/550.1 |

(Continued)

*Primary Examiner* — Robert Leung
*Assistant Examiner* — Ayoub Alata
(74) *Attorney, Agent, or Firm* — Novel IP

(57) ABSTRACT

The present specification discloses an improved method of encrypting a file and distributing the encrypted file over a network from a user computer to a remote computer, which includes providing an interface to a file encryption application to a user; receiving an input designating an encryption option from among a plurality of encryption options; based upon said input designating an encryption option, and based upon a format of said file, causing a separate application specific to said format to encrypt said at least one file, wherein said encrypted file is adapted to be decrypted using a passcode and wherein said passcode is transmitted to the user via at least one message type.

67 Claims, 38 Drawing Sheets

(56) References Cited

U.S. PATENT DOCUMENTS

| | | | |
|---|---|---|---|
| 2005/0144162 A1* | 6/2005 | Liang | G06F 17/30109 |
| 2008/0216023 A1* | 9/2008 | Berglund | G06F 17/30887 |
| | | | 715/855 |
| 2008/0282079 A1* | 11/2008 | Yaghmour | H04L 9/00 |
| | | | 713/150 |
| 2009/0064297 A1* | 3/2009 | Selgas | G06F 21/335 |
| | | | 726/6 |
| 2009/0177751 A1* | 7/2009 | Ito | G06Q 10/107 |
| | | | 709/206 |
| 2010/0199338 A1* | 8/2010 | Craddock | G06F 21/31 |
| | | | 726/7 |
| 2012/0036358 A1* | 2/2012 | Johnson | G06F 21/62 |
| | | | 713/168 |

* cited by examiner

Basic Settings for AutoPW
Listing of users who share the same Shared Password List Shared Password List | Private Password List | Security | Email Message | Cloud Message | Email Setting | Cloud Settings | General Settings

Security
Select user to assign rights. Click on save when complete.

⊕ Add New    × Delete

| | | Full Name * | Email Address * | Can Update Shared PW List | Can Have Admin Rights |
|---|---|---|---|---|---|
| ▲ | ☐ | Imtiaz Munshi | imunshi@munshicpa.com | ☑ | ☑ |

472a — Full Name
472b — Can Update Shared PW List
472c — Can Have Admin Rights
472d — Save
472e — Close
472f — Cancel
472 — AutoPW Settings
466

FIG. 4Q

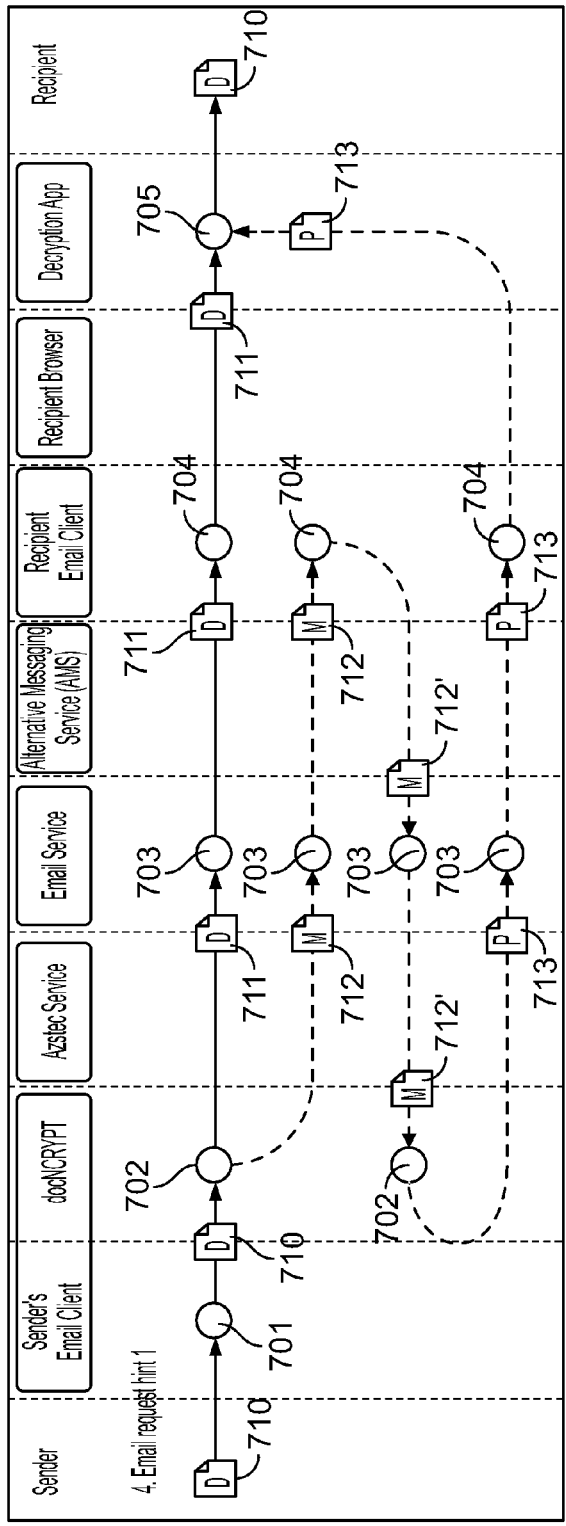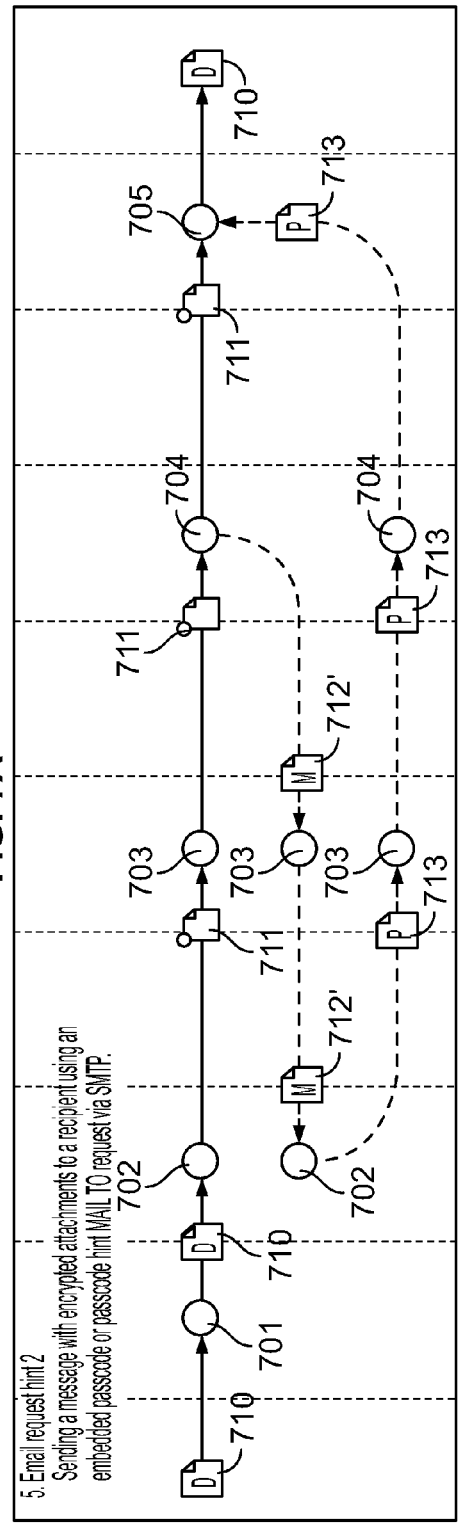
FIG. 7A
FIG. 7B

SYSTEM AND METHOD OF EFFICIENTLY GENERATING AND TRANSMITTING ENCRYPTED DOCUMENTS

CROSS-REFERENCE

The present application relies on U.S. Patent Provisional Application No. 62/135,120, entitled "Method of Transmission of Encrypted Documents" and filed on Mar. 18, 2015, for priority. The present specification also relies on U.S. Patent Provisional Application No. 62/266,031, entitled "Method of Transmission of Encrypted Documents" and filed on Dec. 11, 2015, for priority.

In addition, the present application is a continuation-in-part of U.S. patent application Ser. No. 14/327,413 (U.S. Patent Publication No. 20150052355), entitled "Method of Transmission of Encrypted Documents From An Email Application" and filed on Feb. 19, 2015, which, in turn, is a continuation of U.S. Pat. No. 8,806,190, of the same title, and filed on Apr. 17, 2011, which further relies upon U.S. Provisional Application No. 61/325,792, entitled "System and Method for Enabling an Improved Workflow for Transmission of Encrypted Documents from an Email Application", and filed on Apr. 19, 2010, for priority.

All of the above-mentioned applications are herein incorporated by reference in their entirety.

FIELD

The present specification relates to enabling improved methods and systems for emailing encrypted attachments or uniform resource identifiers associated therewith. More specifically, embodiments of the present specification are designed to help service professionals comply with certain privacy requirements, or best practices standards, with respect to client communications.

BACKGROUND

Conventionally, attachments, such as Microsoft Word®, Microsoft Powerpoint®, Microsoft Excel®, text, images, spreadsheets, presentations, or other documents, are securely transmitted via an email application, such as Microsoft Outlook®, using various methods.

One method relies on an encryption program integrated with the email application itself. Conventionally, a user initiates an email program, creates an email, associates an attachment with the email, and causes the email program to transmit the email, with the associated attachment, to an intended recipient. Prior to transmission, the encryption program integrated with the email application encrypts the email, along with the attachment, and sends the encrypted email to the intended recipient. To access the encrypted email, the intended recipient must have a key, associated with the email sender that enables the decryption of the encrypted email. This method has several disadvantages. First, although it permits a user to encrypt an email transmission efficiently, it requires the recipient to have the same encryption program as that of the sender integrated with the recipient's email application. Second, the encryption of the third party or integrated encryption program may be less effective than using the encryption feature of the application which the user used to originally create the attachment. Third, once the email is decrypted, the attachment can be saved and is no longer subject to encryption, leaving the attachment unprotected at the recipient's computer.

In another available encryption method an attachment is converted from its original format into an encrypted PDF file before transmission. However, this prevents a recipient from directly editing the data contained in the attachment, and as a result, also inhibits efficient collaboration between users.

In another available encryption approach, an attachment is converted to an encrypted zip file or is enclosed within an encrypted PDF envelope. The user then prepares and sends a subsequent email containing the passcode to open the encrypted zip file or PDF envelope to the intended recipient. However, once the zip file or PDF envelope is decrypted, the attachment can be saved and is no longer subject to encryption, leaving the attachment unprotected at the recipient's computer.

Another method uses the encryption feature of the application which the user used to originally create the attachment, but is far more time consuming. Here, a user first encrypts the attachment using the originating application and assigns the encrypted attachment a passcode. The passcode, if pre-stored, has to be separately retrieved from yet another application. The user then opens the email program, creates an email, associates an encrypted attachment with the email, and causes the email program to transmit the email, with the associated encrypted attachment, to an intended recipient. The user then prepares and sends a subsequent email to the intended recipient which contains an indication of the passcode to open the encrypted attachment to the intended recipient. This method, while addressing some of the deficiencies cited above, is cumbersome and requires the user to separately encrypt an attachment in one application and compose multiple emails. In addition, this process is manual and is thus prone to data entry errors (i.e. possibility of a mistyped passcode in a subsequent e-mail), "lost" or "forgotten" passcode errors, in which case even the sender may not be able to open the encrypted document.

What is needed is an encryption system that a) enables a user to send encrypted attachments rapidly and efficiently, b) uses the built-in encryption feature of applications used to create attachments, and also retains the original format of the attachments, c) does not require a user to manually prepare multiple emails, d) does not require the recipient to have the specific encryption program utilized by the sender, and e) eliminates the possibility of "lost" or "forgotten" passcodes rendering the original document inaccessible.

SUMMARY

The present specification provides a method for transmission of encrypted email attachments by using an email application.

In some embodiments, the present specification discloses a method of encrypting a file and distributing the encrypted file over a network from a user computer to a remote computer, the method comprising: providing an interface to a file encryption application to a user for access on the user computer; receiving, from the user through said interface to the file encryption application over said network, an input designating an encryption option from among a plurality of encryption options; based upon said input designating an encryption option, and based upon a format of said file, causing a separate application specific to said format to encrypt said at least one file, wherein said encrypted file is adapted to be decrypted using a passcode; generating a first email, for transmission to a recipient email address, comprising a uniform resource identifier and said at least one encrypted file attached thereto, wherein said uniform resource identifier is configured such that, upon a user of the remote computer activating said uniform resource identifier, said remote computer is adapted to generate a second email requesting an indication of the passcode associated with said at least one encrypted file to be transmitted to a phone number address stored in association with said recipient email address in a memory; transmitting the first email with said at least one encrypted file to said recipient email address over said network; after a period of time, receiving, from the recipient email address over the network, said second email, wherein the second email is generated as a result of said user of the remote computer activating the uniform resource identifier in the first email; and based upon said receipt of said second email, automatically transmitting a message to said phone number address, wherein the message contains said indication of said passcode.

Optionally, said interface to a file encryption application is provided to a user by enabling said user to download the file encryption application for installation on the user computer.

Optionally, said interface to a file encryption application is provided to a user by enabling said user to access, via the user computer, the file encryption application over the network.

Optionally, the file encryption application is invoked by activating a short-cut icon to said file encryption application located on a desktop of the user's computer.

Optionally, said separate application specific to said format is stored in a same physical storage device as said file encryption application.

Optionally, said separate application specific to said format is stored in a different physical storage device as said file encryption application.

Optionally, said period of time is at least five minutes.

Optionally, said file is encrypted by opening said at least one file in the separate application specific to the format of said at least one file and accepting an input from the user, from within the separate application, invoking an encryption of the file.

Optionally, the first email is generated using an email application that is hosted by a server separate and remote from the remote user computer.

Optionally, the first email is generated using an email application that is stored within, and executed by, the remote user computer.

Optionally, the uniform resource identifier is configured to have an expiration time period after which activating the uniform resource identifier will not cause the message with the indication of the passcode to be sent to the phone number address.

Optionally, the uniform resource identifier is configured to have no expiration time period and will remain functional to cause the message with the indication of the passcode to be sent to the phone number address for an unlimited time period.

Optionally, the uniform resource identifier is configured to have a predefined number of times that it can be used, after which activating the uniform resource identifier will not cause the message with the indication of the passcode to be sent to the phone number address.

Optionally, the uniform resource identifier is configured to be forward to a third email address through which activating the uniform resource identifier will still cause the message with the indication of the passcode to be sent to the phone number address.

Optionally, the uniform resource identifier is configured to only be useable by the recipient email address and not another email address.

Optionally, said indication of said passcode includes a uniform resource identifier to a passcode file associated with an Internet based file hosting service, wherein the passcode file includes said passcode or a hint associated with said passcode.

Optionally, said indication of said passcode includes a uniform resource identifier to a webpage that includes said passcode or a hint associated with said passcode.

Optionally, said file and said separate application are located remote from the user computer and wherein said separate application encrypts said file by opening said file over said network and applying an encryption native to said separate application.

Optionally, said file is located remote from the user computer, wherein said separate application is stored local to, and executed by, the user computer, and wherein said separate application encrypts said file by opening said file over said network and applying an encryption native to said separate application.

In some embodiments, the present specification discloses a method of encrypting a file and distributing the encrypted file over a network from a user computer to a remote computer, the method comprising: providing an interface to a file encryption application to a user for access on the user computer; receiving, from the user through said interface to the file encryption application over said network, an input designating an encryption option from among a plurality of encryption options; receiving, from the user through said interface to the file encryption application over said network, an input associating a phone number with a recipient email address and storing said phone number, recipient email address, and association in a memory; based upon said input designating an encryption option, and based upon a format of said file, causing a separate application specific to said format to encrypt said at least one file, wherein said encrypted file is adapted to be decrypted using a passcode; generating a first email, for transmission to a recipient email address, comprising a uniform resource identifier, wherein said uniform resource identifier is configured such that, upon a user of the remote computer activating said uniform resource identifier, said remote computer is adapted to generate a first message requesting an indication of the passcode associated with said at least one encrypted file to be transmitted to said phone number stored in association with said recipient email address; transmitting the first email with said at least one encrypted file to said recipient email address over said network; after a period of time, receiving, from the remote computer over the network, said first message, wherein the first message is generated as a result of said user of the remote computer activating the uniform resource identifier in the first email; and based upon said receipt of said second email, automatically transmitting a second message to said phone number address, wherein the second message contains said indication of said passcode.

Optionally, said at least one encrypted file is attached to the first email.

Optionally, after receipt of the second email, a third email is transmitted to the recipient email address, said third email having said at least one encrypted file attached thereto.

Optionally, the second message contains a link to the encrypted file.

In some embodiments, the present specification discloses a method of encrypting a file and distributing the encrypted file over a network from a user computer to a remote computer, the method comprising: providing an interface to a file encryption application to a user for access on the user computer; receiving, from the user through said interface to the file encryption application over said network, an input designating an encryption option from among a plurality of encryption options; based upon said input designating an encryption option, and based upon a format of said file, causing a separate application specific to said format to encrypt said at least one file, wherein said encrypted file is adapted to be decrypted using a passcode; generating a first email, for transmission to a recipient email address, comprising a uniform resource identifier, wherein said uniform resource identifier is configured such that, upon a user of the remote computer activating said uniform resource identifier, said remote computer is adapted to generate a first message requesting an indication of the passcode associated with said at least one encrypted file to be transmitted to said recipient email address; transmitting the first email with said at least one encrypted file to said recipient email address over said network; after a period of time, receiving, from the remote computer over the network, said first message, wherein the first message is generated as a result of said user of the remote computer activating the uniform resource identifier in the first email; and based upon said receipt of said first message, automatically transmitting a second email to said recipient email address, wherein the second email contains said indication of said passcode.

In some embodiments, the present specification discloses a method of encrypting a file and distributing the encrypted file over a network from a user computer to a remote computer, the method comprising: providing an interface to a file encryption application to a user for access on the user computer; receiving, from the user through said interface to the file encryption application over said network, an input designating an encryption option from among a plurality of encryption options; receiving, from the user through said interface to the file encryption application over said network, an input associating a second email address with a recipient email address and storing said second email address, recipient email address, and association in a memory; based upon said input designating an encryption option, and based upon a format of said file, causing a separate application specific to said format to encrypt said at least one file, wherein said encrypted file is adapted to be decrypted using a passcode; generating a first email, for transmission to a recipient email address, comprising a uniform resource identifier, wherein said uniform resource identifier is configured such that, upon a user of the remote computer activating said uniform resource identifier, said remote computer is adapted to generate a first message requesting an indication of the passcode associated with said at least one encrypted file to be transmitted to said second email address stored in association with said recipient email address; transmitting the first email with said at least one encrypted file to said recipient email address over said network; after a period of time, receiving, from the remote computer over the network, said first message, wherein the first message is generated as a result of said user of the remote computer activating the uniform resource identifier in the first email; and based upon said receipt of said first message, automatically transmitting a second email to said second email address, wherein the second email contains said indication of said passcode.

In one embodiment, the present specification provides a method for transmitting at least one encrypted file as an email attachment using an email application invoked by an encryption application, the method comprising the steps of generating an interface that accepts, from a user, an input indicating at least one file to which an encryption process should be applied; generating an interface that accepts, from the user, an input designating an encryption option from among a plurality of encryption options; generating an interface that accepts, from the user, an input designating a file save option from among a plurality of file save options; accepting an input from the user designating that the at least one encrypted file should be transmitted as an attachment using the email application; based upon the input designating an encryption option, and based upon the format of the file, causing a separate application specific to the file format to encrypt the at least one file; based upon the input designating a file save option, causing an application to save the at least one file; based upon the input designating transmission of the at least one encrypted file using the email application, automatically generating a first email using the email application; attaching the at least one encrypted file to the first email; transmitting the first email with an editable standard message body and the at least one encrypted file attached thereto to at least one recipient email address using the email application, wherein the first email includes a uniform resource identifier to request an indication of a passcode associated with the at least one encrypted file; receiving, by the encryption application, a first message from said at least one recipient of the first email message, wherein said first message is generated as a result of said at least one recipient activating a uniquely encoded uniform resource identifier or by invoking an application specified in the first email; and based upon receipt of said first message, automatically transmitting a second message to said at least one recipient, wherein the second message contains said indication of said passcode.

In one embodiment, the first message is an automatically generated second email from the at least one recipient email address.

In various embodiments, the second message contains the indication of the passcode in any one of the following formats: plain text, HTML, proprietary format that is visible only on recipient's authenticated device if recipient's device has the associated proprietary software application, "Captcha" type of text, PDF file, text file, Word processing file (e.g. MS WORD), Web Page, Picture file, Audio file, SMS Text Message, "Snapchat" type of SMS Text Message (text disappears after a certain duration).

Optionally, the plurality of encryption options comprises an encryption option prompting the user to selectively protect one of a plurality of selected files. Optionally, the plurality of encryption options comprises an encryption option prompting the user to establish a specific passcode for encrypting and/or decrypting the designated file. Optionally, the plurality of encryption options comprises an encryption option prompting the user to select a predefined common passcode for encrypting and/or decrypting the designated file where such common passcode is generally used on a recurring basis to encrypt and/or decrypt files. Optionally, the plurality of encryption options comprises an encryption option prompting the user to set a predefined number of digits of the user's social security number as a passcode for encrypting and/or decrypting the designated file. Optionally, the plurality of encryption options comprise an encryption option prompting the user to set a passcode pre-assigned to a corresponding recipient address, wherein the passcode is adapted to be used for encrypting and/or decrypting the designated file. Optionally, the plurality of encryption options comprises an encryption option prompting the user to set a randomly generated passcode for encrypting and/or decrypting the designated file.

Optionally, the user generates a list comprising a plurality of passcodes and recipient addresses, wherein at least one passcode is assigned to each recipient address and wherein the list is used to select a passcode for encrypting and/or decrypting the designated file.

Optionally, the user is presented with an option of storing the encrypted designated file at a selected location.

Optionally, the step of attaching the encrypted attachment with the first, prepared email comprises adding a standard text to the email, the standard text conveying an encrypted status of the email attachment to a recipient.

Optionally, the second message is in the form of text including the passcode or a hint associated with the passcode.

Optionally, the second message includes a uniform resource identifier to a file associated with an Internet based file hosting service, wherein the file includes the passcode or a hint associated with the passcode.

Optionally, the second message includes a uniform resource identifier to a webpage that includes the passcode or a hint associated with the passcode.

Optionally, the uniquely encoded uniform resource identifier to request the indication of the passcode has at least one of the following characteristics: a) the uniform resource identifier has an expiration time period after which the uniform resource identifier is non-functional, b) the uniform resource identifier has no expiration time period and will remain functional for an unlimited time period, c) the uniform resource identifier has a limit on the number of times it can be used after which the uniform resource identifier is non-functional, d) the uniform resource identifier has no limitation with respect to the number of times it can be used, e) the uniform resource identifier can be forwarded by the at least one recipient to another email address or mobile phone through which the uniform resource identifier remains activated, and f) the uniform resource identifier is only activated from the at least one recipient's email or mobile phone.

In another embodiment, the present specification provides a method for using an email application to transmit a uniform resource identifier to at least one encrypted file associated with an Internet based file hosting service, invoked by an encryption application, the method comprising the steps of generating an interface that accepts, from a user, an input indicating at least one file to which an encryption process should be applied; generating an interface that accepts, from the user, an input designating an encryption option from among a plurality of encryption options; generating an interface that accepts, from the user, an input designating a file save option from among a plurality of file save options; based upon the input designating an encryption option, and based upon the format of the file, causing a separate application specific to the file format to encrypt the at least one file; based upon the input designating a file save option, causing an application to save the at least one file; generating an interface that accepts, from the user, an input designating a location within the user's Internet based file hosting service wherein the at least one encrypted file should be saved; generating an interface that accepts, from the user, an input designating a location within the user's Internet based file hosting service wherein the at least one encrypted file should be saved and wherein the uniform resource identifier associated with the at least one file should be transmitted using the email application; based upon the input, designating a location within a user's internet based file hosting service, causing an application to save the at least one file in the location; accepting an input from the user designating that the uniform resource identifier associated with the at least one encrypted file should be transmitted using the email application; based upon the input designating transmission of the uniform resource identifier, automatically generating a first email using the email application; including the uniform resource identifier in the first email; transmitting the first email with an editable standard message body and the uniform resource identifier appended therein to at least one recipient email address using the email application, wherein the first email also includes a uniform resource identifier to request an indication of a passcode associated with the at least one encrypted file; receiving, by the encryption application, a response message from said at least one recipient of the first email message, wherein said response message is generated as a result of said at least one recipient activating a uniquely encoded uniform resource identifier or by invoking an application specified in the first email; and based upon receipt of said response message, automatically transmitting a Short Message Service (SMS) message to a mobile telephone number of said at least one recipient, wherein the SMS message contains said indication of said passcode In one embodiment, the response message is an automatically generated second email from the at least one recipient email address.

Optionally, the encryption application is invoked by double-clicking a short-cut icon to said encryption application on a desktop of the user's computer.

Optionally, the encryption application is invoked by enabling the user to select said at least one file and generate an interface displaying an option to encrypt said at least one selected file using the encryption application and accepting an input designating selection of the option by the user.

The interface displaying an option to encrypt said at least one selected file using the encryption application may be generated, by the user, by right-clicking said at least one selected file.

Optionally, the encryption application is invoked by opening said at least one file in a native application associated with said at least one file and accepting an input from the user, from within the native application, designating invocation of said encryption application.

Optionally, the plurality of encryption options comprises an encryption option prompting the user to set a predefined number of digits of the user's social security number as a common passcode for encrypting and/or decrypting said at least one file.

Optionally, the plurality of encryption options comprises an encryption option prompting the user to set a predefined number of characters as a common passcode known to the user or group of users for encrypting and/or decrypting said at least one file.

Optionally, the plurality of encryption options comprises an encryption option prompting the user to designate a passcode from a plurality of passcodes shared between a group of users for encrypting and/or decrypting said at least one file.

Optionally, the plurality of encryption options comprises an encryption option prompting the user to designate a passcode from a plurality of private passcodes for encrypting and/or decrypting said at least one file.

Optionally, the plurality of encryption options comprises an encryption option prompting the user to establish a specific custom passcode and hint associated with such passcode for encrypting and/or decrypting said at least one file. The method may further comprise saving the custom passcode and associated hint, wherein the plurality of save options comprise a save option prompting the user to save the passcode in a list of shared passcodes shared between a group of users or alternatively in a list of private passcodes not shared by a group of users.

Optionally, the plurality of encryption options comprises an encryption option prompting the user to set a randomly generated passcode for encrypting and/or decrypting said at least one file.

Optionally, the plurality of file save options comprises a file save option prompting the user to save an encrypted copy of the at least one file in an existing folder of the at least one file.

Optionally, while saving the encrypted copy of the at least one file, a pre-established file name of said at least one file may be modified to add a predefined suffix, metadata, or file identifier.

Optionally, the plurality of file save options comprises a file save option prompting the user to save an encrypted copy of the at least one file in a location designated by the user on his computer.

The method may further comprise generating an interface for configuring, by the user, a plurality of details for registering and invoking the email application subscribed to by the user.

The method may further comprise generating an interface for configuring, by the user, a plurality of details for registering and invoking the Internet file hosting service subscribed to by the user.

Optionally, the first email application is a Webmail registered with the encryption application by the user.

Optionally, transmitting the first email comprises invoking the user's email application registered by the encryption application, generating an email interface, attaching said at least one link/uniform resource identifier associated with the encrypted file that is saved in a folder on the user's Internet file hosting service, prompting the user to add one or more recipient addresses, adding an editable standard text conveying the encrypted status of the attachment associated with the said link(s)/uniform resource identifier(s) to a recipient, and sending the said first email using said email application registered by the encryption application.

Optionally, the folder wherein said at least one encrypted file should be saved is associated with the Internet based file hosting service. Optionally, the folders on the user's computer associated with the Internet based filed hosting service automatically synchronizes with the associated Internet based file hosting service.

The method may further comprise generating an interface for configuring a location of the folder associated with the Internet based file hosting service.

The method may further comprise generating an interface for configuring a default location, on the user's computer, for saving said at least one encrypted file.

The method may further comprise generating an interface for establishing whether a date and time stamp should be appended to a file name of said at least one encrypted file.

Optionally, the SMS message is a text including the passcode or a hint associated with the passcode. Optionally, the SMS message includes a uniform resource identifier to a file associated with an Internet based file hosting service, wherein the file includes the passcode or a hint associated with the passcode. Optionally, the SMS message includes a uniform resource identifier to a webpage that includes the passcode or a hint associated with the passcode.

Optionally, the uniquely encoded uniform resource identifier to request the indication of the passcode has at least one of the following characteristics: a) the uniform resource identifier has an expiration time period after which the uniform resource identifier is non-functional, b) the uniform resource identifier has no expiration time period and will remain functional for an unlimited time period, c) the uniform resource identifier has a limit on the number of times it can be used after which the uniform resource identifier is non-functional, d) the uniform resource identifier has no limitation with respect to the number of times it can be used, e) the uniform resource identifier can be forwarded by the at least one recipient to another email address or mobile phone through which the uniform resource identifier remains activated, and f) the uniform resource identifier is only activated from the at least one recipient's email or mobile phone.

The aforementioned and other embodiments of the present shall be described in greater depth in the drawings and detailed description provided below.

BRIEF DESCRIPTION OF THE DRAWINGS

These and other features and advantages of the present invention will be appreciated, as they become better understood by reference to the following detailed description when considered in connection with the accompanying drawings, wherein:

FIG. 4Q illustrates an embodiment of an interface of registering/configuring a plurality of users and associated rights;

DETAILED DESCRIPTION

Figure 1A:
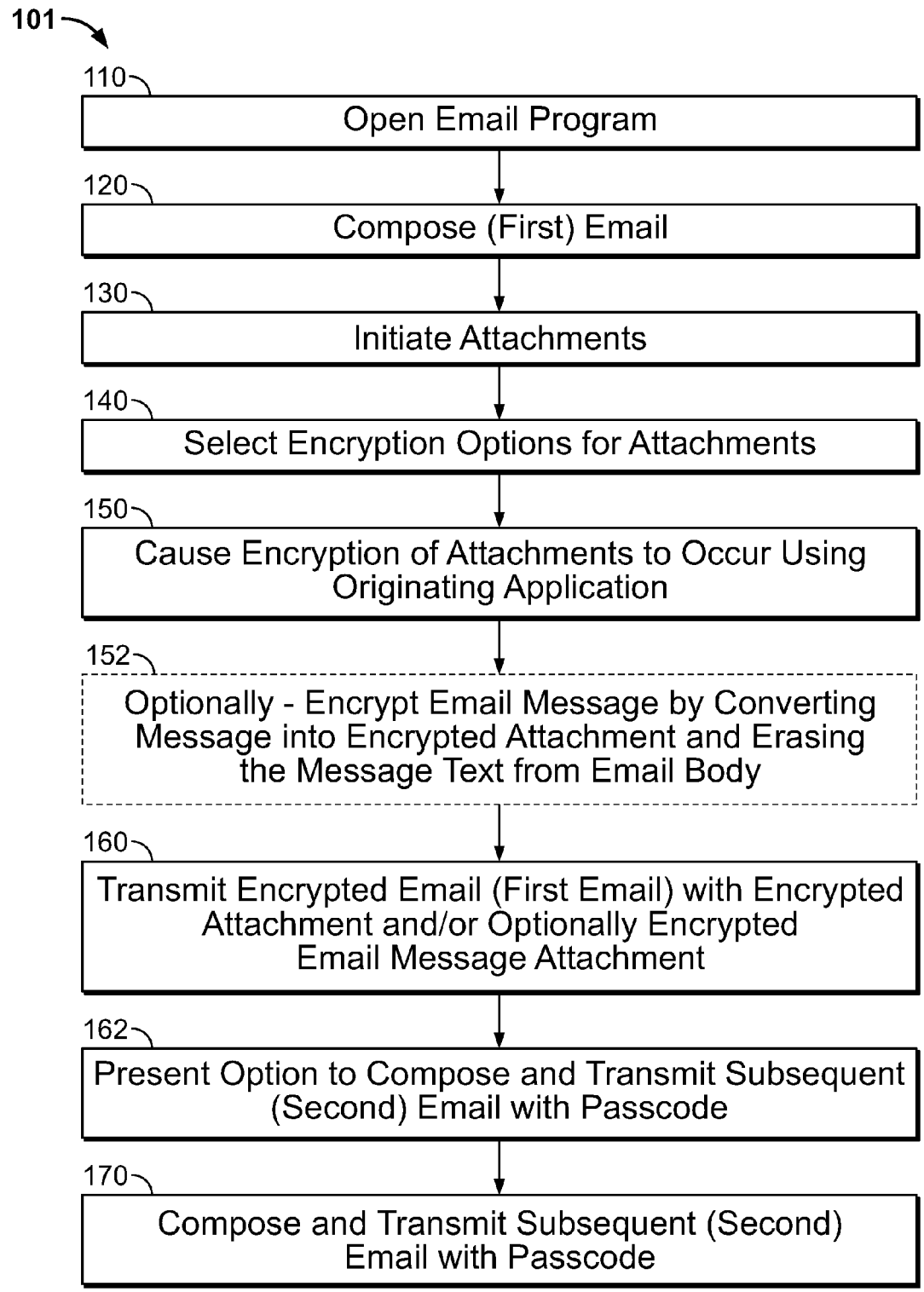
FIG. 1A is a flow diagram illustrating a method for transmission of encrypted email attachments, in accordance with an embodiment of the present specification.

The present specification is directed to enabling improved methods and systems for emailing encrypted emails and/or attachments using, for example, an email application or any software application conforming to one or more email protocols. More specifically, embodiments of the present specification are designed to enable service professionals to comply with certain privacy requirements, or best practices standards, with respect to client communications. In one embodiment, the present specification is directed towards enabling improved methods and systems for emailing encrypted emails and attachments by certified public accountants (CPAs) to help CPAs comply with certain recommendations of "Generally Accepted Privacy Principles" promulgated by the American Institute of Public Accountants and to service legal professionals who need a convenient method of encrypting attachments to email.

More particularly, the present specification is directed towards an email platform. The platform enables users to transmit emails in the form of encrypted attachments and/or encrypted attachments using an email application through a single, or limited number, of dialog boxes presented in the email application. The attachments are encrypted, without further user action, using the encryption feature of the application which created the attachment.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

One of ordinary skill in the art would appreciate that the methods described herein are effectuated by software application or programmatic instructions stored on a computer readable medium and executed by at least one processor. The computing device comprising the computer readable medium and processor can be any type of communication device, including a computer, server, mobile phone, gateway, laptop, desktop computer, netbook, personal data assistant, or any other device capable of accessing a cellular, Internet, TCP/IP, Ethernet, Bluetooth, wired, or wireless network. While the programmatic instructions enabling the processes described herein can be programmed using any programming language, in one embodiment, the Java or C++ programming language is used.

It should also be understood by those of ordinary skill in the art that a passcode refers to any string of characters, including but not limited to numeric, graphical, alphanumeric, character-based or any combination thereof that is intended to be kept secret. It should also be noted that where the term "password" is used, it is to be afforded the broadest scope in meaning and may be used interchangeably with passcode.

It should be noted herein that the term "file" or "files", as used throughout this specification may mean one file, at least one file, or a plurality of files that are sent individually or in the aggregate. It should also be understood by those of ordinary skill in the art that a file or multiple files may be sent using the methods of the present specification.

Also, the term "Uniform Resource Identifier (URI)", as used throughout this specification may mean a string of characters used to identify a resource on a local or remote computer and includes, but is not limited to, the Hypertext Transfer Protocols HTTP and HTTPS (also called HTTP over TLS, HTTP over SSL, and HTTP Secure) which mediate access to the World Wide Web, and the mailto protocol which allows users to send an email to a specific address without first having to copy it and enter it into an email client.

FIG. 1A is a flow diagram illustrating a method for transmission of encrypted email attachments, in accordance with an embodiment of the present specification. Referring to FIG. 1A, a process flow 101 defining the actions caused by execution of a plurality of programmatic instructions is provided. In one embodiment, an email application, such as Microsoft Outlook®, is initiated or opened by a user at step 110. Using conventional means, a user creates or composes a first email at step 120. In step 130, the user indicates to the email program that an attachment needs to be associated with the first email.

In one embodiment, the email application proactively informs a user of the option of attaching a file using the software functionality described herein. For example, the application displays a message informing the user "Remember to use the automatic passcode protection service if you wish to encrypt your attachments". In one embodiment, this message appears once, even if the user has multiple files to attach to the first email. In another embodiment, a user indicates to the email program a desire to activate the automatic passcode protection service described herein using an icon, button, menu option, or other display element integrated into the email program.

If a user so selects, the email application presents, in one or more dialog boxes, a plurality of encryption options at step 140, one of which includes setting a specific passcode for the decryption of the attachment. In one embodiment, the application proactively offers a user the option to use the last 4 digits of the client's social security number or Employer ID number as the passcode. After the user selects one or more options, including setting a specific passcode for the decryption of the attachment, the email application causes a third party application, specifically the application which originated the attachment, such as Microsoft Word®, Microsoft Excel®, Microsoft Powerpoint®, or any other presentation, word processing, PDF file creating, accounting, database, CAD file creating, image creating or spreadsheet applications, to encrypt, in step 150, the attachment using the encryption feature of that application in accordance with the options selected by the user.

In one embodiment, the application provides an option to the user of encrypting the body of the email along with the attachments. In step 152, and as described with respect to FIG. 1B below (steps 135, 145, and 155), the email message itself is optionally encrypted by converting the e-mail message into an encrypted attachment and attaching the email attachment to an automated message along with the other attachments.

Once encrypted, the attachment(s) is/are associated with either the first unencrypted email or an automatically generated message (if the first email is converted into an encrypted attachment) and transmitted by the email application at step 160. Thus, in one embodiment, the e-mail is an automated message if the original e-mail message is encrypted. In another embodiment, the e-mail is the original message from user to recipient.

The email application then presents an option at step 162 to automatically compose (or create) a second, subsequent email providing the recipient with a passcode needed to decrypt the encrypted attachment(s) at step 170. In one embodiment, the second, subsequent email contains a message that provides the recipient with a passcode hint (i.e. "your passcode is the last four digits of your SSN"). In one embodiment, the option to automatically compose (or create) a second, subsequent email providing the recipient with a passcode needed to decrypt the encrypted attachment(s) is pre-selected by the user as a general setting and automatically applied at step 170 in which case the email application does not present such option at the time of encryption. One of ordinary skill in the art should appreciate that the transmission of the decrypting passcode can be sent before or after the transmission of the email with encrypted attachment.

Figure 1B:
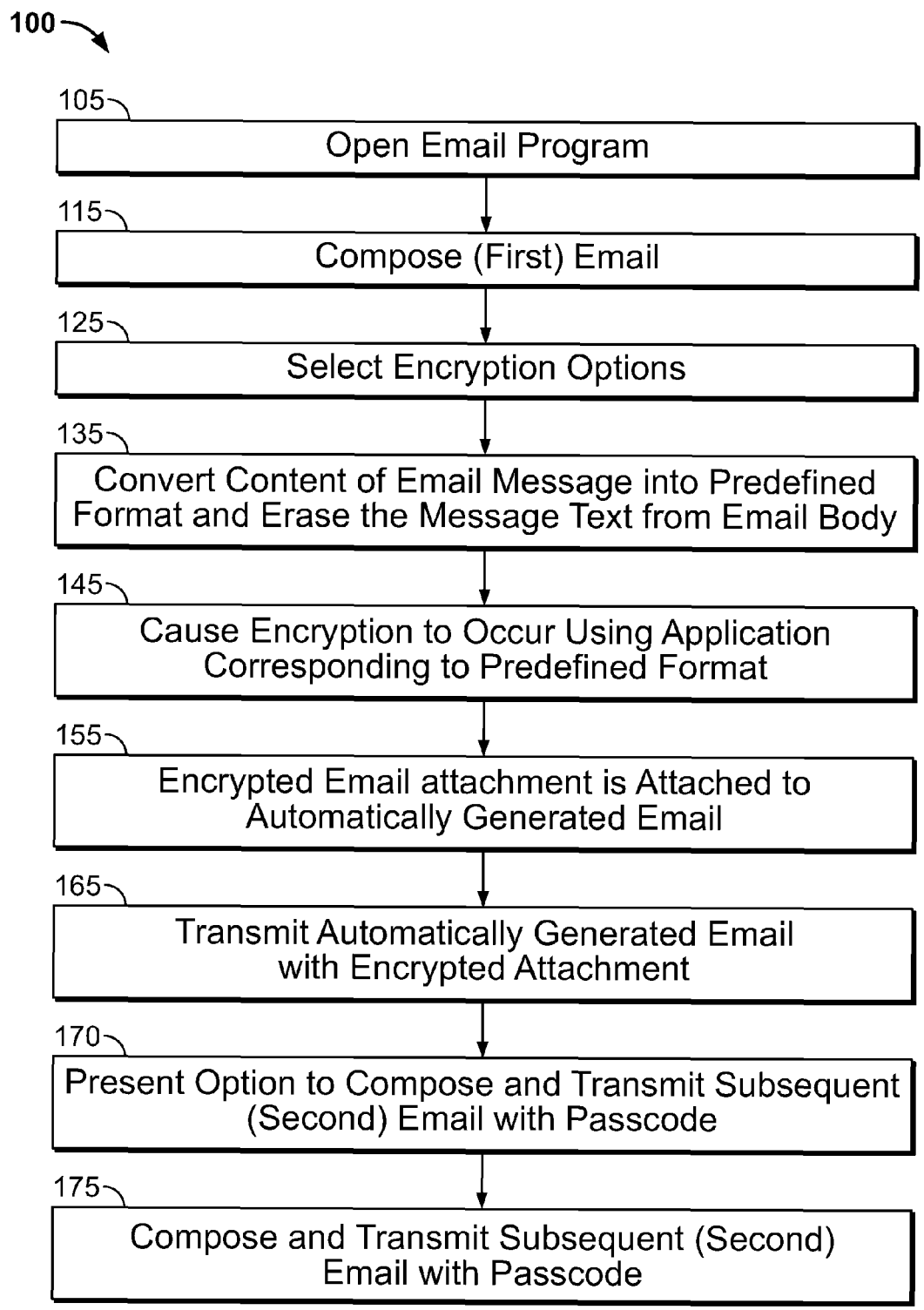
FIG. 1B is a flow diagram illustrating a method for transmission of encrypted email messages, in accordance with an embodiment of the present specification.

FIG. 1B is a flow diagram illustrating a method for the transmission of an email message as an encrypted attachment, in accordance with an embodiment of the present specification. Referring to FIG. 1B, a process flow 100 defining the actions caused by execution of a plurality of programmatic instructions, in accordance with an embodiment of the present specification, is provided. In one embodiment, an email application, such as Microsoft Outlook®, is initiated or opened by a user at step 105.

Using conventional means, a user initiates the creation of a first email at step 115. In one embodiment, the application proactively informs a user of the option of encrypting the first email and converting the first email message into an encrypted attachment and associated automatically generated e-mail message using the software functionality described herein. The first email message may be converted into a predefined format such as a Microsoft Word® file or a PDF file before encryption and attachment. In one embodiment, a user may be asked to choose a format for encrypting the email out of a list of predefined formats. For example, the application displays a message informing the user "The email will be converted to a Word file before encryption and would be sent to the recipient as an attachment to an automated mail message".

In one embodiment, a user indicates to the email program a desire to activate the automatic passcode protection service described herein using an icon, button, or other display element integrated into the email program. If a user so selects, the email application presents, in one or more dialog boxes, a plurality of encryption options at step 125, one of which includes setting a specific passcode for the decryption of the email. In one embodiment, the application proactively offers a user the option to use the last 4 digits of the recipient's social security number or Employer ID number as the passcode. After the user selects one or more encryption options, including setting a specific passcode for the decryption of the first email, the email application converts the contents of the first email into a predefined format such as a Microsoft Word® file or a PDF file and deletes the message from the email body at step 135 and causes the respective third party application i.e. Microsoft Word®, or PDF file creating application, to encrypt the converted first email at step 145 using the encryption feature of that application in accordance with the options selected by the user.

The encrypted first email is then attached to an automatically generated email at step 155 wherein the address of recipients are the same as those entered by the user in the first email before encryption. In one embodiment, the subject of the automatically generated email is the same as that entered by the user in the original email before encryption. Also, in one embodiment, the body of the automatically generated email contains predefined text such as 'Please see attached encrypted file for obtaining content of this email'. The automatically generated email containing the encrypted attachment is then transmitted by the email application at step 165. The email application then presents an option at step 170 to automatically compose and transmit a second, subsequent email which provides the recipient with a passcode needed to decrypt the encrypted attachment at step 175. In one embodiment, the second, subsequent email contains a message that provides the recipient with a passcode hint (i.e. "your passcode is the last four digits of your SSN"). One of ordinary skill in the art should appreciate that the transmission of the decrypting passcode can be sent before or after the transmission of the email with encrypted attachment.

In one embodiment, it should be noted that once decrypted, the recipient can disassemble the email attachment and reincorporate it back into a reply email to include the original text.

Figure 2:
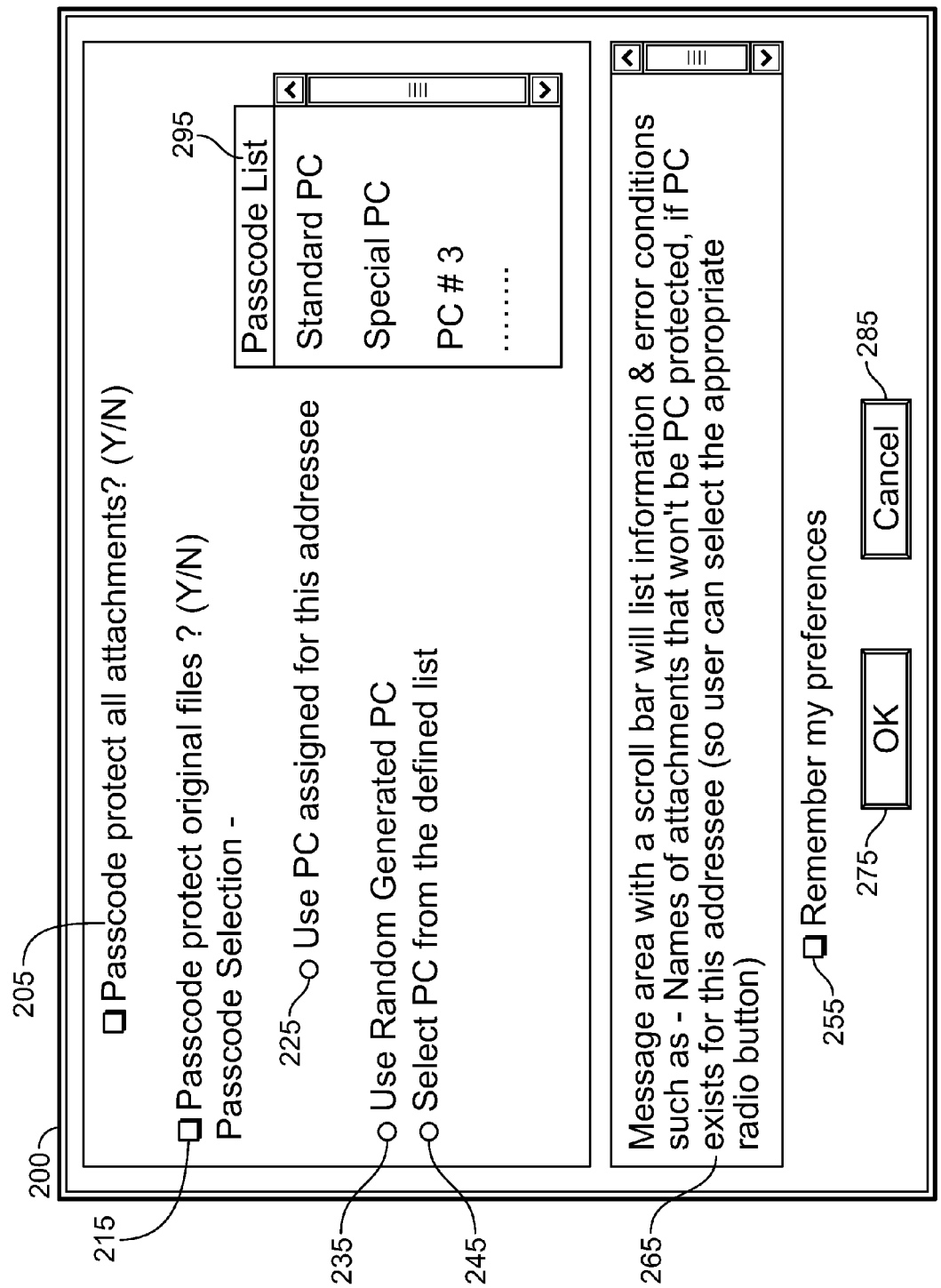
FIG. 2 illustrates an exemplary user interface, in accordance with an embodiment of the present specification.

FIG. 2 illustrates an exemplary user interface, in accordance with an embodiment of the present specification. Referring to FIG. 2, an exemplary dialog box 200 is presented. The dialog box, or user interface, is integrated into the email application and is automatically displayed each time a file is attached to an email or is initiated by clicking a button on the email application to call up the interface. It should be appreciated that the options described herein can be presented in one interface or dialog box or multiple interfaces/dialog boxes. In one embodiment, dialog box 200 comprises a plurality of encryption options, including an option to passcode protect all attachments 205, passcode protect original files 215, use a specific passcode already pre-assigned to the designated recipient 225, use a pre-designated passcode 245 selected from a list 295, use a randomly generated passcode 235, a message area 265 that describes information and error conditions, an option to remember preferences 255, a submit icon 275 (causes the email to be sent with or without encryption) and cancel icon 285 (causes no email to be sent). In one embodiment, the error conditions, such as no attachments, unsupported file types, or attachments that are already protected, are managed by the email application while the dialog box is open, thereby informing the user of errors in real-time.

The option to passcode protect all attachments provides users with an ability to selectively protect one or several of multiple attachments attached to an email. The option to use a specific passcode already pre-assigned to the designated recipient 225, use a pre-designated passcode 245 selected from a list 295, or use a randomly generated passcode 235 enables a user to conveniently manage multiple passcodes that can be recipient specific. More specifically, in one embodiment, a user establishes a recipient passcode list, each customized to a specific recipient, thereby enabling recipients to conveniently access encrypted files using specialized, tailored passcodes. In one embodiment, the application proactively offers a user the option to use a selection of digits, such as the last 4 digits, of the client's social security number or Employer ID number as the passcode. In another embodiment, a user can select an option to randomly generate a passcode 235 and then have that randomly generated passcode associated with the recipient or attachment in the passcode list 295. The interface displays the recipient's name in association with the predefined, randomly generated, or pre-assigned passcode.

In one embodiment, the present specification provides a user with the option to create and store a custom passcode list. Specifically, within a database structure, a passcode list can be formed and stored that relates a legal entity's name (such as an individual person, company, partnership, trust or other entity, mobile number or phone number address) with an email address and a social security number or Federal Employee Identification Number (FEIN), or a portion thereof. In one embodiment, the structure is stored in memory as a spreadsheet and then imported into the software program as required. In another embodiment, a list is generated using a native export feature in an email, address or contact program to create a spreadsheet or database file, (CSV or tab formats, such as that available using Microsoft Excel®) containing contacts, which, when exported, is properly formatted for use in the software of the present specification, including the addition of new columns for a social security number, FEIN, or custom passcode.

The passcode list preferably provides a user with the ability to assign at least one, and preferably two or more, passcodes for each recipient, including a primary passcode and a secondary passcode. The primary passcode is typically the one used when communicating solely with the recipient, i.e. the first 4 digits of the social security number. The secondary passcode is typically used when the recipient is one of several recipients in an email and is typically a passcode shared by a group, such as a group of executives at a client company. Accordingly, the recipient may have zero, one, two, or more passcodes assigned in the passcode list. In one embodiment, a user has the option to automatically assign passcodes to clients, which, in embodiments are made up of the last 4 digits of SSN or FEIN. In another embodiment, a user has the option to assign an alternate custom passcode. In embodiments, the custom passcode may be up to 15 characters, instead of just 4 digits.

In an embodiment, when a new contact is added to an email program, the software will automatically ask if the contact is to be added to a passcode file or database structure. It should be appreciated that, in a network environment, the passcode file can reside either on a local computer or only on a central server, or on both a local and remote computer. Additionally or alternatively, the passcode file can reside in a folder in an Internet file hosting service or cloud service.

In another embodiment, the custom passcode list can contain passcodes for individuals that are not clients as well. It should further be appreciated that a user is not limited to using a contact list in the passcode file, therefore if a contact is not listed in the passcode file, a user will still be able to create a passcode (random or custom) for an individual contact. While this user-created passcode does not appear in the passcode file from the outset, it can be added subsequently by a user actively or through a periodic maintenance process that periodically updates the passcode file for any new contacts added. Further, the passcode can be added automatically or by user's consent via a prompt, to the existing passcode file at the time of creation.

It should be appreciated that, if no passcode protection is selected and a user selects "OK", the email will be sent without passcode protection for the attachments and in a conventional manner. Selecting checkbox 215 causes a passcode to be applied to the original files in the draft unsent email. In one embodiment, passcode selection area 295 is grayed out or inactive until the passcode protection option 205 is selected. In one embodiment, the application searches a database to relate a recipient name or email address to a stored passcode in relation to the recipient name or email address. In one embodiment, the pre-assigned recipient passcode is selected by default. In one embodiment, if there are multiple recipients, the software will offer to use the passcode assigned to the first recipient from the passcode file. If the first recipient does not appear in the passcode file, the user can proceed to create a new passcode or select a common passcode or select a random passcode generated by the application.

The attachment can be saved in the email only, or in the original folder from where the file was first retrieved, or in another folder on the user's computer (including a "new" folder), or in a default data folder set up by the email application. A user can define the saving mode proactively or establish a default saving mode. The interface further enables an attachment to be saved by modifying a pre-established file name to add a predefined suffix, metadata, or file identifier, such as the words "AutoPW protected on XXXXXXXX (DATE)". Preferably, upon creation of the encrypted attachment or sending of the email with the encrypted attachment, a log is saved to local or remote memory. The log maintains an audit trail of files that were assigned passcodes and may contain metadata such as the file name, location where saved, sender name, recipient name, and passcode.

In some embodiments, the method of the present specification includes some or all of the following steps which may be user, system, and/or application initiated:

The user prepares an email and attaches one or more files;
The user presses a "send" icon;
An interface for establishing a plurality of encryption options is shown either automatically upon sending the email or by actively pressing a button;
The user activates an icon for "Passcode-protect my attachments" (if the user does not activate the passcode-protect icon, and "OK" is pressed, then an email is sent without passcode protection, and optionally in one embodiment after reconfirmation that the e-mail and the attachment(s) will not be protected/encrypted);
If the user activates an icon for "Passcode-protect my attachments", then an interface is displayed with icons for designating what kind of passcode would be used, e.g. custom passcodes or random passcodes;
The user designates what kind of passcode should be used;
An interface is displayed with check boxes next to a list of all the attachments and a header saying "Check the attachments to which you wish to assign the passcode";
If the file format for any passcode-selected attachment is not supported, the application will notify the user at the bottom of the attachment list in the message section;
If no attachment is found, the application will notify the user at the bottom of the attachment list in the message section by stating "If you forgot to attach a file, please press cancel, attach the missing file to your email message and start the application again.";
The user checks the boxes next to the attachments requiring protection;
If an attachment is already passcode protected, the application will notify the user at the bottom of the attachment list in the message section by stating "The following attachments were found to be previously encrypted. If you wish to passcode-protect these attachments using the application, you will need to unencrypt these files prior to attaching them to your email."
The user presses OK to send the email with encrypted attachments;
The email application causes the third party application which originated the attachment to apply its internal encryption feature to encrypt the attachments;
The third party application causes the encrypted attachment to be saved in accordance with the user-selected options;
The email program then attaches the encrypted attachment to the email;
The email program then displays a message saying "Passcode assigned: XXXXXX (you may want to make a note of the passcode)";
The email program causes another message to be displayed, stating "Your attachments have been encrypted and saved to your email. Would you like to save the encrypted file on your computer?" The user is offered a checkbox for "Yes" and a checkbox for "No";
If user checks "No", then an interface is displayed stating "Press OK and return to the email application to send your email";
If user checks "Yes", then an interface is displayed providing a plurality of options, including saving the encrypted file in the original folder from where file was first retrieved, saving the file in a default folder, or saving the file in another location. In one embodiment, when user checks one of the three boxes and presses OK, the files are saved in a conventional manner and optionally assigned the same file name as the original file with an added extension indicative of passcode protection;
Upon completion, the standard email application interface is displayed, which shows the body of the email, to which the user can then add or edit text and send the message when ready; in one embodiment, a standard paragraph is automatically added below the signature line explaining that the email attachment is encrypted in accordance with the firm's Privacy Policy, and referring to one or more guidelines, rules, or other standards with which the email complies.
The email application automatically generates a second email with the same subject as in the original email but preceded by a passcode notification, wherein the passcode or passcode hint is listed in the text of the email and the email is automatically sent to one or more of the email addresses that were included on the original email (including cc's and bcc's). In one embodiment, the user is prompted to delete any email addresses that user does not want to notify of the passcode. In one embodiment, the user has the option of pre-designating email recipients who should, and should not, receive the passcode; in one embodiment, a standard paragraph is automatically added below the signature line explaining that the email attachment is encrypted in accordance with the firm's Privacy Policy, and referring to one or more guidelines, rules, or other standards to which the email complies. In another embodiment, the user is prompted to add or change any email address (for example if the user wishes to send the passcode notification to an alternate email address belonging to the recipient for added security).

The user then causes the second email to be transmitted. The system stores a log and maintains an audit trail of file attachments that were encrypted. The log would contain the file name, location where saved, sender name, recipient name, and passcodes.

The automatic passcode protection service, described with reference to FIGS. 1A, 1B and 2, is invoked by the user's email application (such as Microsoft Outlook®) installed on his computer, in one embodiment. In accordance with another embodiment, the present specification describes an automatic passcode protection service invoked by a standalone document encryption software application downloaded installed on the user's computer. However, in alternate embodiments, the standalone document encryption software application is accessed and invoked over a network. According to aspects of the present specification, a file is encrypted using a native application program which was or is being used to create the file. In some embodiments, the native application program and the document encryption software application are stored in the same physical storage device. In some alternate embodiments, the native application program and the document encryption software application are stored in different physical storage devices. Also, in some embodiments, the file to be encrypted and the associated native application program are located remote from the user's computer such that the native application program encrypts the file by opening the file over the network. In still other embodiments, the file to be encrypted is located remote from the user's computer while the associated native application program is located on the user's computer. In this embodiment, the native application program encrypts the file by opening the file over said network.

In one embodiment, at least one encrypted file is transmitted as attachment(s) via an email application. In one embodiment, the email application is a Webmail service (hosted by a server separate and remote from the user's computer) subscribed to by the user on the Internet and invoked by the standalone document encryption software application.

In one embodiment, a Uniform Resource Identifier (URI) to at least one encrypted file is transmitted by appending the URI to an auto-generated email using an email application. In one embodiment, the URI is associated with an Internet based file hosting service or cloud service. In one embodiment, the email application is a Webmail associated with the Internet based file hosting service subscribed to by the user and invoked by the standalone document encryption software application.

Figure 3:
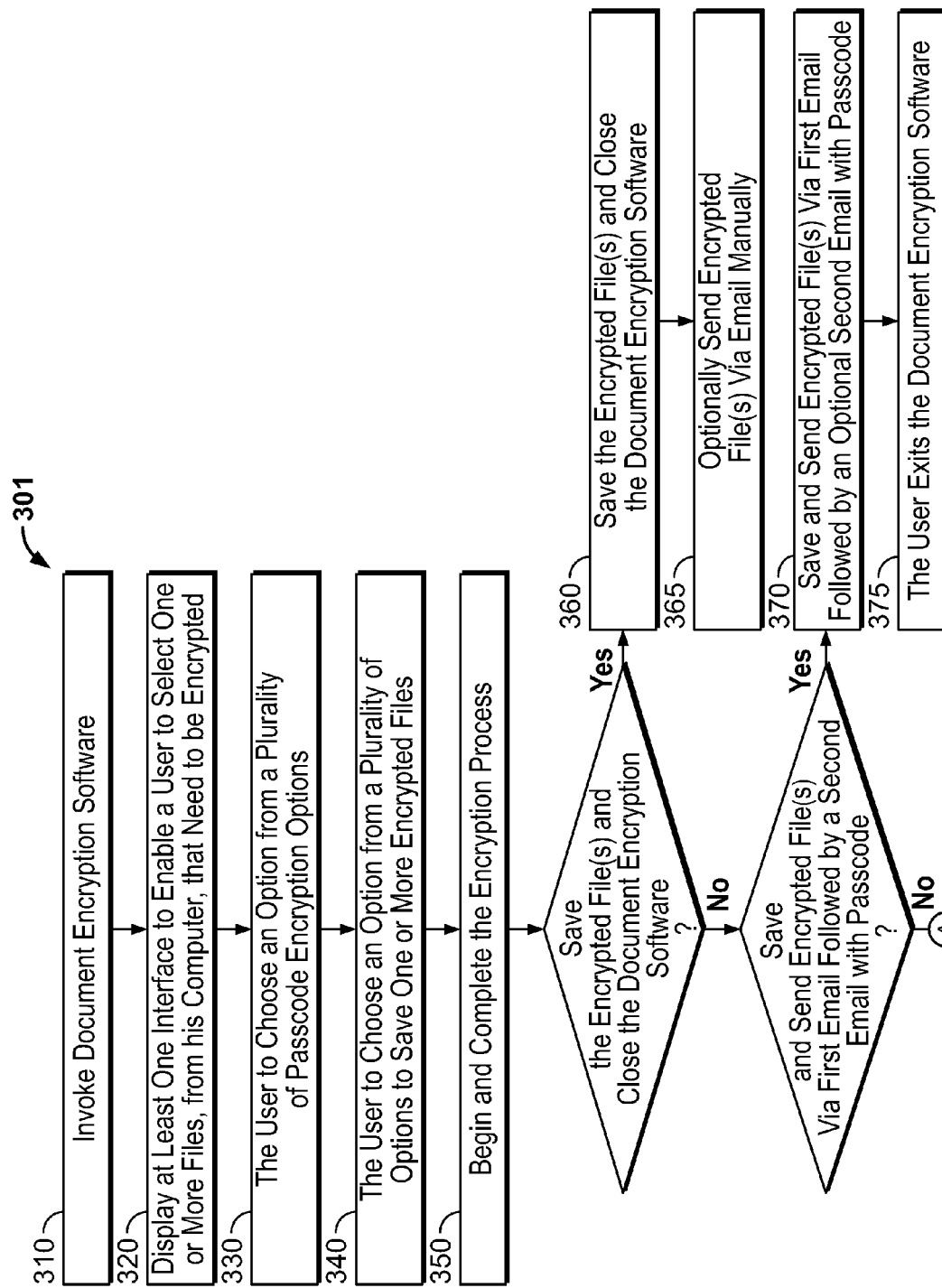
FIG. 3 is a flow diagram illustrating another method for transmission of encrypted files as attachments or uniform resource identifiers thereto via email, in accordance with another embodiment of the present specification.
Figure 3:
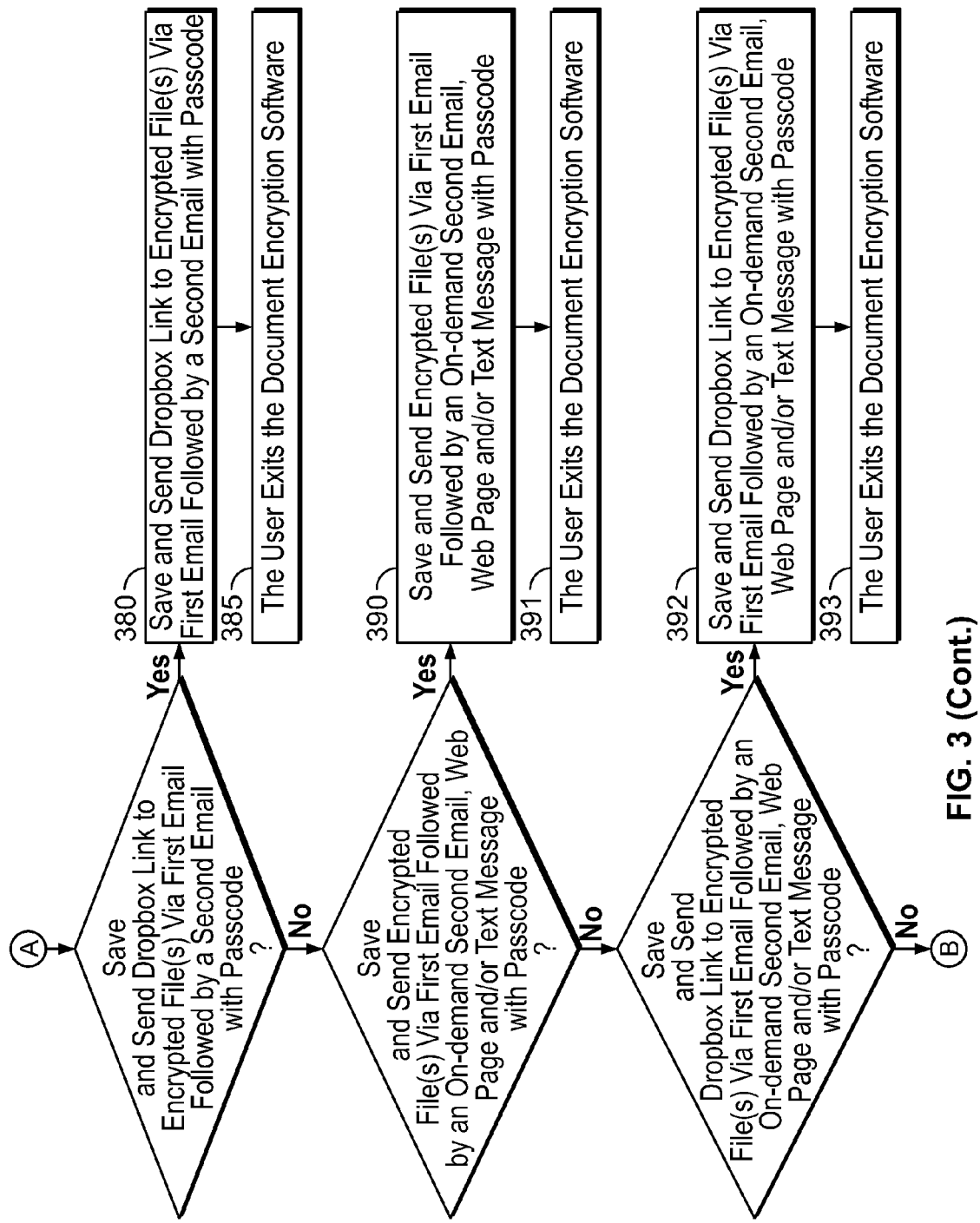
Figure 3:
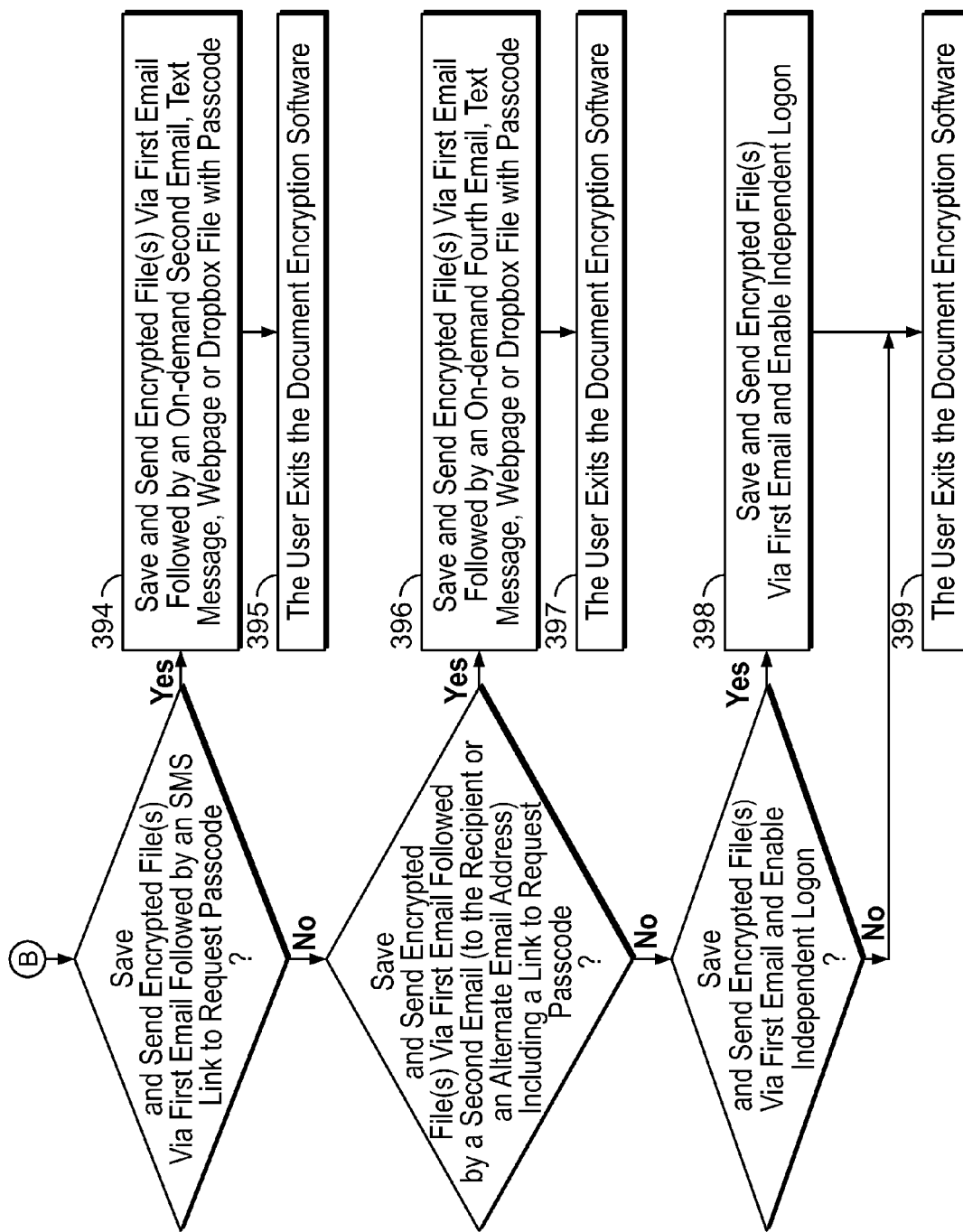

FIG. 3 is a flow diagram illustrating another method for transmission of encrypted files as attachments or a Uniform Resource Identifier (URI) (based on a cloud service, for example, in some embodiments) thereto via an email, in accordance with another embodiment of the present specification. The attachments or files are encrypted, without further user action, using the encryption feature of the native application which created the attachment. Referring to FIG. 3, a process flow 301 defining the actions caused by execution of a plurality of programmatic instructions is provided. At step 310, a document encryption software application is invoked, initiated or opened by a user.

Persons of ordinary skill in the art would appreciate that the document encryption software is already installed on the user's computer, in some embodiments. In one embodiment, the document encryption software application is invoked, initiated or opened by the user by double-clicking a short-cut icon of the application that would typically lie on a desktop of the user's computer. In another embodiment, the document encryption software application is invoked, initiated or opened by the user by selecting one or more files that the user would like to encrypt (such as, for example, from 'Windows Explorer' or 'File Explorer' on a computer running Microsoft Windows operating system), right-clicking on the selected one or more files to display an option to encrypt the selected one or more file using the document encryption software and thereafter selecting and clicking on the displayed option. In yet another embodiment, the document encryption software application is invoked, initiated or opened by the user by initiating or opening a native application program which was or is being used to create a file that needs to be encrypted. This is achieved, in one scenario, by double-clicking the file that causes the file to open in the native application program that was used to create the file. In another scenario, a native application program is first opened and then a file is created in the native application program and saved. In both scenarios, an icon or button is available to the user, such as on a standard tool bar, from within the opened interface of the native application program. Clicking on the icon or button invokes, initiates, or opens the document encryption software application.

Figure 4A:
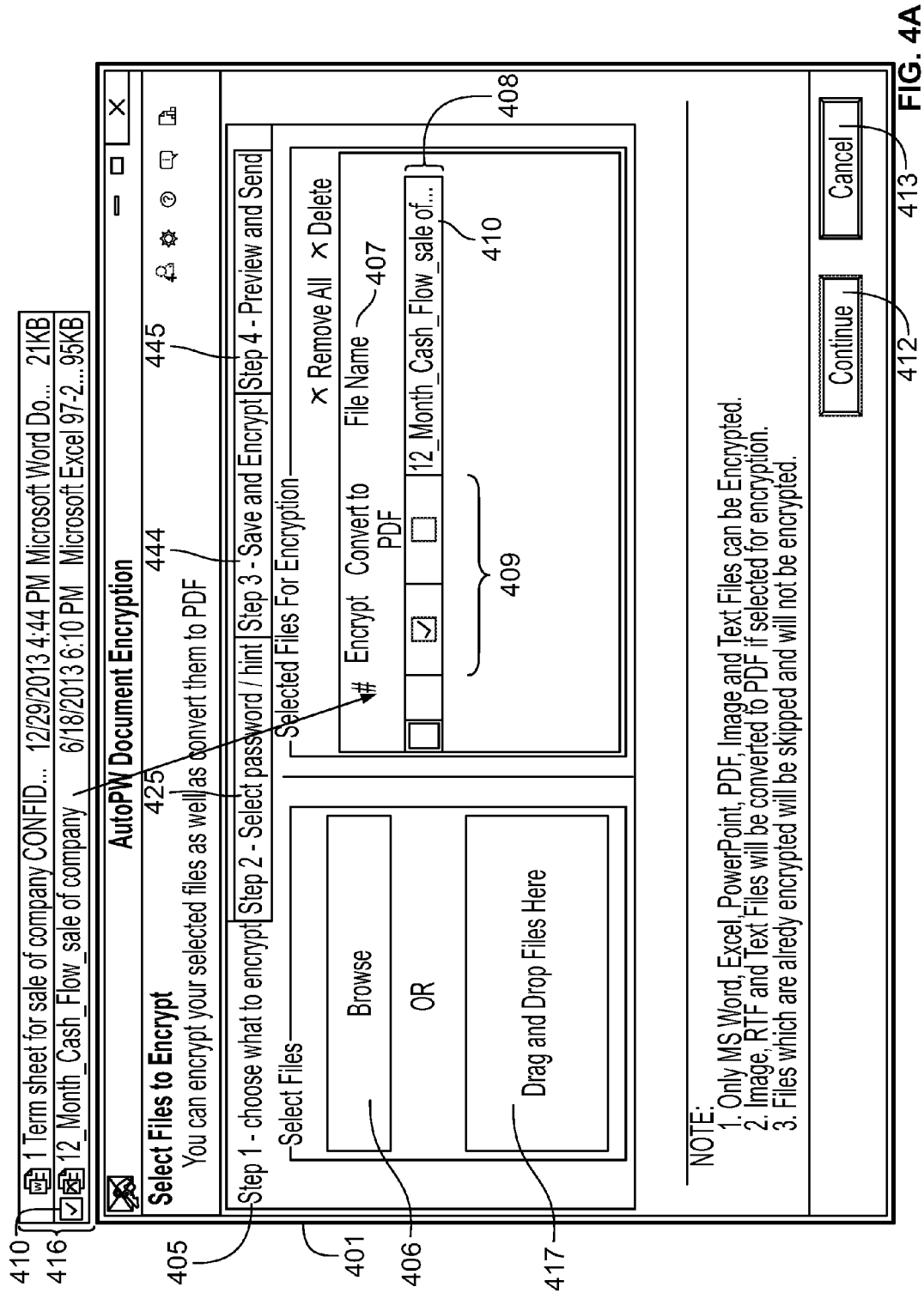
FIG. 4A illustrates an embodiment of an interface for enabling a user to select at least one file by right-clicking the at least one file, from his computer, for encryption.
Figure 4B:
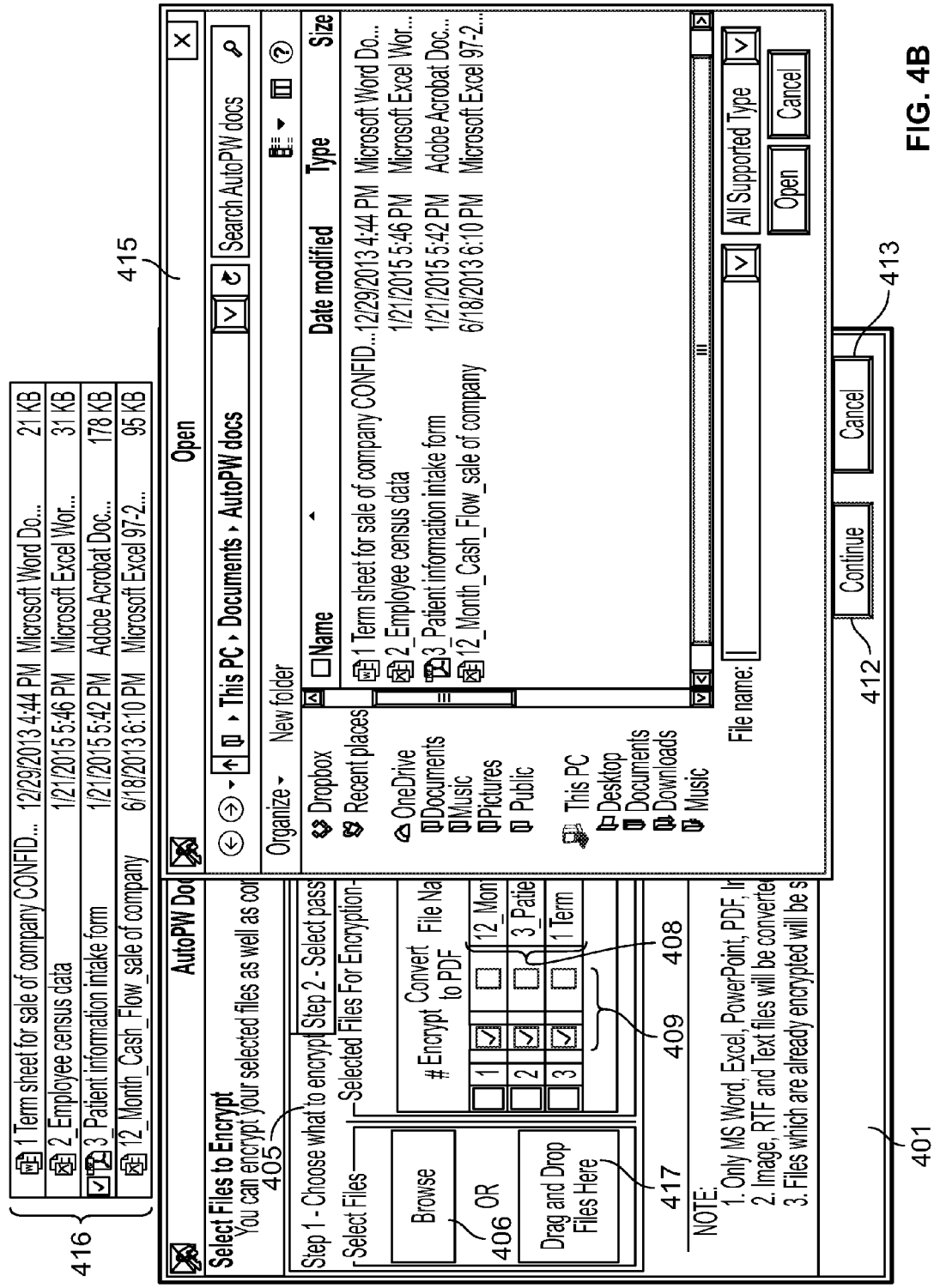
FIG. 4B illustrates the interface of FIG. 4A enabling the user to select at least one additional file, using a browse button, and/or a drag and drop button for encryption.

Initiation of the document encryption software application causes at least one graphical user interface ('interface') or dialog box to be displayed to the user, at step 320. FIG. 4A illustrates an exemplary user interface/dialog box 401, in accordance with an embodiment. The interface 401 integrates four tabs 405, 425, 444 and 445 that respectively correspond to a plurality of steps of encrypting one or more files, in accordance with an embodiment. It should be appreciated, however, that the tabs 405, 425, 444, 445 can be presented in one interface/dialog box or multiple interfaces/dialog boxes. Referring now to FIGS. 3, 4A and 4B, at step 320, the user is presented with interface tab 405 to enable the user to select one or more files 416, from his computer, that need to be encrypted. The user can click on button "browse" 406 that will open a dialog box 415 (such as the 'Windows Explorer' or 'File Explorer' on a computer running Windows Operating System, as shown in FIG. 4B) to enable the user to navigate his files/folders 416 on his computer and select the file to be encrypted. Selecting the file will cause the file to be added to and displayed in the table list 407. In one embodiment, if the user wants to add multiple files he has to repeat, multiple times, the process of clicking the button 406 and selecting the multiple files one after another. In another embodiment, the user can click the button 406 once and then select multiple files (from his computer) in one go to add them all to the table list 407. In yet another embodiment, the user can drag-and-drop one or more files 416 to a drag-and-drop control area 417 within the interface tab 405. The table list 407, in one embodiment, further enables the user to select/deselect one or more files, from the listed files 408, using checkboxes 409. Thus, the files that are finally selected by the user by checking their respective checkboxes 409 are the ones that will be encrypted. In one embodiment, two set of checkboxes 409 are provided—a first set of checkboxes provide the user with the option to select/deselect one or more files for encryption and a second set of checkboxes provide the user with an option to select/deselect one or more files for conversion to PDF format post encryption. In one embodiment, the document encryption software application also verifies and indicates to the user if a selected file is not supported by the software application for encryption. When a user checks a check box for a file and that selected file is not supported for encryption, an error message box is displayed notifying the user that the selected file cannot be encrypted and its corresponding checkbox is automatically deselected/unchecked by the encryption software application. It should be appreciated that a file is not supported for encryption when the native application program, used to originate/create the file, is not installed on the user's computer and therefore the native application program's encryption feature cannot be invoked for encrypting the file. In alternate embodiments, the files that are encrypted are also automatically (by default) converted to PDF format and/or compressed. Clicking a 'cancel' button 413 enables the user to exit/close the document encryption software.

It should be appreciated that, in various embodiments, the interface tab 405 is presented to the user in a number of scenarios. In a first scenario, the user initiates the document encryption software application by double-clicking a shortcut icon of the application (that would typically lie on a desktop of the user's computer). In a second scenario, as shown specifically in FIG. 4A, the user initiates the document encryption software application by selecting one or more files (for example, file 410 of FIG. 4A) that the user would like to encrypt (such as, for example, from 'Windows Explorer' or 'File Explorer' on a computer running Microsoft Windows operating system). The user then right-clicks on the selected one or more files (such as file 410 of FIG. 4A) to display an option to encrypt the selected one or more file using the document encryption software. The user thereafter selects and clicks on the displayed option or, alternatively, simply right-clicks the file 410 to initiate the document encryption software application, causing the interface tab 405 to be displayed with the right-clicked file 410 automatically added to the table 407 (FIG. 4A). In a third scenario, the user initiates or opens a native application program which was or is being used to create a file that needs to be encrypted and clicks on an icon or button (from within an interface of the opened native application program) that invokes, initiates or opens the document encryption software application. In the first scenario when the interface tab 405 is presented to the user, the table list 407 is initially empty and the user selects and adds one or more files to the table list 407. In the second scenario, however, when the interface tab 405 is presented to the user, the table list 407 is pre-populated, in one embodiment, with the one or more files 410 that were selected and right-clicked upon to invoke the document encryption software application. Thereafter, the user can add more files to the table list 407 by using the 'browse' button 406. In the third scenario, when the interface tab 405 is presented to the user, the table list 407, in one embodiment, is pre-populated with the single file that was opened in the native application program of the file. Of course, the user can thereafter add more files to the table list 407, such as by using the 'browse' button 406, the drag-and-drop functionality or by right-clicking a file.

Figure 4C:
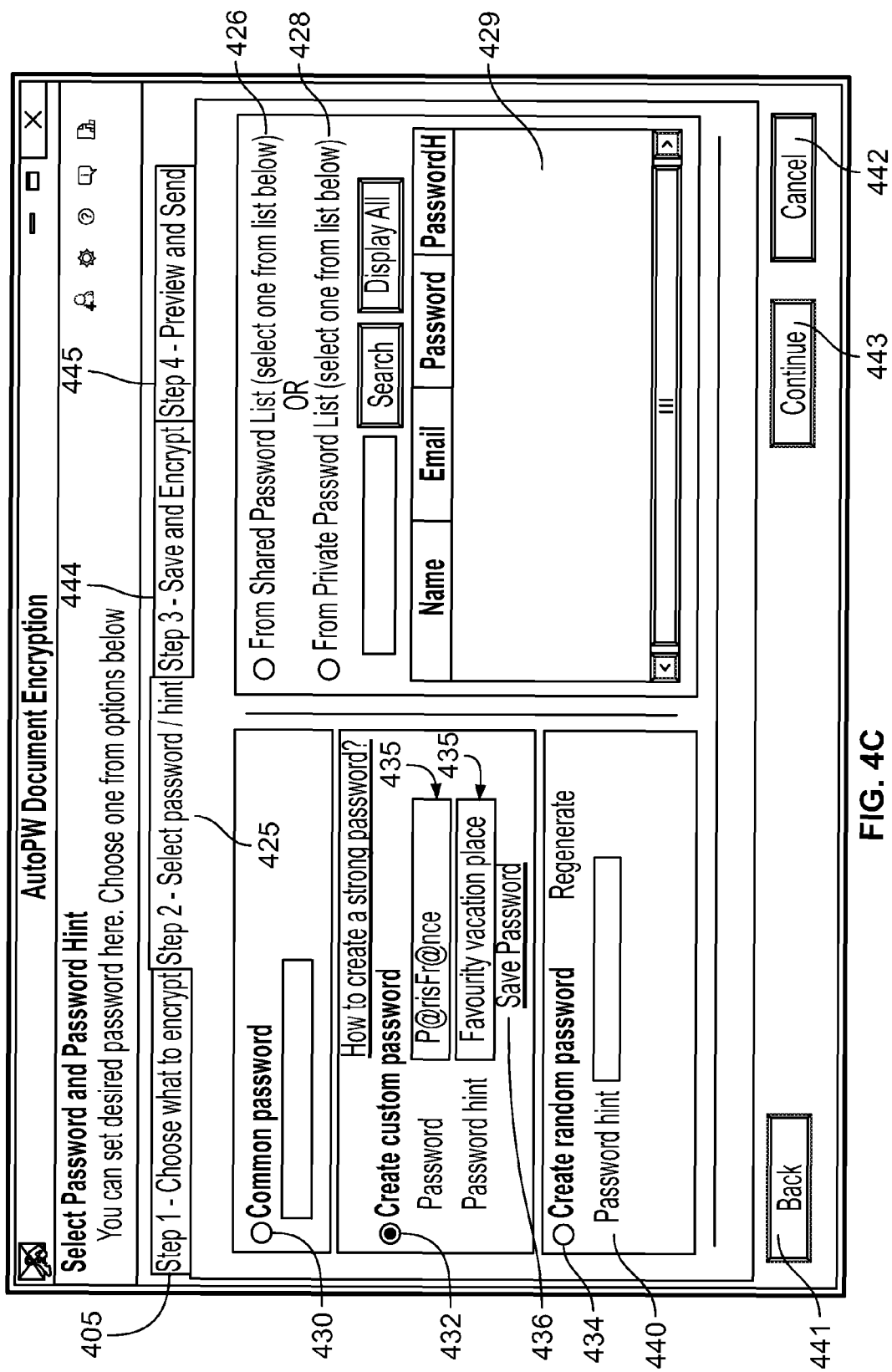
FIG. 4C illustrates an embodiment of an interface for enabling the user to select an encryption option from a plurality of encryption options.
Figure 4D:
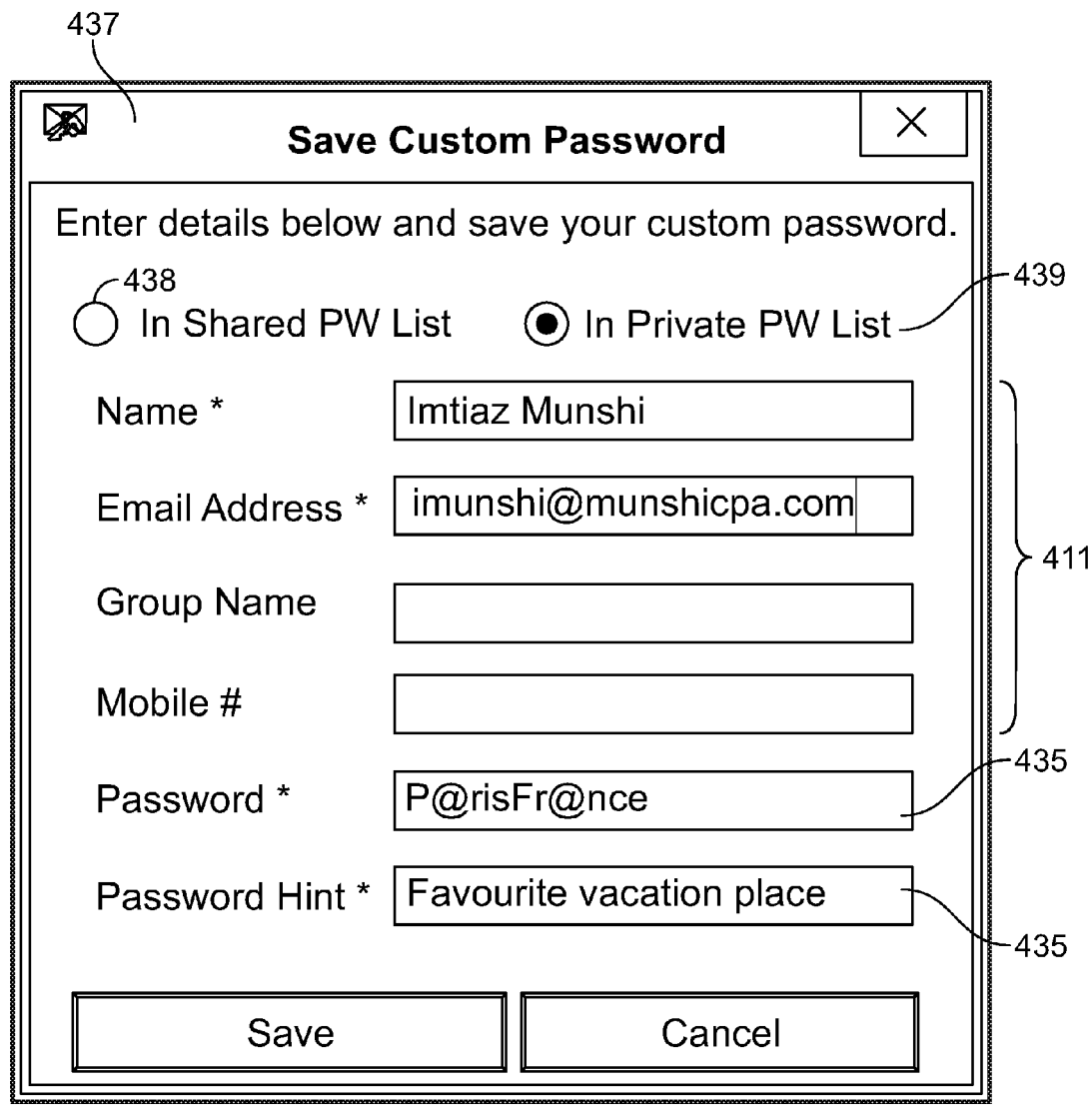
FIG. 4D illustrates an embodiment of an interface for enabling the user to save a custom passcode for an intended recipient and a plurality of associated recipient credentials.

Referring back to FIG. 3, after one or more files have been added to the table list 407, selected and verified by the encryption software program for errors such as 'not supported formats' in the previous step 320, the user is prompted to choose from a plurality of passcode encryption options, at step 330, for setting a specific passcode for decryption of the one or more files. Referring now to FIGS. 3, 4C and 4D, at step 330 the user is presented with interface tab 425 (when the user clicks the 'continue' button 412 in tab 405 of FIG. 4A or 4B). The interface tab 425 presents passcode protection options 426 and options 428 to respectively use a pre-designated shared or private passcode selected from a list 429 (in one embodiment options 426 and 428 are presented as radio-buttons such that when radio button 426 is selected then the list 429 displays a list of shared passcodes and when radio button 428 is selected then the list 429 displays a list of private passcodes). The interface further presents option 430 to use a common passcode, option 432 to create and use a customized passcode or option 434 to create a random passcode. Option 426 allows the user to choose a pre-designated shared passcode from a pre-stored list 429 of shared passcodes, which is typically a list of passcodes assigned to recipients and shared by a group of users, such as a group of employees in a company. Option 428 allows the user to choose a pre-designated private passcode from a pre-stored list 429 (as list 429 now displays a plurality of private passcodes when option 428 is selected by the user) of private passcodes. Option 430 enables the user to use the passcode commonly used to encrypt documents by a group of users such as a group of employees in a company. In option 432, the user can create passcodes that are customized to the email recipient and/or the recipient client's company. Accordingly, there are text boxes 435 to create a passcode and record a hint to the created passcode. The user can also choose to save the created custom passcode by clicking the link 436. Clicking link 436 opens a dialog box 437 (as shown in FIG. 4D) which allows the user to save the custom passcode to the shared list of recipient passcodes by choosing radio-button 438. Alternatively, choosing radio-button 439 indicates that the created passcode should be saved in the user's private list of recipient passcodes. The interface 437 also allows the user to associate a plurality of credentials 411 (such as, for example, a name, email address, group name and/or mobile number of the user) with the saved custom passcode. In option 434, random passcodes are automatically generated by the encryption software application and subsequently displayed in the text box 440. 'Back' button 441 allows the user to go back to tab 405 corresponding to step 320, 'cancel' button 442 allows the user to close the encryption software application and the 'continue' button 443 enables the user to move to the next interface tab 444. In one embodiment, the user is allowed to choose only one of the options 426, 428, 430, 432 or 434.

Figure 4E:
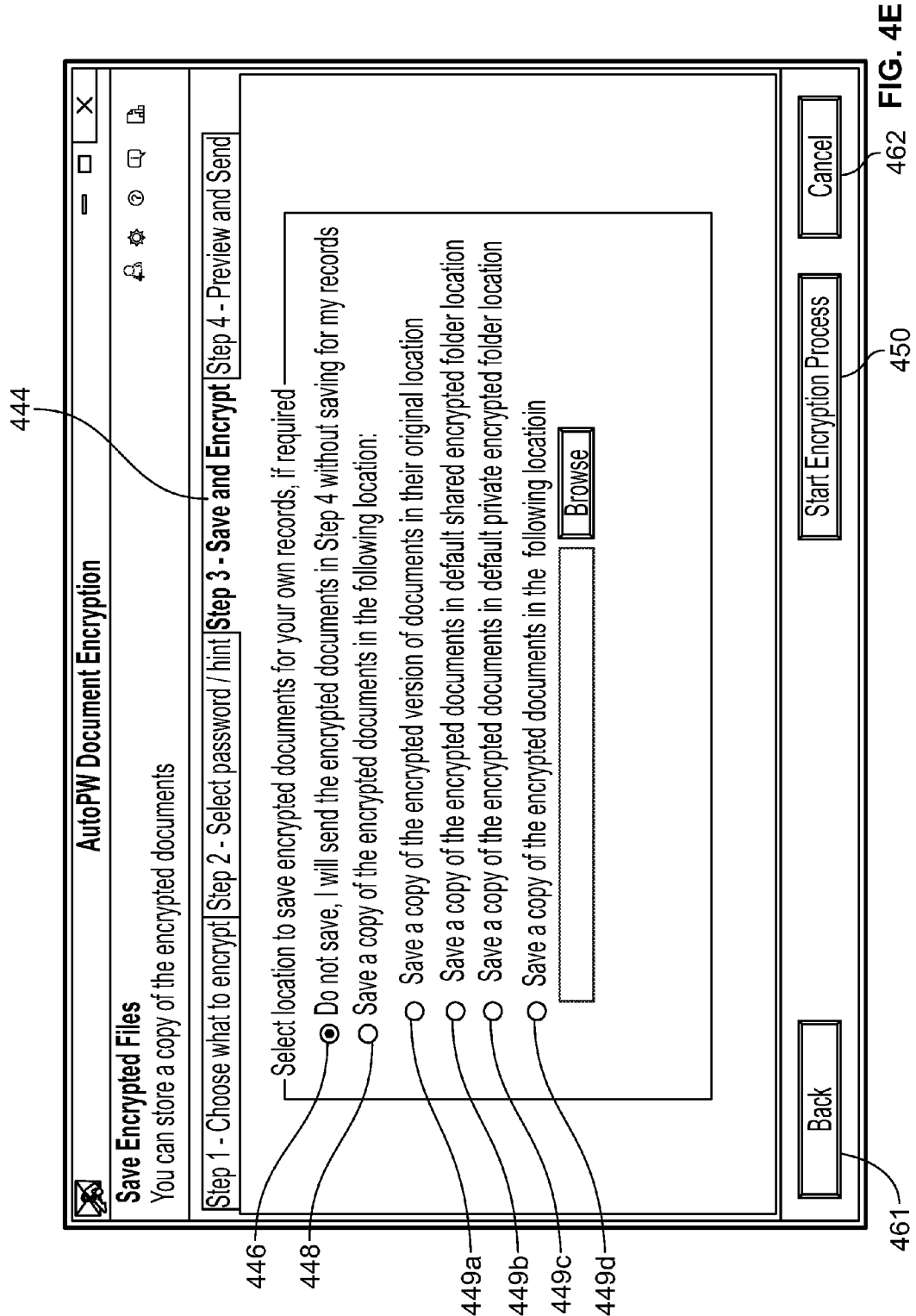
FIG. 4E illustrates an embodiment of an interface for enabling the user to select a file save option from a plurality of file save options.

Referring again to FIG. 3, after an encryption passcode has been chosen and set for decryption of the one or more files, the user is prompted to choose from a plurality of options to save the one or more encrypted files at step 340. Referring now to FIGS. 3 and 4E, at step 340 the user is presented with interface tab 444 (when the user clicks the 'continue' button 443 in tab 425 of FIG. 4C). The interface tab 444 presents a plurality of encrypted file saving options. Option 446 allows the user to not save the encrypted file(s)

and send the encrypted file to a recipient without saving the file for the user's own records. Option 448 allows the user to save the encrypted file(s) to a plurality of locations, in various embodiments, according to sub-options 449a-449d. Option 449a saves a copy of the encrypted file(s) in their respective original folders (on the user's computer or network) with or without new file names. Option 449b saves the encrypted file(s) in a preset default shared folder on the user's computer or network. Option 449c saves the encrypted file(s) in a default preset private folder on the user's computer or network. Option 449d saves the encrypted file(s) in a user specified location on the user's computer. In one embodiment, the new file name (of the encrypted file(s)) also comprises the passcode that is used to encrypt/decrypt the file(s). In one embodiment, the user is allowed to choose only one of the options 446 or 448. Clicking the 'cancel' button 462 enables the user to abort saving the encrypted file(s). A 'back' button 461 allows the user to return to tab 425 of step 330.

Figure 4F:
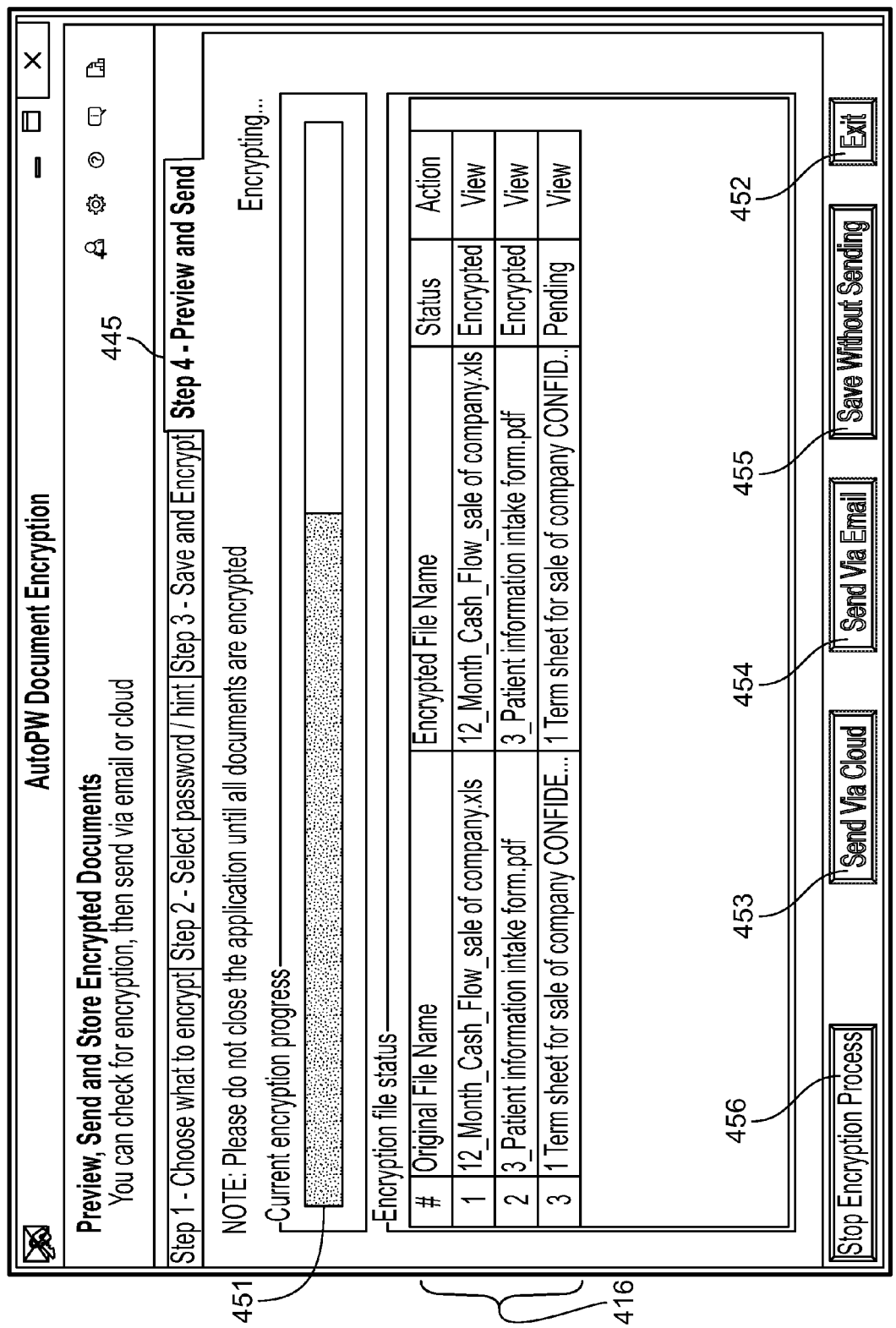
FIG. 4F illustrates an embodiment of an interface illustrating progress of encrypting one or more files.
Figure 4G:
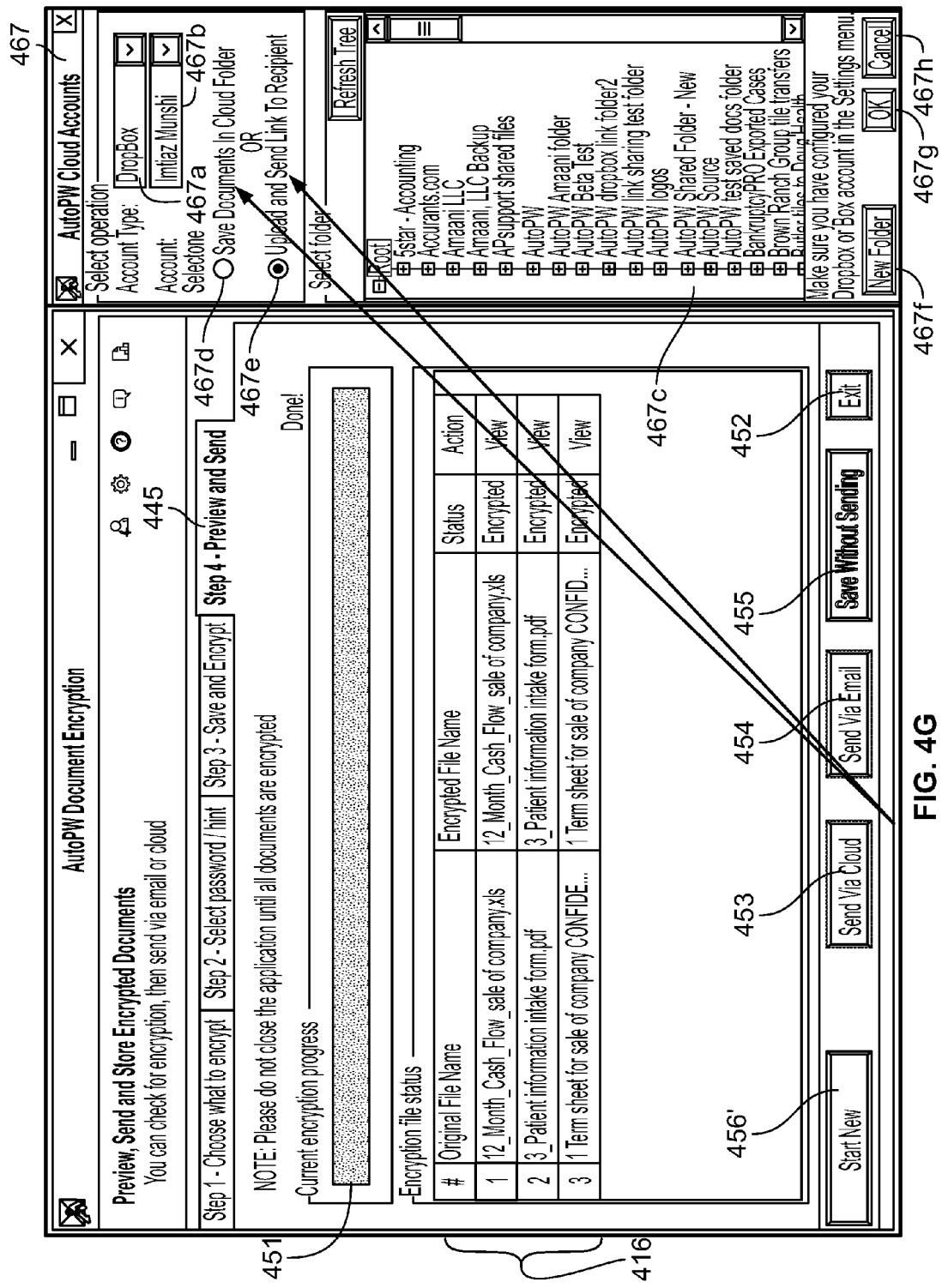
FIG. 4G illustrates the interface of FIG. 4F showing completion of encryption of one or more files and an embodiment of another interface invoked as a result of enabling a 'send via cloud' functionality.
Figure 4H:
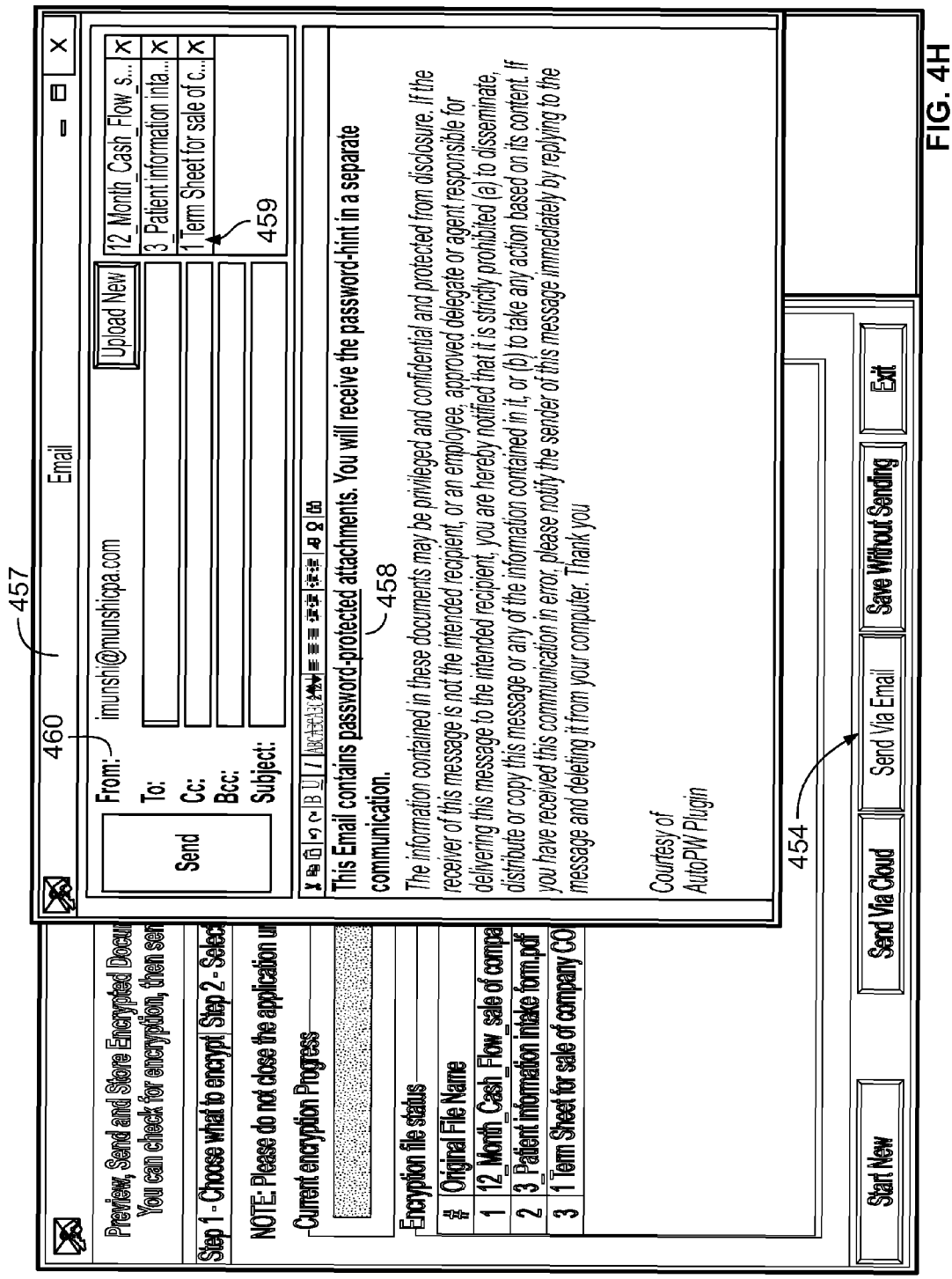
FIG. 4H illustrates an embodiment of an interface showing an automatically generated standard email to be sent with a plurality of encrypted files as attachments.
Figure 4I:
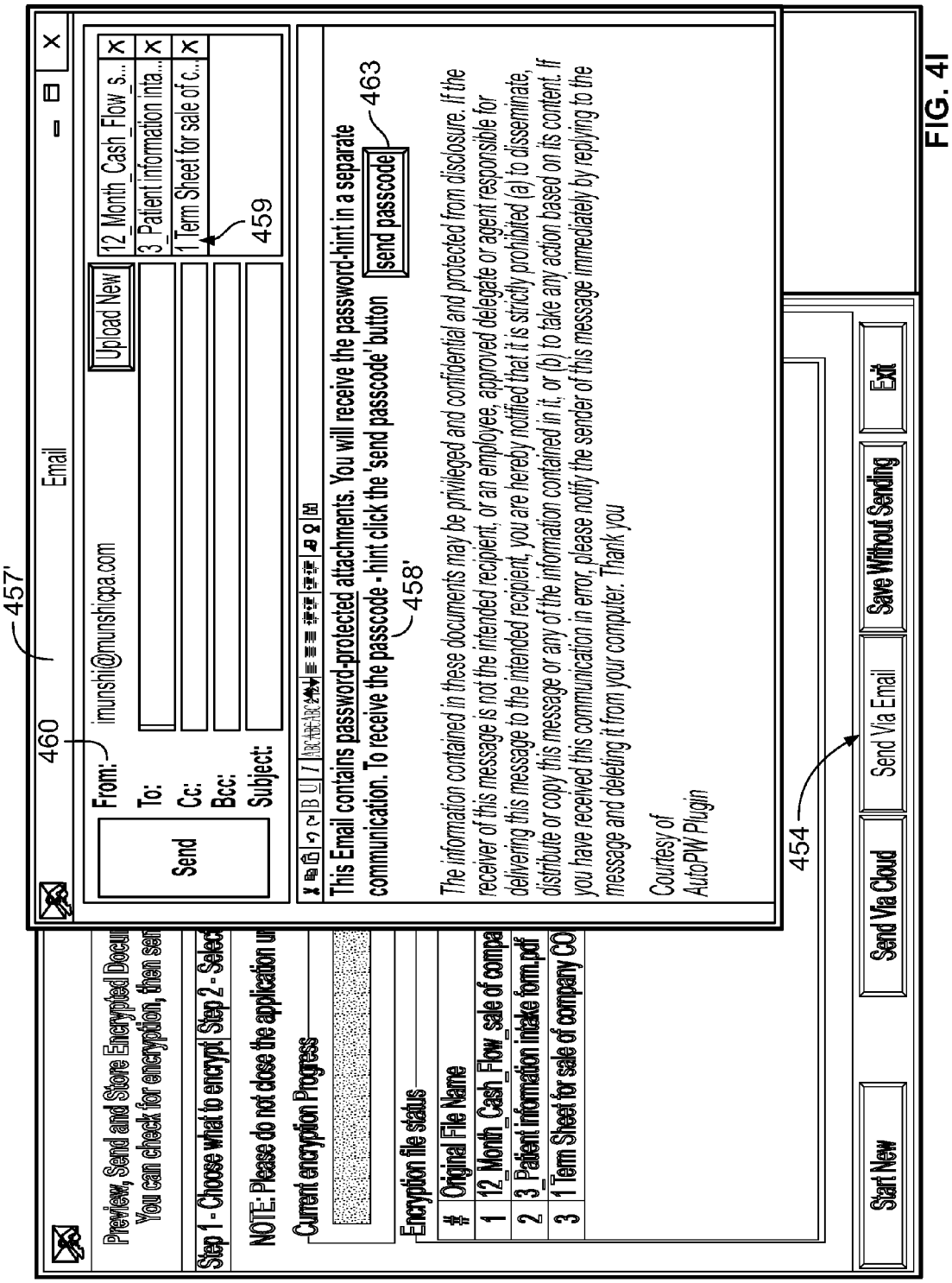
FIG. 4I illustrates an interface showing an automatically generated standard email to be sent with a plurality of encrypted files as attachments, in accordance with another embodiment.

Referring now to FIGS. 3, 4E and 4F, after an option to save (or not save) the one or more encrypted files has been chosen, the user begins the encryption process, at step 350, by clicking the button 'start encryption process' 450 and, as a result of which, the user, in one embodiment, is automatically taken to the next tab 445. Tab 445 allows the user to view, through a progress bar 451, how encryption process of his one or more files 416 is progressing. It should be appreciated that while the encryption is in progress buttons 'send via cloud' 453, 'send via email' 454, 'save without sending' 455 and 'exit' 452 remain disabled. The user can stop the in-progress encryption process by clicking the button 'stop encryption process' 456. If the user clicks button 456 it toggles to 'start now' functionality 456', as shown in FIG. 4G, to allow the user to resume encryption on clicking the button 456'. FIG. 4G illustrates the tab 445 with the progress bar 451 showing completion of encryption of the one or more files 416. On completion of encryption, buttons 453, 454 and 455 are automatically enabled. In accordance with an embodiment, as shown in FIG. 4G, the button 'save without sending' 455 is still disabled if the user chose option 446 of FIG. 4E (in the previous step 340). However, if the user chooses option 448 (in step 340) then the button 455 is enabled.

On completion of the encryption process, the user can now opt to perform any one of the steps described below.

At step 360, the user may save the one or more encrypted files and close the document encryption software application. In this scenario, the user intends to store the encrypted file(s) and, optionally, to subsequently attach and send the encrypted file(s) at a later time, manually, by attaching them to an email. It should be appreciated that in this scenario, in accordance with an embodiment, the encrypted file(s) are saved, in step 340, using option 448 (and thereafter any of the options 449a through 449d of FIG. 4E) wherein, in accordance with one embodiment, a new file name of the encrypted file(s) comprises the passcode to encrypt/decrypt the file(s), thereby obviating a need to transmit a second email comprising the passcode. Step 360 is effectuated by clicking the 'save without sending' button 455 followed by the 'exit' button 452 on tab 445 of FIG. 4G. Thereafter optionally, at step 365, the user can, manually, either open a default email client application installed on his computer or open his webmail (or web-based email) implemented as a web application and typically accessed via a web browser, compose the email, attach the saved encrypted file(s) (from step 360), the file name(s) of which optionally include the passcode to decrypt/encrypt, and send to intended recipients.

At step 370, the user may save the one or more encrypted files and automatically send the encrypted file(s) as attachments via an editable standard first email, followed by optionally sending an automatically generated, yet editable, second email comprising the decryption passcode or hint associated with the decryption passcode. Step 370 is effectuated by clicking the 'send via email' button 454 on tab 445 of FIG. 4G. The user can select the 'on' radio button 469g of FIG. 4N, to enable the functionality of sending a passcode notification automatically via the second email. When the user selects the 'on' button 469g, the radio buttons 469l are automatically set to 'off'. Referring now to FIGS. 3, 4G, 4H and 4J at step 370, clicking the 'send via email' button 454 enables sending an email with attached encrypted file(s) using the user's webmail account (or web-based email account) pre-registered/pre-configured with the document encryption software application. Thus, a standard email interface 457 is displayed, which shows the body of the first email with the encrypted file(s) 459 attached thereto, to which the user can then add or edit text and send the message when ready. In one embodiment, a standard paragraph/line 458 is automatically added explaining that the email attachment is encrypted in accordance with the firm's Privacy Policy, referring to one or more guidelines, rules, or other standards with which the email complies and also indicating that the decryption passcode hint for the encrypted file attachment(s) will be sent in a second email. In one embodiment, the standard paragraph/line 458 is editable. In another embodiment, the user is unable to edit the standard paragraph/line 458. The email interface 457 automatically presents the user's webmail address (pre-registered/pre-configured with the document encryption software application) in the 'from' credential 460. In one embodiment, the user is prompted to manually add at least one recipient's email address to the first email. Once the user clicks the send button on the email interface, the document encryption software application automatically generates a second email with the same subject as in the original email but preceded by a passcode notification, wherein the passcode hint associated with the decryption passcode is listed in the text of the email and the email, in one embodiment, is automatically sent to one or more of the email addresses that were included on the original email (including cc's and bcc's).

Figure 5A:
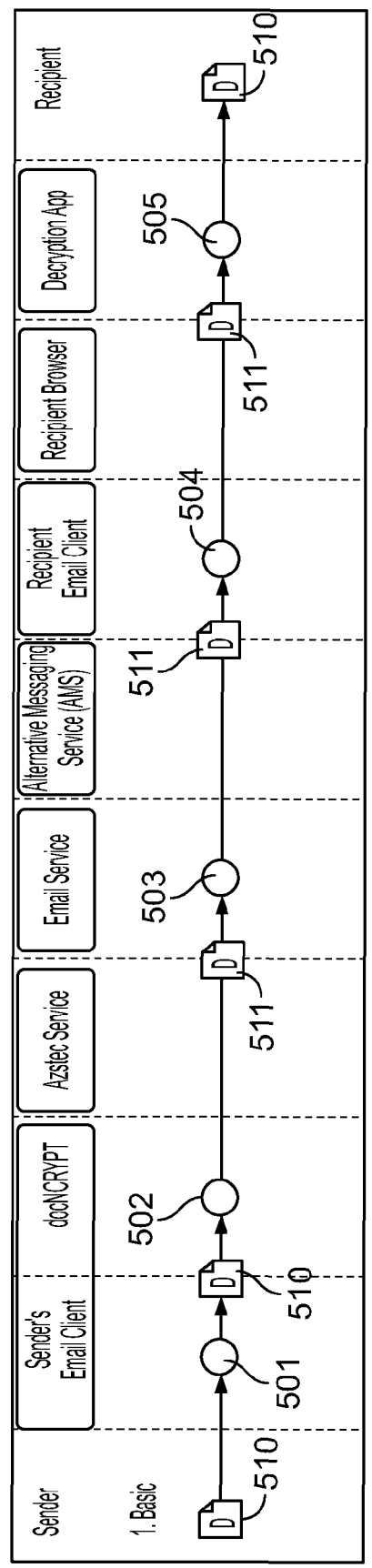
FIG. 5A is a flow diagram illustrating an exemplary process for transmission of encrypted files, in accordance with an embodiment.

FIG. 5A is a flow diagram illustrating an exemplary process control flow associated with step 370 of FIG. 3 and wherein the user opts for not sending a second email, containing the passcode or passcode hint, automatically. Referring to FIG. 5A, a user prompts his email client application 501 to invoke the document encryption software application 502, of the present specification, that enables encryption of original content 510 (such as one or more files) to generate encrypted content 511 (such as one or more encrypted files). The encrypted content 511 is attached to an automatically generated standard first email (whose original email body may be optionally encrypted and attached as per steps 135, 145 and 155 of FIG. 1B) that is routed by an SMTP (Simple Mail Transfer Protocol) server 503 to a recipient's email client application 504.

Figure 5B:
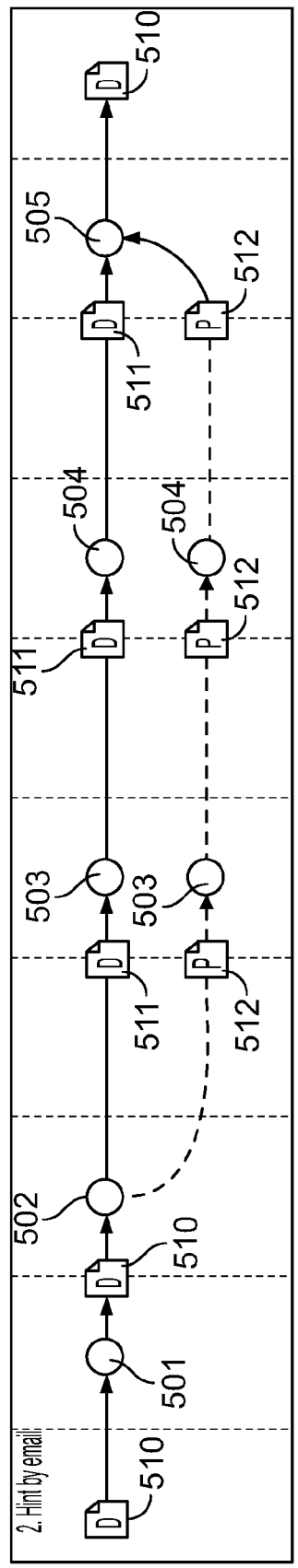
FIG. 5B is a flow diagram illustrating an exemplary process for transmission of both encrypted files and corresponding passcode hint to decrypt the encrypted files, in accordance with an embodiment.

FIG. 5B is a flow diagram illustrating an exemplary process control flow associated with step 370 of FIG. 3 and wherein the user opts for sending a second email, containing the passcode or passcode hint, automatically. Referring to FIG. 5B, a user prompts his email client application 501 to invoke the document encryption software application 502, of the present specification, that enables encryption of original content 510 (such as one or more files) to generate encrypted content 511 (such as one or more encrypted files).

The encrypted content 511 is attached to an automatically generated standard first email (whose original email body may be optionally encrypted and attached as per steps 135, 145 and 155 of FIG. 1B) that is routed by an SMTP (Simple Mail Transfer Protocol) server 503 to a recipient's email client application 504. Simultaneously, the document encryption software application 502 also automatically generates and sends a second email including a passcode hint 512 (which, in an embodiment, is unencrypted). The second email is also routed by the SMTP server 503 to the recipient's email client application 504. The recipient then uses the passcode hint 512 and a decryption service 505 to decrypt the encrypted content 511 and obtain the original content 510. In various embodiments, the decryption service 505 is a native application of the same type that was used to encrypt the original content 510.

Figure 5C:
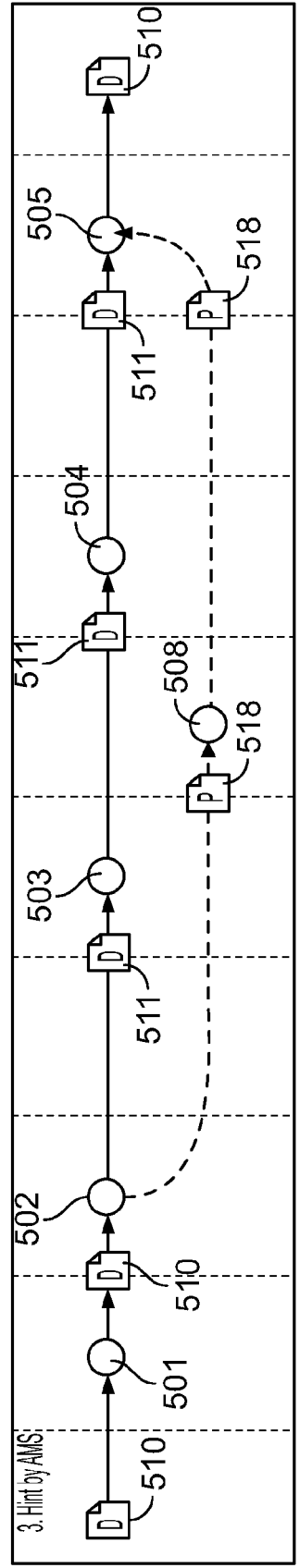
FIG. 5C is a flow diagram illustrating another exemplary process for transmission of encrypted files and passcode hint to decrypt the encrypted files, in accordance with an embodiment.

FIG. 5C is a flow diagram illustrating another exemplary process control flow associated with step 370 of FIG. 3. Referring to FIG. 5C, the user prompts his email client application 501 to invoke the document encryption software application 502, that enables encryption of original content 510 (such as one or more files) to generate encrypted content 511 (such as one or more encrypted files). The encrypted content 511 is attached to an automatically generated standard first email (whose original email body may be optionally encrypted and attached as per steps 135, 145 and 155 of FIG. 1B) that is routed by an SMTP (Simple Mail Transfer Protocol) server 503 to the recipient's email client application 504. Simultaneously, the document encryption software application 502 also automatically generates a message 518 including the passcode hint (unencrypted) and forwards it to a messaging service 508. The messaging service 508, in various embodiments, is an SMS messaging service, an email service or an instant messenger service, for example. The messaging service 508 sends the message 518 to the recipient's phone number, in the form of a SMS text message, for example, in one embodiment (in alternate embodiments, the message 518 may be sent as an email or an instant message, for example). The recipient then uses the passcode hint, included in the message 518, and a decryption service 505 to decrypt the encrypted content 511 to obtain the original content 510. In various embodiments, the decryption service 505 is a native application of the same type that was used to encrypt the original content 510.

Figure 4J:
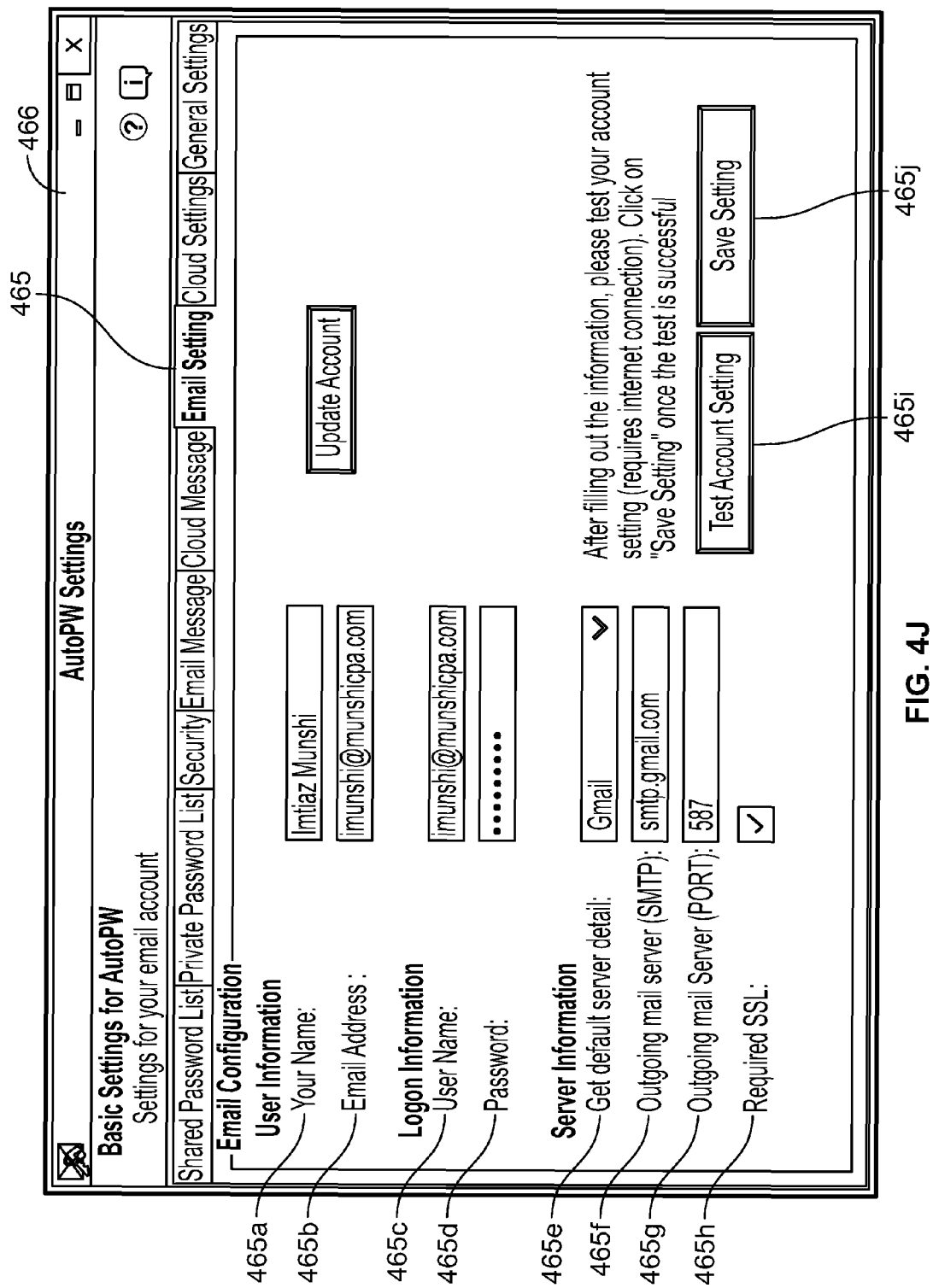
FIG. 4J illustrates an embodiment of an email settings interface for registering/configuring a plurality of webmail accounts.

In some embodiments, the encrypted content 511 in FIGS. 5A through 5C are not sent as attachments to the standard first email. Instead, in alternate embodiments, the first email includes a separate URI link (such as to a webpage or a Dropbox link) to access the encrypted file(s) as per step 380 of FIG. 3. Referring back to FIG. 3, in one embodiment, the user is prompted to delete any email addresses that the user does not want to notify of the passcode. In another embodiment, the user is prompted to change any email address (for example if the user wishes to send the passcode notification to an alternate email address belonging to the recipient for added security). It should be appreciated that, in some embodiments, the alternate email address of the recipient is pre-stored in memory from where the user could just select the alternate email address. However, in some alternate embodiments, the user designates the alternate email address on-the-fly and thereafter associates the alternate email address with the recipient's primary email address and stores the association. In still further embodiments, the email addresses of recipients of the original/first email are not auto-populated and the user needs to input them manually. It should be noted that the user's webmail account is pre-configured/pre-registered by allowing the user to provide a plurality of accessibility details/credentials of the webmail in a 'settings' interface of the document encryption software. FIG. 4J shows the email setting tab 465 of a settings interface 466 in accordance with an embodiment. The email setting tab 465 allows the user to register/configure webmail account details such as the user's name 465a, webmail address 465b, user name 465c, passcode 465d, a plurality of webmail server information such as the webmail server detail 465e, outgoing webmail server (SMTP) 465f, outgoing mail server port 465g and an indication 465h if SSL security is to be enabled. In an embodiment, standard outgoing mail server (SMTP) and port credentials used by a plurality of popular/major webmail providers (such as Gmail, Yahoo, Outlook, Office 365, Hotmail, etc.) are pre-configured. The user can also manually enter the webmail server and port information for a specific webmail provider. The tab 465 also enables the user to test and thereafter save the webmail account settings using buttons 465i and 465j respectively. Once the first and second emails have been sent the user can exit the document encryption software by clicking the 'exit' button 452, at step 375. In one embodiment, the user is presented with an option whereby the transmission of the decrypting passcode can be sent before or after the transmission of the email with encrypted attachment.

Figure 4K:
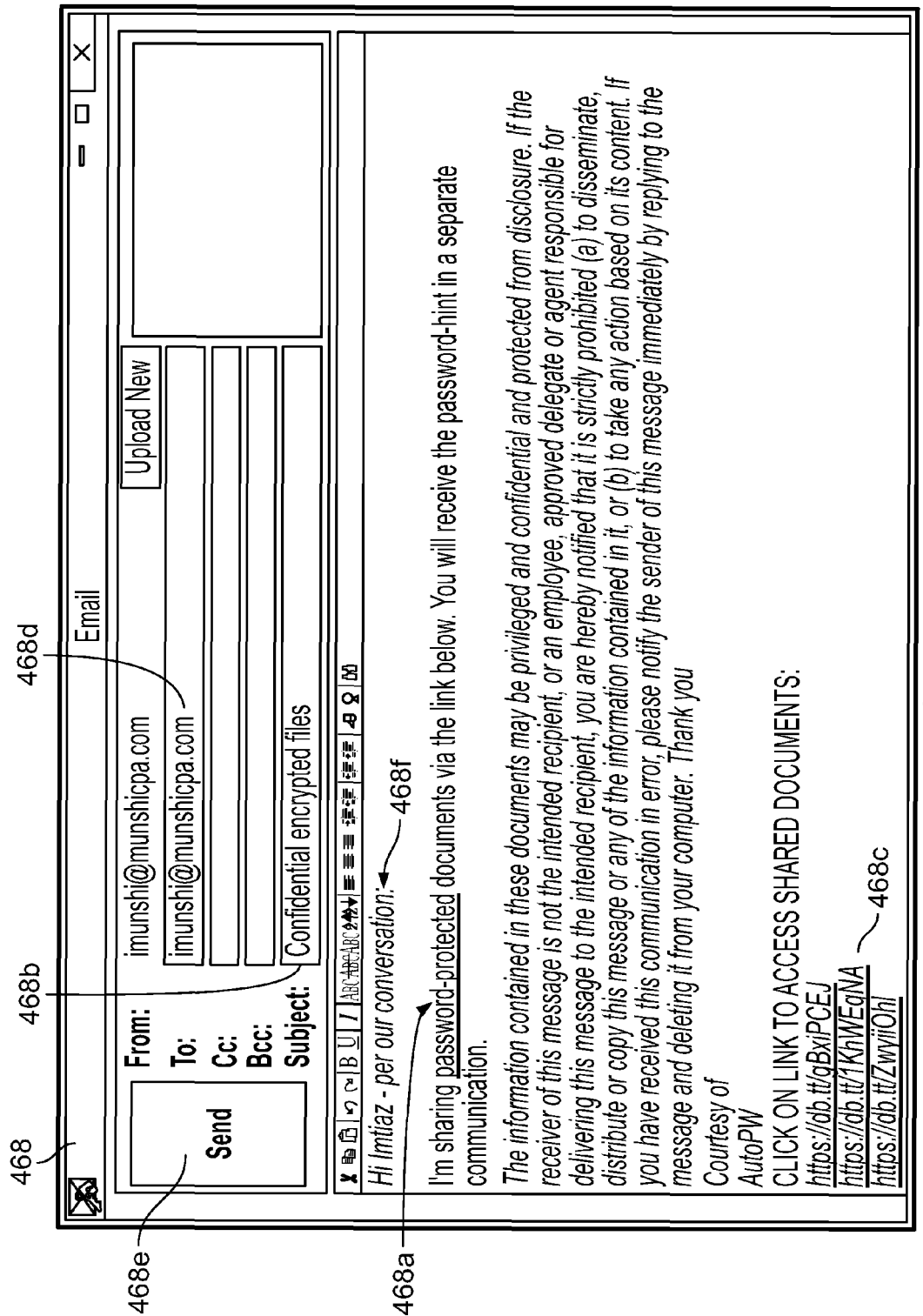
FIG. 4K illustrates an embodiment of an interface showing an automatically generated standard email to be sent with a plurality of uniform resource identifiers to encrypted files saved/uploaded to an Internet/cloud based file hosting service.

At step 380, the user can either save the one or more encrypted files to the user's Dropbox folder on his computer or upload the one or more encrypted files to the user's web based Dropbox account and optionally auto-send a Uniform Resource Identifier (URI) to the encrypted file(s) in Dropbox via an automatically generated editable standard first email, followed by an automatically generated, yet editable, second email comprising the decryption passcode or hint associated with the encryption passcode. In some embodiments, the user can also enable appending a date and time stamp to the name(s) of the encrypted file(s) saved in the Dropbox folder. Persons of ordinary skill in the art should appreciate that while step 380 is being described using Dropbox, any other Internet/Cloud based file hosting service similar to Dropbox, such as, but not limited to, Box.Net, can be employed. Referring now to FIGS. 3, 4G, and 4K, step 380 is effectuated by clicking the 'Send Via Cloud' button 453 on tab 445 of FIG. 4G. The user can select the 'on' radio button 469g of FIG. 4N, to enable the functionality of sending a passcode notification automatically via the second email. When the user selects the 'on' button 469g, the radio buttons 469l are automatically set to 'off'. At step 380, clicking the 'Send Via Cloud' button 453 opens a cloud management interface 467 allowing the user to select a cloud service from an account list 467a of cloud service accounts pre-registered/pre-configured with the document encryption software application. Once the user selects a cloud service account from the list 467a, such as Dropbox, the user's pre-configured account credential 467b and an instance 467c of his Dropbox folders are automatically displayed. The interface 467 also provides two radio buttons 467d, 467e to enable the user to select from a first option (467d) to upload one or more encrypted files to the user's Dropbox folder (by direct/instant upload to the user's web based Dropbox account) or a second option (467e) to upload the one or more encrypted files to the user's web based Dropbox account and auto-send a URI to the encrypted file(s) in Dropbox via an automatically generated editable standard first email, followed by an automatically generated, second email comprising the decryption passcode or hint associated with the passcode. The user selects an existing folder from the displayed folders instance 467c or creates a new folder within the Dropbox folder, using button 467*f*, to upload the encrypted file(s) therein. Once the user has accomplished tasks related to either one of the first or second options, he can click the 'ok' button 467*g*. The user can abort the 'Send Via Cloud' functionality any time by clicking the 'cancel' button 467*h*.

It should be noted that, in accordance with an embodiment, when the ' Send Via Cloud' button 453 is clicked (with reference to step 380) the save option chosen in step 340 (from the file save options 446, 448 and 449*a* through 449*d* of FIG. 4E) is also employed in addition to saving the encrypted files(s) by direct upload to the user's web based Dropbox account. One of ordinary skill in the art would appreciate that the file save option chosen under 448 and 449*a* through 449*d* could enable saving the encrypted file(s) in the user's Dropbox folder on his computer for subsequent upload to the user's Dropbox account using the synchronization functionality whereby the user would subsequently be able to manually generate a Uniform Resource Identifier (URI) to the encrypted file(s) for manual transmission to a recipient via email.

It should be appreciated that upon uploading the encrypted file(s) directly to the user's web-based Dropbox account, the process enables a URI to the encrypted files(s) on Dropbox to be established/generated. Once this process is complete, the document encryption software invokes a standard email interface 468 (FIG. 4K) with a predefined, yet editable, standard email body message 468*a*, subject 468*b* and the Dropbox URI(s) 468*c* to the encrypted file(s). The user inputs recipients in the address box 468*d*, edits the subject and the standard email body 468*a* and 468*f*, if needed, and sends (by clicking the 'send' button 468*e*) the email comprising the URI(s) 468*c*. In another embodiment, the standard email body message 468*a* is not editable. In accordance with an embodiment, the email with URI(s) 468*c* is sent using the user's webmail account pre-registered/pre-configured with the document encryption software application as described earlier with reference to FIG. 4J.

Figure 4L:
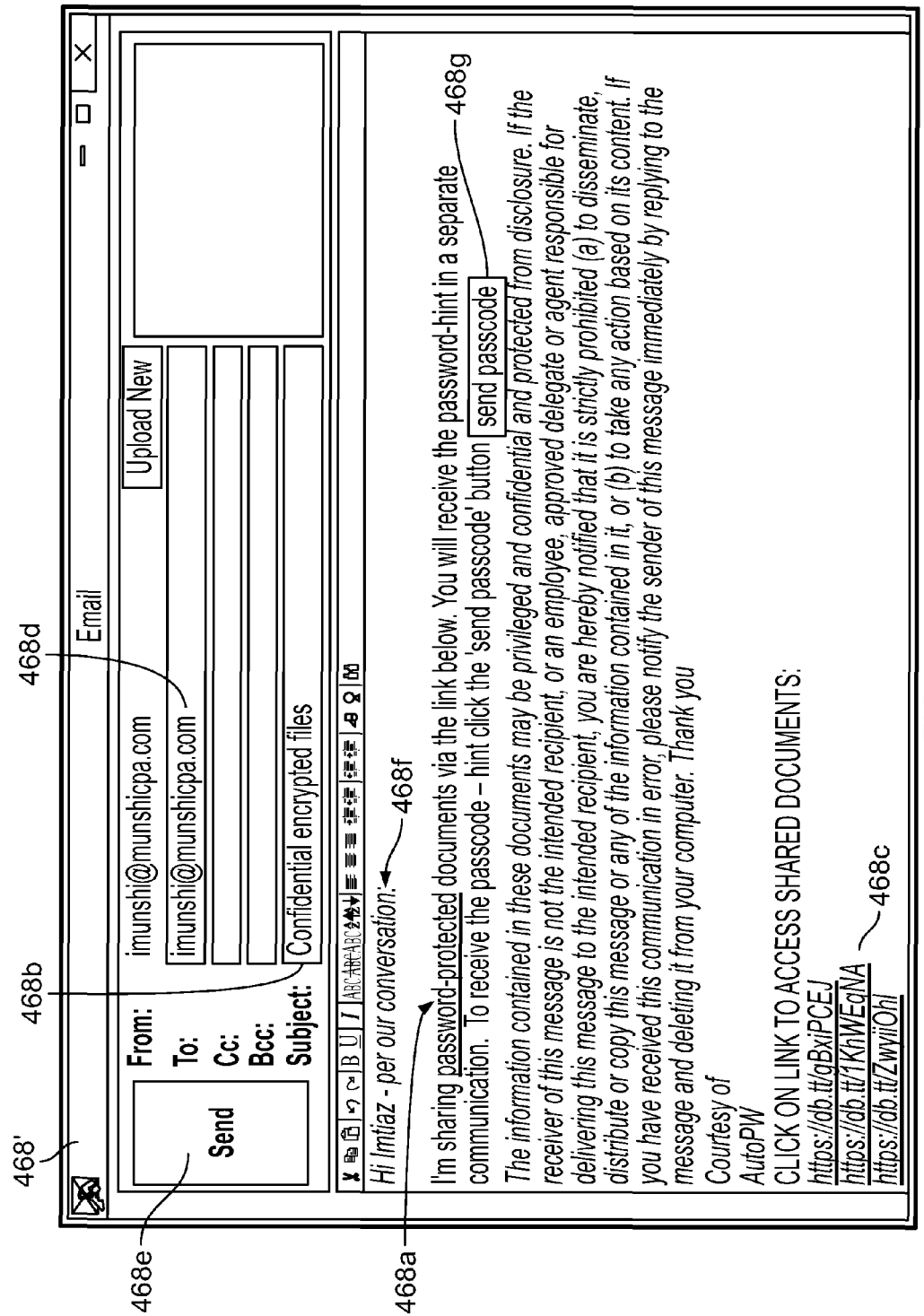
FIG. 4L illustrates an interface showing an automatically generated standard email to be sent with a plurality of uniform resource identifiers to encrypted files saved/uploaded to an Internet/cloud based file hosting service, in accordance with another embodiment.
Figure 4M:
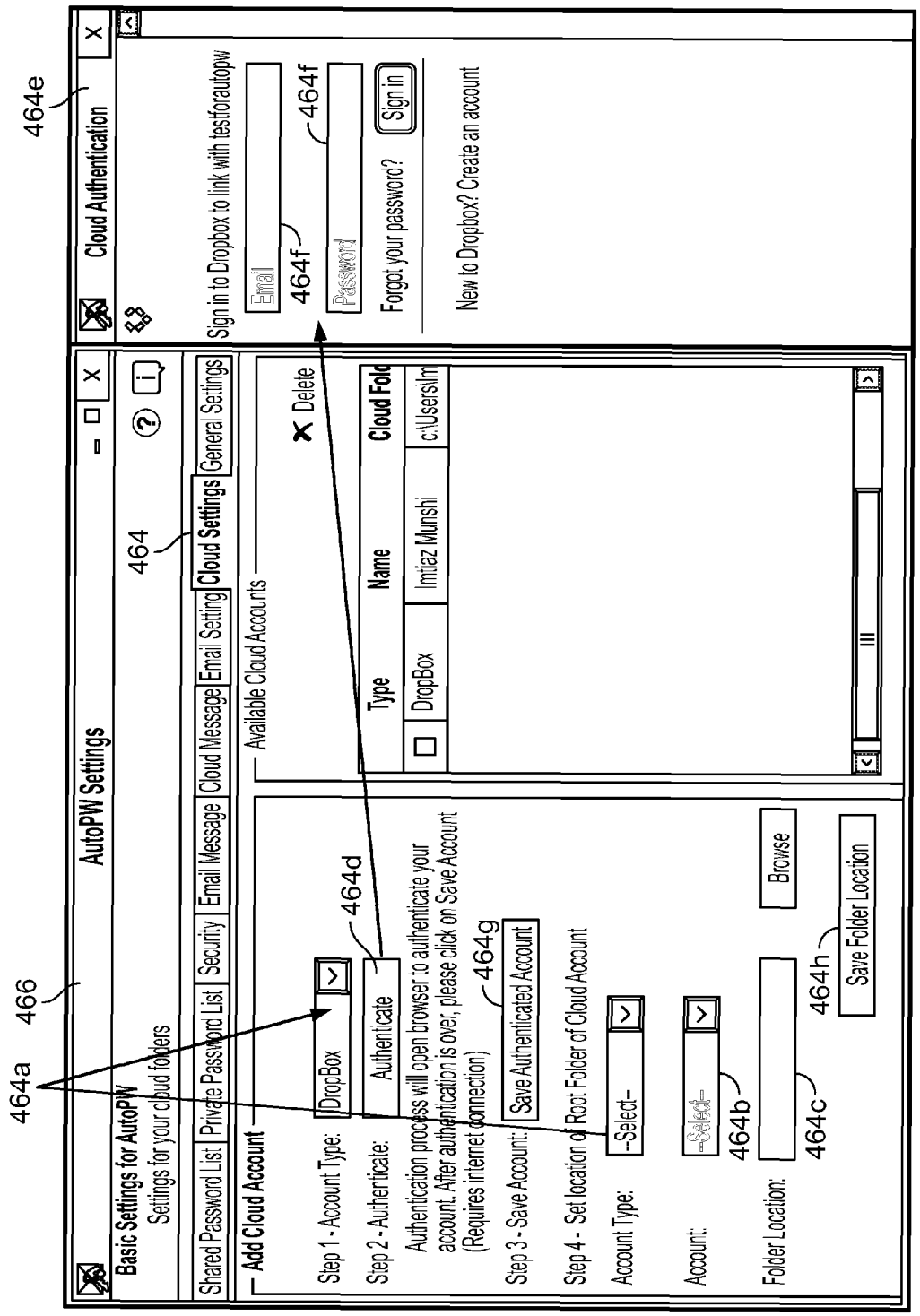
FIG. 4M illustrates an embodiment of an interface for registering/configuring a plurality of cloud accounts.

FIG. 4M shows the cloud settings tab 464 of the settings interface 466 in accordance with an embodiment. The cloud settings tab 464 allows the user to register/configure cloud account details such as the cloud service 464*a*, user's cloud account credential (such as the user's name) 464*b*, and path 464*c* to the location of the cloud folder (e.g., Dropbox) locally installed on the user's computer. Once inputting the cloud service 464*a*, the user clicks the 'authenticate' button 464*d* that opens a web interface 464*e* where the user signs-in to his cloud account by inputting his username and passcode 464*f*, thereby authenticating his cloud account. Once successfully signed-in and, therefore, authenticated the user clicks the button 464*g* to save his authenticated cloud account. Similarly, clicking the button 464*h* causes the path setting 464*c* to be saved.

After sending the Dropbox email comprising the Dropbox URI of the encrypted files, the document encryption software sends a second email comprising the decryption passcode. The second email is automatically generated, in one embodiment, by invoking the user's webmail. In accordance with an embodiment, the document encryption software application causes the user's webmail to automatically generate the second email with the same subject as in the original email but preceded by a passcode notification, wherein the passcode is listed in the text of the email. The second email, in one embodiment, is automatically sent to one or more of the email addresses that were included on the original/first/Dropbox email (including cc's and bcc's). In one embodiment, the user is prompted to delete any email addresses that the user does not want to notify of the passcode. In another embodiment, the user is prompted to change any email address (for example if the user wishes to send the passcode notification to an alternate email address belonging to the recipient for added security). In still further embodiments, the email addresses of recipients of the original/first email are not auto-populated and the user needs to input them manually. In one embodiment, the user is presented with an option whereby the transmission of the decrypting passcode can be sent before the transmission of the email with encrypted attachment. Once the first and second emails have been sent, the user returns to interface tab 445 of FIG. 4G where he can exit the document encryption software by clicking the 'exit' button 452, at step 385.

Figure 4N:
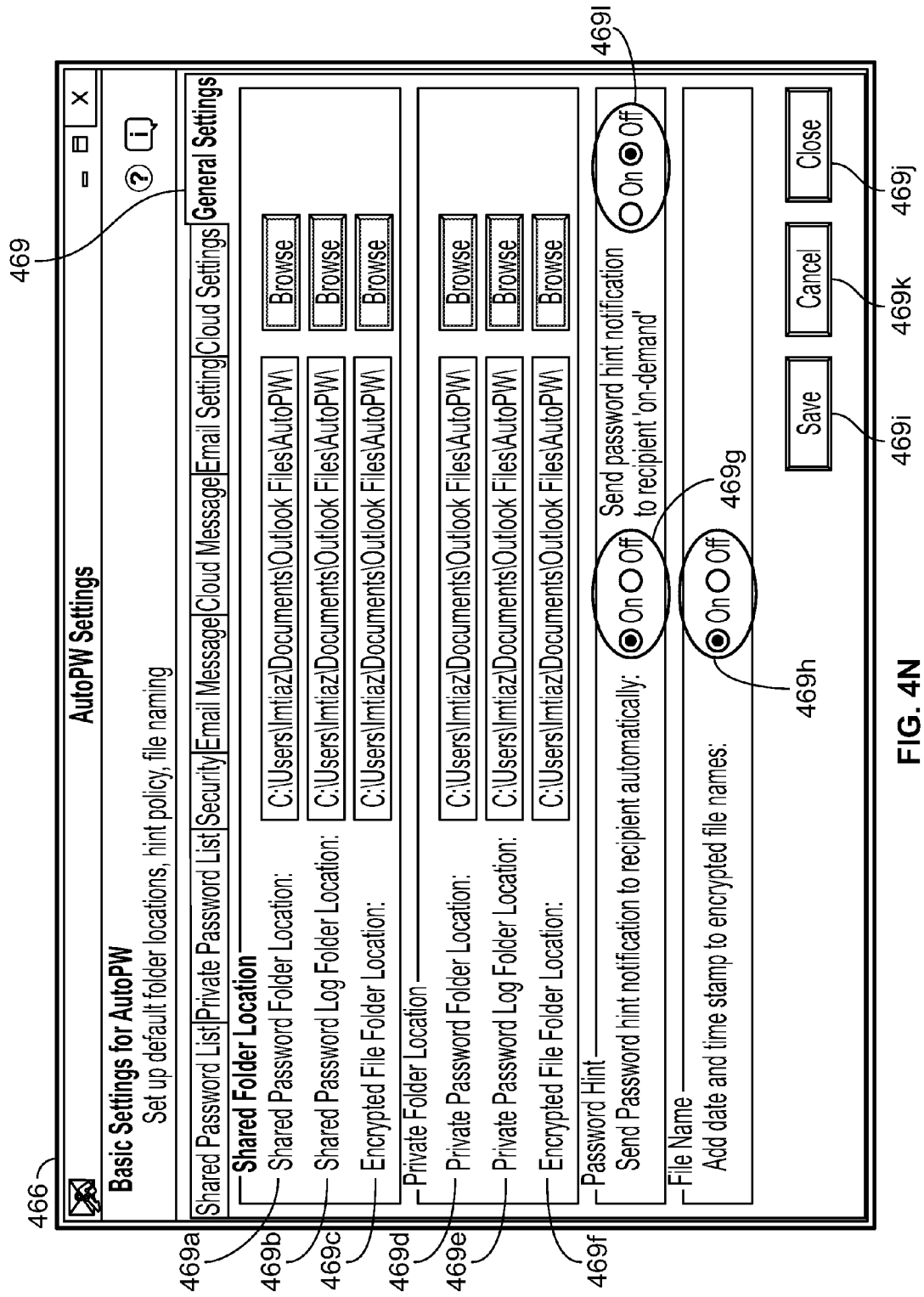
FIG. 4N illustrates an embodiment of an interface for registering/configuring a plurality of general parameters.

At step 390, the user can save the one or more encrypted files and automatically send the encrypted file(s) as attachments via an editable standard first email. However, in contrast to step 370, at step 390 the decryption passcode or hint associated with the decryption passcode is communicated to the recipient(s) only on demand by the recipient(s). In other words, a communique, comprising the decryption passcode or hint, is automatically generated and sent to the recipient(s) only when the recipient(s) expressly requests that the passcode (or hint) be sent to the recipient(s). Step 390 is effectuated by clicking the 'send via email' button 454 on tab 445 of FIG. 4G. However, the functionality of step 390 may be, in an embodiment, enabled through the 'settings' interface 466 of FIG. 4N. As shown in FIG. 4N, to enable step 390 the user selects the 'on' radio button 469*l* to enable sending a passcode notification automatically 'on demand' by the recipient(s). It should be appreciated that if the user selects the 'on' radio button 469*l*, the radio buttons 469*g* are automatically set to 'off'—that is, the option (of step 370) to automatically and compulsorily send the passcode hint notification to the recipient(s) is disabled. Referring now to FIGS. 3, 4G, 4I and 4J at step 390, clicking the 'send via email' button 454 enables sending an email with attached encrypted file(s) using the user's webmail account (or web-based email account) pre-registered/pre-configured with the document encryption software application. Thus, a standard email interface 457' is displayed, which shows the body of the first email with the encrypted file(s) 459 attached thereto, to which the user can then add or edit text and send the message when ready. In one embodiment, a standard paragraph/line 458' is automatically added explaining that the email attachment is encrypted in accordance with the firm's Privacy Policy, referring to one or more guidelines, rules, or other standards with which the email complies and also indicating that, to receive the decryption passcode hint for the encrypted file attachment(s), the recipient must click a 'send passcode' button or link 463 included within the email 457'. In one embodiment, the standard paragraph/line 458' is editable. In another embodiment, the user is unable to edit the standard paragraph/line 458'. The email interface 457' automatically presents the user's webmail address (pre-registered/pre-configured with the document encryption software application) in the 'from' credential 460. In one embodiment, the user is prompted to manually add at least one recipient's email address to the first email. Once the user clicks the send button on the email interface, the document encryption software application causes the email 457' (with the encrypted attachment(s)) to be sent to one or more recipient email addresses populated by the user in the 'To', 'cc' and/or 'bcc' boxes of the email 457'.

When a recipient receives the email 457', the recipient may request the passcode or associated hint by clicking the 'send passcode' button 463 embedded in the email 457'. In one embodiment, the 'send passcode' button or link 463 is hyperlinked (using a URI) to a Dropbox passcode file (or a passcode file uploaded to any Internet/cloud-based hosting service known to persons of ordinary skill in the art) comprising the decryption passcode or hint. The Dropbox file may be any format such as, but not limited to, MS Word, Notepad, and/or webpage. In this embodiment, the document encryption software application, automatically creates the passcode file, uploads it to Dropbox and embeds or associates the Dropbox URI to the passcode file with the 'send passcode' button 463 before dispatching the first email 457' (to the one or more recipients). In another embodiment, the 'send passcode' button 463 is hyperlinked (using the URI) to a passcode webpage, hosted on a secure web server, comprising the decryption passcode or hint. In this embodiment, the document encryption software application, automatically creates the passcode webpage, uploads it to the secure web server and embeds or associates the URI to the passcode webpage with the 'send passcode' button 463 before dispatching the first email 457' (to the one or more recipients). In some embodiments, the passcode webpage resides on the document encryption software application provider's server. In other embodiments, the passcode webpage resides on the sender's server.

In another embodiment, when a recipient clicks the 'send passcode' button 463 an auto-generated passcode request email, with a standard subject line, such as for example, 'send passcode', is automatically sent from the recipient's email to the sender's email address (available in the 'From' credential 460 of the email 457'). The document encryption software application of the sender, on receipt of the passcode request email from the recipient, automatically generates a second email with, in one embodiment, the same subject as in the original first email but preceded by a passcode notification, wherein the passcode hint associated with the decryption passcode is listed in the text of the email and the email, in one embodiment, is automatically sent to the recipient from whom the passcode request email was received. In some embodiments, the document encryption software application of the sender receives the passcode request email from the recipient after a period of time compared to a time when the first email 457' is transmitted. In various embodiments, the period of time ranges from 1 minute to several years, and any increment therein, based on the point(s) in time when the recipient activates the 'send passcode' button 463. In other embodiments, the period of time ranges from 1, 2, 3, 4, and up to 5 minutes, and any increment therein. In other embodiments, the period of time is at least five minutes and any increment therein. In another embodiment, the decryption passcode or the passcode hint associated with the decryption passcode is sent as a file attachment to the second email Alternatively, instead of including the decryption passcode or hint as text or as file attachment in the second email, a Uniform Resource Identifier (URI) to a Dropbox passcode file (comprising the decryption passcode or hint) or to a passcode webpage is embedded within the second email. In an embodiment, the second email is sent automatically to an alternate recipient email address. In an embodiment, the user is prompted to change any email address (for example if the user wishes to send the passcode notification to an alternate email address belonging to the recipient for added security). In other embodiments, the email address of the recipient, from whom the passcode request email was received, is not auto-populated and the user needs to input it manually and thereafter send the second email manually.

In yet another embodiment, when a recipient clicks the 'send passcode' button 463 an auto-generated passcode request email, with a standard subject line, such as for example, 'send passcode', is automatically sent from the recipient's email to the sender's email address (available in the 'From' credential 460 of the email 457'). The document encryption software application of the sender, on receipt of the passcode request email from the recipient, automatically generates an SMS and automatically sends the SMS to the recipient's mobile telephone number pre-registered or pre-configured with the document encryption software application. The SMS, in one embodiment, is a text message including the decryption passcode or hint. In another embodiment, the SMS text message includes the decryption passcode (or hint) and/or the Uniform Resource Identifier (URI) to the Dropbox passcode file (comprising the decryption passcode or hint) or to the passcode webpage. Still alternatively, the encrypted files are not sent as attachments to the standard first email. Instead, the first email includes only the 'send passcode' button 463 to request both the passcode hint as well as the encrypted files. In such embodiments, the SMS message includes the decryption passcode (or hyperlink to the Dropbox passcode file) along with a URI link (such as to a webpage or a Dropbox link) to access the encrypted file(s).

In yet another embodiment, when a recipient clicks the 'send passcode' button 463 a call (such as a Voice Over Internet Protocol) is automatically initiated to a web service in either the document encryption software application provider's server or in the sender's server which then responds by transmitting the decryption passcode or hint via a second email or an SMS text message.

In still another embodiment, both—the second email as well as an SMS text message are sent automatically to the recipient on receipt of the passcode request email from the recipient. The second email and the SMS text message may together provide a combination of the following: decryption passcode or hint embedded as text or as a file attachment to the second email, URI link to the Dropbox passcode file or to the passcode webpage. Once the first and second emails have been sent the user can exit the document encryption software by clicking the 'exit' button 452 of FIG. 4G, at step 391.

In various alternate embodiments, the encrypted files are not sent as attachments to the standard first email. Instead, the first email includes only the 'send passcode' button 463 to request both the passcode hint as well as the encrypted files. Therefore, in some embodiments, when the user clicks the 'send passcode' button 463 and sends the passcode request email, the document encryption application sends the encrypted files as attachments to the second email that also contains the passcode hint. Alternately, the second email includes the passcode hint while a third email includes the encrypted files as attachments.

Figure 6A:
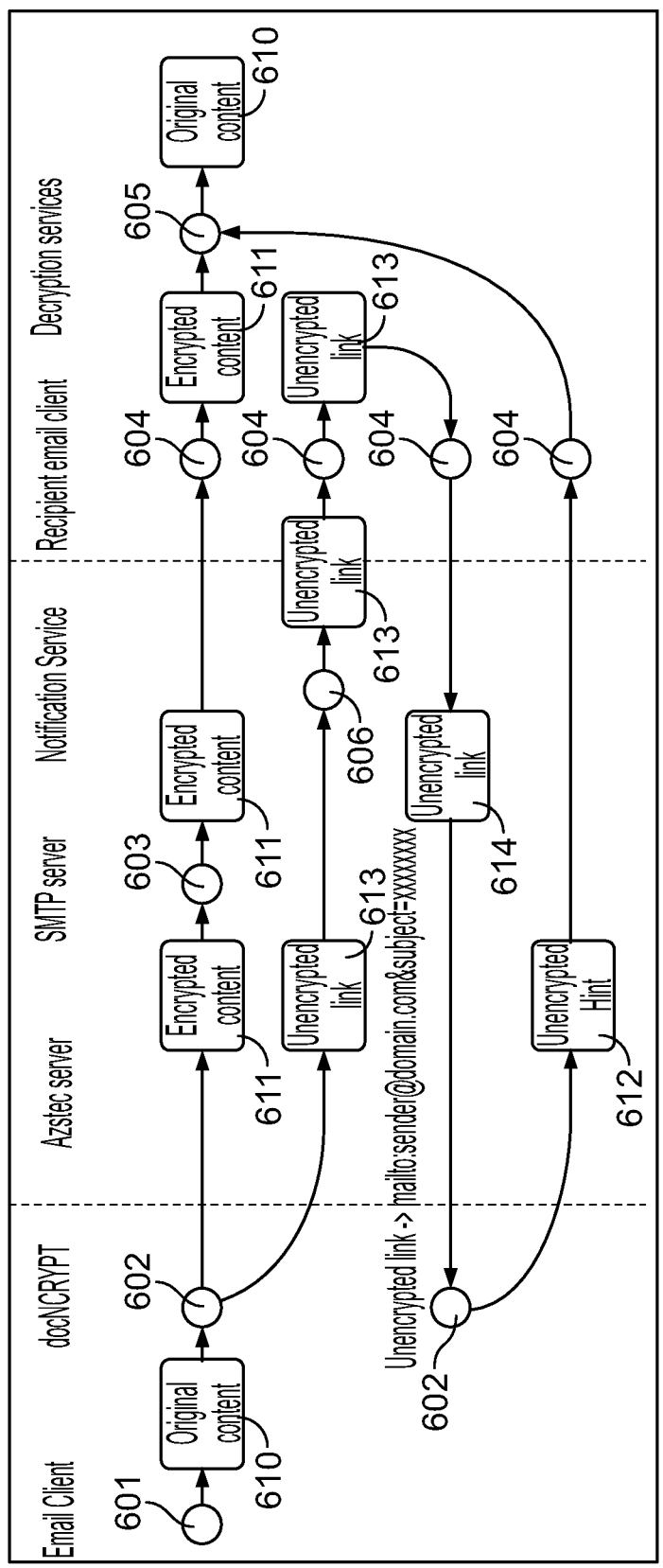
FIG. 6A is a flow diagram illustrating an exemplary process control for transmission of encrypted files and an on-demand communication of a passcode hint to decrypt the encrypted files.

FIG. 6A is a flow diagram illustrating an exemplary process control flow associated with step 390 of FIG. 3. Referring to FIG. 6A, a user prompts his email client application 601 to invoke the document encryption software application 602, of the present specification, that enables encryption of original content 610 (such as one or more files) to generate encrypted content 611 (such as one or more encrypted files). The encrypted content 611 is attached to an automatically generated standard first email that is routed by an SMTP (Simple Mail Transfer Protocol) server 603 to a recipient's email client application 604. In one embodiment, the document encryption software application 602 also generates an unencrypted Uniform Resource Identifier (URI) 613 that is sent to a server 606 that executes a notification service. In various embodiments, the notification service is an email service or an SMS service. In one embodiment, the server 606 then routes the unencrypted URI 613, as a second email, to the recipient's email client application 604. In another embodiment, the server 606 routes the unencrypted URI 613, as an SMS text message, to the recipient's pre-registered mobile number. In accordance with an aspect, the unencrypted URI 613, received in the second email, when clicked by the recipient causes a passcode hint request third email 614 to be automatically generated by the recipient's email client application 604 and sent to the document encryption software application 602. The document encryption software application 602 on receipt of the third email 614 automatically generates a fourth email including an unencrypted passcode hint 612 that is sent to the recipient's email client application 604. The recipient then uses the passcode hint 612 and a decryption service 605 to decrypt the encrypted content 611 and obtain the original content 610. In various embodiments, the decryption service 605 is a native application of the same type that was used to encrypt the original content 610.

Figure 6B:
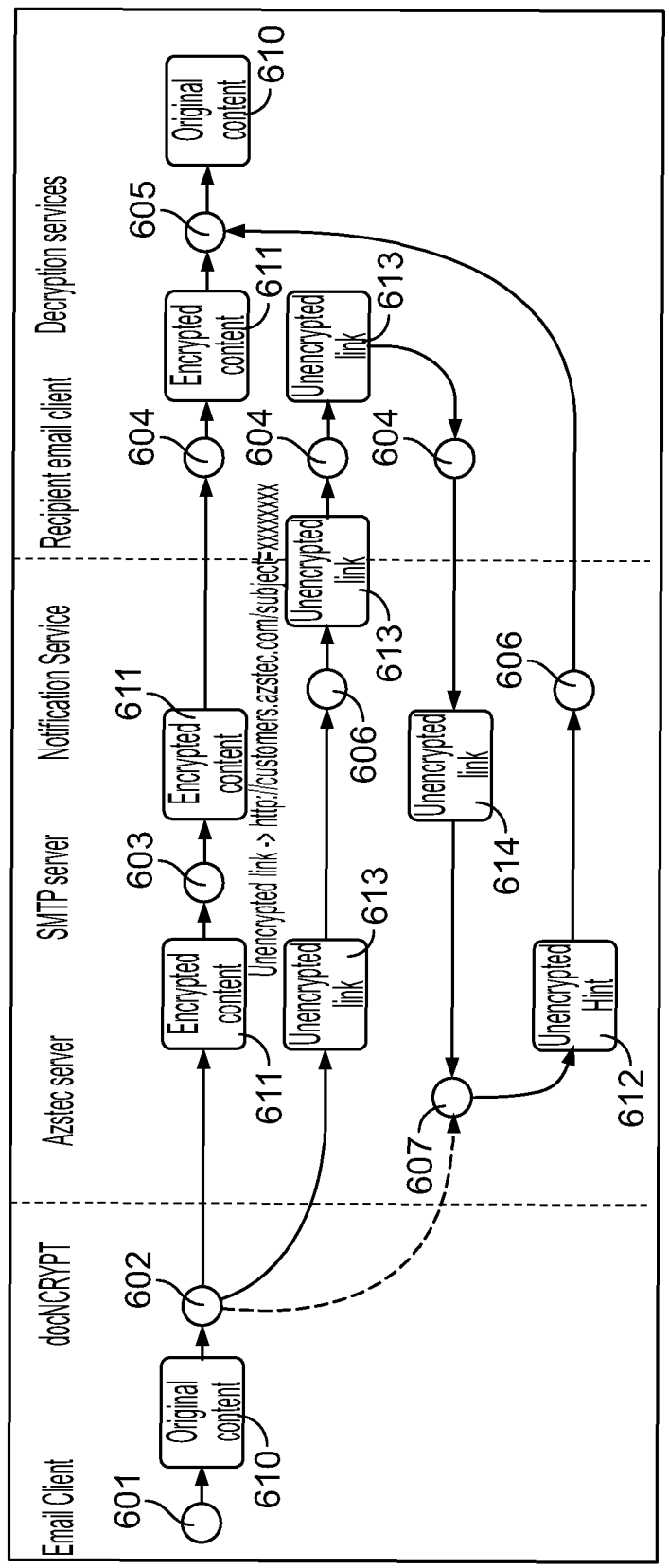
FIG. 6B is a flow diagram illustrating another exemplary process for transmission of encrypted files and an on-demand communication of the passcode hint to decrypt the encrypted files.

FIG. 6B is a flow diagram illustrating another exemplary process control flow associated with step 390 of FIG. 3. Referring to FIG. 6B, the user prompts his email client application 601 to invoke the document encryption software application 602, of the present specification, that enables encryption of original content 610 (such as one or more files) to generate encrypted content 611 (such as one or more encrypted files). The encrypted content 611 is attached to an automatically generated standard first email that is routed by the SMTP (Simple Mail Transfer Protocol) server 603 to the recipient's email client application 604. In one embodiment, the document encryption software application 602 also generates an unencrypted URI 613 that is sent to a server 606 that executes a notification service. In various embodiments, the notification service is an email service or an SMS service. In one embodiment, the server 606 then routes the unencrypted URI 613, as a second email, to the recipient's email client application 604. In another embodiment, the server 606 routes the unencrypted URI 613, as an SMS text message, to the recipient's pre-registered mobile number. In accordance with an aspect, the unencrypted URI 613 is associated with a URL (Uniform Resource Locator) to a third party server 607. Thus, the unencrypted URI 613, received in the second email, when clicked by the recipient causes a request 614 to be sent to the third party server 607. On receipt of the request 614, the third party server 607 communicates the passcode hint 612 (unencrypted) to the recipient via the server 606. The passcode hint 612 may be communicated as an SMS text message to the recipient's mobile number or as an email. The recipient then uses the passcode hint 612 and the decryption service 605 to decrypt the encrypted content 611 and obtain the original content 610. In various embodiments, the decryption service 605 is a native application that was used to encrypt the original content 610.

In some embodiments, the encrypted contents 611 in FIG. 6A and FIG. 6B are not sent as attachments to the standard first email. Instead, in such embodiments, the first email includes a separate URI link (such as to a webpage or a Dropbox link) to access the encrypted file(s) as per step 392 in FIG. 3.

Referring back to FIG. 3, at step 392, the user may either save the one or more encrypted files to the user's Dropbox folder on his computer or upload the one or more encrypted files to the user's web based Dropbox account and optionally auto-send a Uniform Resource Identifier (URI) to the encrypted file(s) in Dropbox via an automatically generated editable standard first email. In some embodiments, the user can also enable appending a date and time stamp to the name(s) of the encrypted file(s) saved in the Dropbox folder. Persons of ordinary skill in the art should appreciate that while step 392 is being described using Dropbox, any other Internet/Cloud based file hosting service similar to Dropbox, such as, but not limited to, Box.Net, can be employed. However, in contrast to step 380, at step 392 the decryption passcode or hint associated with the decryption passcode is communicated to the recipient(s) only on demand by the recipient(s). In other words, a communique, comprising the decryption passcode or hint, is automatically generated and sent to the recipient(s) only when the recipient(s) expressly requests that the passcode (or hint) be sent to the recipient(s). Step 392 is effectuated by clicking the 'Send via Cloud' button 453 on tab 445 of FIG. 4G. The functionality of step 392 is enabled through the 'settings' interface 466 of FIG. 4N. As shown in FIG. 4N, to enable step 392 the user selects the 'on' radio button 469*l* to enable sending a passcode notification automatically 'on demand' by the recipient(s). It should be appreciated that if the user selects the 'on' radio button 469*l*, the radio buttons 469*g* are automatically set to 'off'—that is, the option (of step 380) to automatically and compulsorily send the passcode hint notification to the recipient(s) is disabled.

At step 392, clicking the 'Send Via Cloud' button 453, of FIG. 4G, opens a cloud management interface 467 allowing the user to select a cloud service from an account list 467*a* of cloud service accounts pre-registered/pre-configured with the document encryption software application. Once the user selects a cloud service account from the list 467*a*, such as Dropbox, the user's pre-configured account credential 467*b* and an instance 467*c* of his Dropbox folders are automatically displayed. The interface 467 also provides two radio buttons 467*d*, 467*e* to enable the user to select from a first option (467*d*) to upload one or more encrypted files to the user's Dropbox folder (by direct/instant upload to the user's web based Dropbox account) or a second option (467*e*) to upload the one or more encrypted files to the user's web based Dropbox account and auto-send a URI to the encrypted file(s) in Dropbox via an automatically generated editable standard first email. The user selects an existing folder from the displayed folders instance 467*c* or creates a new folder within the Dropbox folder, using button 467*f*, to upload the encrypted file(s) therein. Once the user has accomplished tasks related to either one of the first or second options, he can click the 'ok' button 467*g*. The user can abort the 'Send Via Cloud' functionality any time by clicking the 'cancel' button 467*h*.

It should be noted that, in accordance with an embodiment, when the 'Send Via Cloud' button 453 is clicked (with reference to step 392) the save option chosen in step 340 (from the file save options 446, 448 and 449*a* through 449*d* of FIG. 4E) is also employed in addition to saving the encrypted files(s) by direct upload to the user's web based Dropbox account. One of ordinary skill in the art would appreciate that the file save option chosen under 448 and 449*a* through 449*d* could enable saving the encrypted file(s) in the user's Dropbox folder on his computer for subsequent upload to the user's Dropbox account using the synchronization functionality whereby the user would subsequently be able to manually generate a Uniform Resource Identifier (URI) to the encrypted file(s) for manual transmission to a recipient via email.

It should be appreciated that upon uploading the encrypted file(s) directly to the user's web-based Dropbox account, the process enables a URI to the encrypted files(s) on Dropbox to be established/generated. Once this process is complete, the document encryption software invokes a standard email interface 468' (FIG. 4L) with a predefined, yet editable, standard first email body message 468a', subject 468b and the Dropbox URI(s) 468c to the encrypted file(s). In one embodiment, the standard first email body message 468a' indicates that, to receive the decryption passcode hint for the encrypted file attachment(s), the recipient must click a 'send passcode' button 468g included within the email 468'. The user inputs recipients in the address box 468d, edits the subject and the standard email body 468a and 468f, if needed, and sends (by clicking the 'send' button 468e) the email comprising the URI(s) 468c. In another embodiment, the standard first email body message 468a' is not editable. In accordance with an embodiment, the email with URI(s) 468c is sent using the user's webmail account pre-registered/pre-configured with the document encryption software application as described earlier with reference to FIG. 4J.

Referring now to FIGS. 3, 4G and 4L at step 392, the email interface 468' automatically presents the user's webmail address (pre-registered/pre-configured with the document encryption software application) in the 'from' credential. In one embodiment, the user is prompted to manually add at least one recipient's email address to the first email. Once the user clicks the send button on the email interface, the document encryption software application causes the email 468' (with the Dropbox URI link to the encrypted attachment(s)) to be sent to one or more recipient email addresses populated by the user in the 'To', 'cc' and/or 'bcc' boxes of the email 468'.

When a recipient receives the email 468', he may request the passcode or associated hint by clicking the 'send passcode' button 468g embedded in the email 468'. In one embodiment, the 'send passcode' button 468g is hyperlinked (using a URI) to a Dropbox passcode file (or a passcode file uploaded to any Internet/cloud based hosting service known to persons of ordinary skill in the art) comprising the decryption passcode or hint. The Dropbox file may be any format such as, but not limited to, MS Word, Notepad, and web page. In this embodiment, the document encryption software application, automatically creates the passcode file, uploads it to Dropbox and embeds or associates the Dropbox link to the passcode file with the 'send passcode' button 468g before dispatching the first email 468' (to the one or more recipients). In another embodiment, the 'send passcode' button 468g is hyperlinked (using a URI) to a passcode webpage, hosted on a secure web server, comprising the decryption passcode or hint. In this embodiment, the document encryption software application, automatically creates the passcode webpage, uploads it to the secure web server and embeds or associates the URI to the passcode webpage with the 'send passcode' button 468g before dispatching the first email 468' (to the one or more recipients). In some embodiments, the passcode webpage resides on the document encryption software application provider's server. In other embodiments, the passcode webpage resides on the sender's server.

In another embodiment, when a recipient clicks the 'send passcode' button 468g an auto-generated passcode request email, with a standard subject line, such as for example, 'send passcode', is automatically sent from the recipient's email to the sender's email address (available in the 'From' credential of the email 468'). The document encryption software application of the sender, on receipt of the passcode request email from the recipient, automatically generates a second email with the same subject as in the original first email but preceded by a passcode notification, wherein the passcode hint associated with the decryption passcode is listed in the text of the second email and the second email, in one embodiment, is automatically sent to the recipient from whom the passcode request email was received. In another embodiment, the decryption passcode or the passcode hint associated with the decryption passcode is sent as a file attachment to the second email. Alternatively, instead of including the decryption passcode or hint as text within the second email, a Uniform Resource Identifier (URI) to a Dropbox passcode file (comprising the decryption passcode or hint) or to a passcode webpage is embedded within the second email. In an embodiment, the second email is sent automatically to an alternate recipient email address. In an embodiment, the user is prompted to change any email address (for example if the user wishes to send the passcode notification to an alternate email address belonging to the recipient for added security). In other embodiments, the email address of the recipient, from whom the passcode request email was received, is not auto-populated and the user needs to input it manually and thereafter send the second email manually.

FIG. 7A is a flow diagram illustrating an exemplary process for requesting a passcode or a passcode hint, on-demand, in accordance with some embodiments. Referring to FIG. 7A, a user prompts his email client application 701 to invoke a document encryption software application 702, of the present specification, that enables encryption of unencrypted content 710 (such as one or more files) to generate encrypted content 711 (such as one or more encrypted files). The encrypted content 711 is attached to an automatically generated standard first email (whose original email body may be optionally encrypted and attached as per steps 135, 145 and 155 of FIG. 1B) that is routed by an SMTP (Simple Mail Transfer Protocol) server 703 to a recipient's email client application 704. In one embodiment, the document encryption software application 702 also generates an unencrypted passcode request email 712 that includes a Uniform Resource Identifier (URI). In one embodiment, the URI is a mailto link such as of the form mailto:service@azstec.com&subject=xxxxxxxx where xxxxxxxx is a unique identifier that the document encryption software application 702 uses as a lookup to find the passcode hint. The passcode request email 712 is also routed by the SMTP server 703 to the recipient's email client application 704. When the recipient clicks the mailto link, in the passcode request email 712, a second email 712' is automatically generated and sent to the user's document encryption software application 702. The document encryption software application 702 on receipt of the second email 712' then automatically generates a third email 713 (unencrypted) including the passcode or passcode hint. The third email 713 is routed by the SMTP server 703 to the recipient's email client application 704. The recipient then uses the passcode or passcode hint and a decryption service 705 to decrypt the encrypted content 711 and obtain the unencrypted content 710. In various embodiments, the decryption service 705 is a native application of the same type that was used to encrypt the original content 710.

FIG. 7B is a flow diagram illustrating another exemplary process for requesting a passcode or a passcode hint on-demand, in accordance with some embodiments. Referring to FIG. 7B, the user prompts his email client application 701 to invoke the document encryption software application 702, of the present specification, that enables encryption of unencrypted content 710 (such as one or more files) to generate encrypted content 711 (such as one or more encrypted files). The encrypted content 711 is attached to an automatically generated standard first email (whose original email body may be optionally encrypted and attached as per steps 135, 145 and 155 of FIG. 1B) that is routed by an SMTP (Simple Mail Transfer Protocol) server 703 to a recipient's email client application 704. In this embodiment, the first email also includes (within the body of the unencrypted email) a mailto link such as of the form mailto: service@azstec.com&subject=xxxxxxxx where xxxxxxxx is a unique identifier that the document encryption software application 702 uses as a lookup to find the passcode hint. When the recipient clicks the mailto link, in the first email, a second email 712' is automatically generated and sent to the user's document encryption software application 702. The document encryption software application 702 on receipt of the second email 712' then automatically generates a third email 713 (unencrypted) including the passcode or passcode hint. The third email 713 is routed by the SMTP server 703 to the recipient's email client application 704. The recipient then uses the passcode or passcode hint and the decryption service 705 to decrypt the encrypted content 711 and obtain the unencrypted content 710. In various embodiments, the decryption service 705 is a native application of the same type that was used to encrypt the original content 710.

In some embodiments, the encrypted contents 711 in FIG. 7A and FIG. 7B are not sent as attachments to the standard first email. Instead, in such embodiments, the first email includes a separate URI link (such as to a webpage or a Dropbox link) to access the encrypted file(s) as per step 392 of FIG. 3. Referring again to FIG. 3, in yet another embodiment, when a recipient clicks the 'send passcode' button 468g an auto-generated passcode request email, with a standard subject line, such as for example, 'send passcode', is automatically sent from the recipient's email to the sender's email address (available in the 'From' credential of the email 468'). The document encryption software application of the sender, on receipt of the passcode request email from the recipient, automatically generates an SMS and automatically sends the SMS to the recipient's mobile telephone number pre-registered or pre-configured with the document encryption software application. The SMS, in one embodiment, is a text message including the decryption passcode or hint. In another embodiment, the SMS text message includes the decryption passcode (or hint) and/or the Uniform Resource Identifier (URI) to the Dropbox passcode file (comprising the decryption passcode or hint) or to the passcode webpage.

In yet another embodiment, when a recipient clicks the 'send passcode' button 468g a call (such as a Voice Over Internet Protocol) is automatically initiated to a web service in either the document encryption software application provider's server or in the sender's server which then responds by transmitting the decryption passcode or hint via a second email or an SMS text message.

In still another embodiment, both—the second email as well as an SMS text message are sent automatically to the recipient on receipt of the passcode request email from the recipient. The second email and the SMS text message may together provide a combination of the following: decryption passcode or hint embedded as text or as a file attachment to the second email, URI to the Dropbox passcode file or to the passcode webpage. Once the first and second emails have been sent the user can exit the document encryption software by clicking the 'exit' button 452 of FIG. 4G, at step 393. If the user does not wish to execute any of the steps 360, 370, 380, 390 or 392 he can exit the document encryption software, at any time, by clicking the 'exit button 452 of FIG. 4G at step 399.

At step 394, the user may save the one or more encrypted files and automatically send the encrypted file(s) as attachments via an editable standard first email. Also, subsequently and automatically a first text message or SMS is sent to the recipient's mobile number. In one embodiment, the first text message or SMS includes a Uniform Resource Identifier (URI) to request the passcode to the encrypted file(s) in the first email. When the recipient clicks the URI in the SMS, an auto-generated passcode request SMS, with a standard line, such as for example, 'send passcode', is automatically sent from the recipient's mobile number to the user's or sender's mobile number. The document encryption software application of the sender, on receipt of the passcode request SMS from the recipient, automatically generates a second email with the same subject as in the original first email but preceded by a passcode notification, wherein the decryption passcode or the passcode hint associated with the decryption passcode is listed in the text of the email and the email, in one embodiment, is automatically sent to the recipient from whom the passcode request SMS was received. In another embodiment, the decryption passcode or the passcode hint associated with the decryption passcode is sent as a file attachment to the second email. Alternatively, instead of including the decryption passcode or hint as text or as file attachment with the second email, a Uniform Resource Identifier (URI) to a Dropbox passcode file (comprising the decryption passcode or hint) is embedded within the second email. Still alternatively, instead of including the decryption passcode or hint as text or as a file attachment within the second email, a URI to a passcode webpage is embedded within the second email. In some embodiments, the passcode webpage resides on the document encryption software application provider's server. In other embodiments, the passcode webpage resides on the sender's server.

In an embodiment, the second email is sent automatically to the recipient's alternate email address. In an embodiment, the user is prompted to change any email address (for example if the user wishes to send the passcode notification to an alternate email address belonging to the recipient for added security). In other embodiments, the email address of the recipient, from whom the passcode request SMS was received, is not auto-populated and the user needs to input it manually and thereafter send the second email manually.

In yet another embodiment, the document encryption software application of the sender, on receipt of the passcode request SMS from the recipient, automatically generates an SMS and automatically sends the SMS to the recipient's mobile telephone number pre-registered or pre-configured with the document encryption software application. The SMS, in one embodiment, is a text message including the decryption passcode or hint. In another embodiment, the SMS text message includes a URI to the Dropbox passcode file (comprising the decryption passcode or hint). Still alternatively, a URI to a passcode webpage is embedded within the SMS text message. In some embodiments, the passcode webpage resides on the document encryption software application provider's server. In other embodiments, the passcode webpage resides on the sender's server.

In yet another embodiment, when a recipient clicks the 'send passcode' URI within the first SMS a call (such as a Voice Over Internet Protocol) is automatically initiated to a web service in either the document encryption software application provider's server or in the sender's server which then responds by transmitting the decryption passcode or hint via the second email or the SMS text message. Once the passcode or hint has been communicated the user can exit the document encryption software by clicking the 'exit' button 452 of FIG. 4G, at step 395.

At step 396, save the one or more encrypted files and automatically send the encrypted file(s) as attachments via an editable standard first email. Also, subsequently and automatically a second standard email is sent to the recipient's email address (same as that of the first email) or to the recipient's alternate email address (different from that of the first email) including a 'send passcode' button or URI. When the 'send passcode' button or URI is clicked, an auto-generated passcode request third email, with a standard subject line (such as for example, 'send passcode') is automatically sent from the recipient's email or from the alternate email address to the sender's email address. The document encryption software application of the sender, on receipt of the passcode request third email, automatically generates a fourth email with the same subject as in the original first email but preceded by a passcode notification, wherein the decryption passcode or the passcode hint associated with the decryption passcode is listed in the text of the fourth email and the fourth email, in one embodiment, is automatically sent to the email address from where the passcode request email was received. In another embodiment, the decryption passcode or the passcode hint associated with the decryption passcode is sent as a file attachment to the fourth email. Alternatively, instead of including the decryption passcode or hint as text or file attachment with the fourth email, a URI to a Dropbox passcode file or a passcode webpage (comprising the decryption passcode or hint) is embedded within the fourth email. In some embodiments, the passcode webpage resides on the document encryption software application provider's server. In other embodiments, the passcode webpage resides on the sender's server.

In an embodiment, the fourth email is sent automatically to the recipient's alternate email address. In an embodiment, the user or sender is prompted to change any email address (for example if the user wishes to send the passcode notification to an alternate email address belonging to the recipient for added security). In other embodiments, the email address of the recipient, from whom the passcode request email was received, is not auto-populated and the user needs to input it manually and thereafter send the second email manually.

In another embodiment, the document encryption software application of the sender, on receipt of the passcode request third email from the recipient, automatically generates an SMS and automatically sends the SMS to the recipient's mobile telephone number pre-registered or pre-configured with the document encryption software application. The SMS, in one embodiment, is a text message including the decryption passcode or hint. In another embodiment, the SMS text message includes a Uniform Resource Identifier (URI) to the Dropbox passcode file or a passcode webpage (comprising the decryption passcode or hint). In some embodiments, the passcode webpage resides on the document encryption software application provider's server. In other embodiments, the passcode webpage resides on the sender's server.

In yet another embodiment, when a recipient clicks the 'send passcode' URI within the second email a call (such as a Voice Over Internet Protocol) is automatically initiated to a web service in either the document encryption software application provider's server or in the sender's server which then responds by transmitting the decryption passcode or hint via an email (similar to the fourth email described above) or the SMS text message. Once the passcode or hint has been communicated the user can exit the document encryption software by clicking the 'exit' button 452 of FIG. 4G, at step 397.

At step 398, save the one or more encrypted files and automatically send the encrypted file(s) as attachments via an editable standard first email. The first email may comprise a standard message that the recipient should log on to a specific website or portal, using the recipient's previously established login credentials, to access a passcode or passcode hint related to the encrypted file(s). On receipt of the first email, the recipient independently logs in to the specific website or portal, using his previously established login credentials, and navigates to a webpage or interface that either provides a passcode associated generally with the recipient or passcode associated specifically with the encrypted file(s). In some embodiments, the specific web site or portal resides on the document encryption software application provider's server. In other embodiments, the specific website or portal resides on the sender's server. The user or sender can exit the document encryption software by clicking the 'exit' button 452 of FIG. 4G, at step 399.

In accordance with an aspect of the present specification, the Uniform Resource Identifier (URI) associated with the 'send passcode' button has any one or more combinations of the following characteristics: a) the URI has an expiration time period such as, but not limited to, 7 days or 30 days after which the URI is non-functional or deactivated; b) the URI has no expiration time period and will therefore remain active or functional for an unlimited time period; c) the URI has a limit on the number of times it can be used or activated such as, but not limited to, 3 times or 10 times after which the URI is non-functional or deactivated; d) the URI has no limitation with respect to the number of times it can be used or activated; e) the URI can be forwarded by the recipient to another email address or mobile phone through which it can still be activated or used; and f) the URI can only be activated from the recipient's email or mobile phone.

Figure 7C:
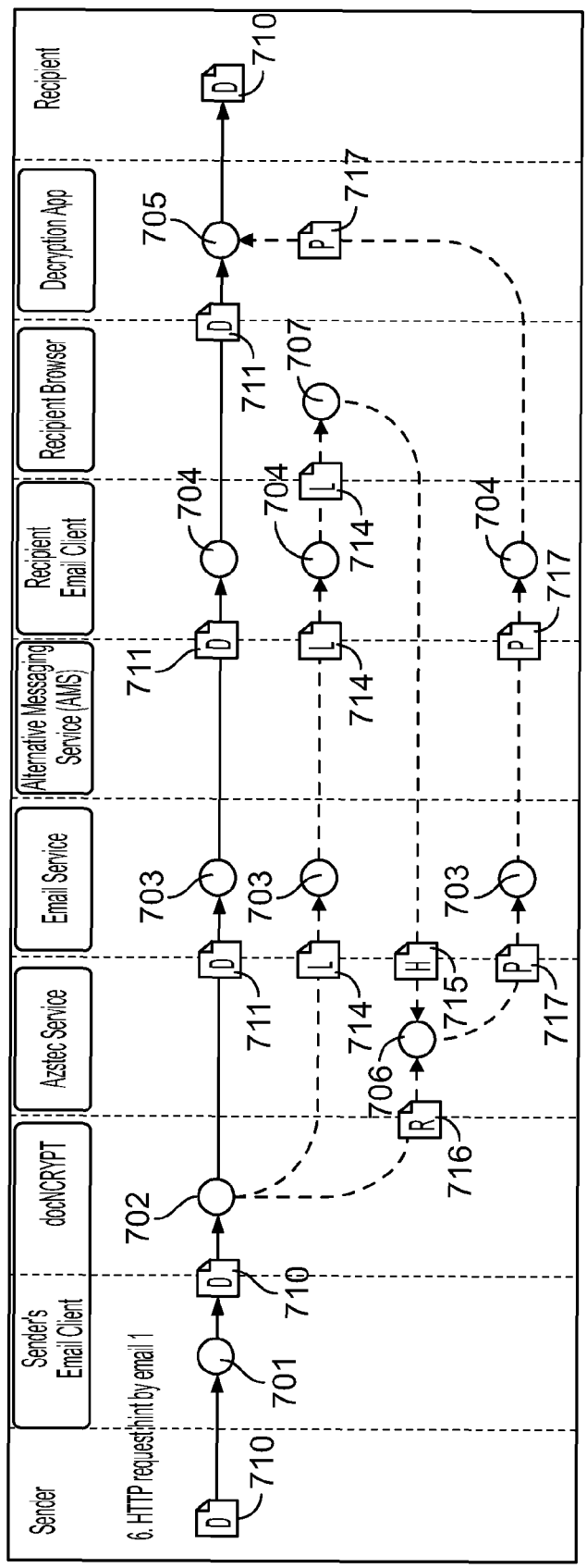
FIG. 7C is a flow diagram illustrating another exemplary process for requesting and transmitting a passcode or a passcode hint on-demand, in accordance with some embodiments.

FIG. 7C is a flow diagram illustrating an exemplary process to request a passcode or a passcode hint on-demand, in accordance with some embodiments. Referring to FIG. 7C, a user prompts his email client application 701 to invoke a document encryption software application 702, of the present specification, that enables encryption of unencrypted content 710 (such as one or more files) to generate encrypted content 711 (such as one or more encrypted files). The encrypted content 711 is attached to an automatically generated standard first email (whose original email body may be optionally encrypted and attached as per steps 135, 145 and 155 of FIG. 1B) that is routed by an SMTP (Simple Mail Transfer Protocol) server 703 to a recipient's email client application 704. In one embodiment, the document encryption software application 702 also generates an unencrypted passcode request email 714 that includes a Uniform Resource Identifier (URI). In one embodiment, the URI is an HTTP (Hyper Text Transport Protocol) link such as of the form https://customers.azstec.com/xxxxxxxx where xxxxxxxx is a unique identifier that the document encryption software application 702 uses as a lookup to find the passcode hint. The passcode request email 714 is also routed by the SMTP server 703 to the recipient's email client application 704. When the recipient clicks the HTTP link, in the passcode request email 714, the recipient's browser 707 is invoked. As a result of the invocation, the browser 707 sends an HTTP request 715 (corresponding to the HTTP link) to a web service 706. The web service 706 automatically parses and interprets information (such as the unique identifier) from the HTTP link to take action on the HTTP request 715. In accordance with an embodiment, the web service 706 maintains a database 716 of passcode hints associated with each unique identifier. In one embodiment, the database 716 is updated and maintained by receiving regular database updates from the user's document encryption software application 702. Thus, in response to the HTTP request 715, the web service 706 generates a second email 717 (unencrypted) including the passcode or passcode hint. The second email 717 is routed by the SMTP server 703 to the recipient's email client application 704. The recipient then uses the passcode or passcode hint and the decryption service 705 to decrypt the encrypted content 711 and obtain the unencrypted content 710. In various embodiments, the decryption service 705 is a native application of the same type that was used to encrypt the original content 710.

Figure 7D:
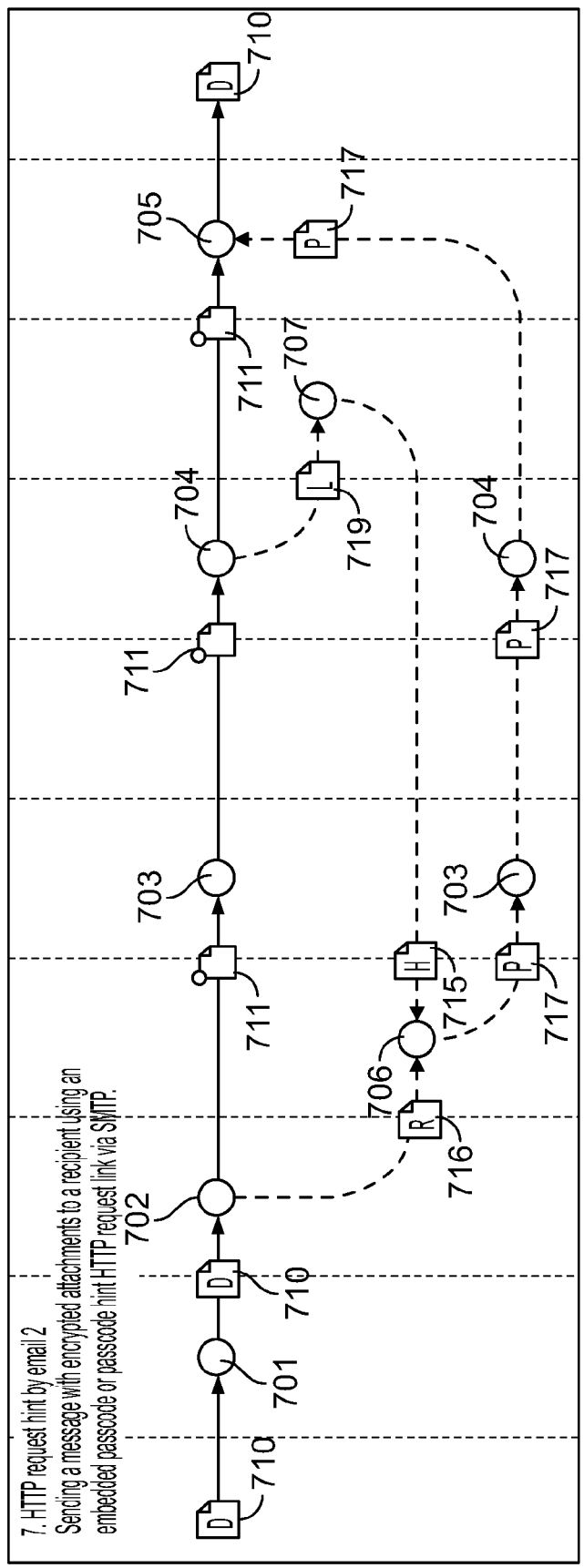
FIG. 7D is a flow diagram illustrating another exemplary process for requesting and transmitting a passcode or a passcode hint on-demand, in accordance with some embodiments.

FIG. 7D is a flow diagram illustrating another exemplary process to request a passcode or a passcode hint on-demand, in accordance with some embodiments. Referring to FIG. 7D, the user prompts his email client application 701 to invoke the document encryption software application 702, of the present specification, that enables encryption of unencrypted content 710 (such as one or more files) to generate encrypted content 711 (such as one or more encrypted files). The encrypted content 711 is attached to an automatically generated standard first email (whose original email body may be optionally encrypted and attached as per steps 135, 145 and 155 of FIG. 1B) that is routed by an SMTP (Simple Mail Transfer Protocol) server 703 to a recipient's email client application 704. In this embodiment, the first email also includes (within the body of the unencrypted email) a URI in the form of, for example, an HTTP (Hyper Text Transport Protocol) link 719 such as of the form https://customers.azstec.com/xxxxxxxx where xxxxxxxx is a unique identifier that is used as a lookup to find the passcode hint. When the recipient clicks the HTTP link 719, in the first email, the browser 707 sends an HTTP request 715 (corresponding to the HTTP link) to the web service 706. The web service 706 automatically parses and interprets information (such as the unique identifier) from the HTTP link 719 to take action on the HTTP request 715. In accordance with an embodiment, the web service 706 maintains a database 716 of passcode hints associated with each unique identifier. In one embodiment, the database 716 is updated and maintained by receiving regular database updates from the user's document encryption software application 702. Thus, in response to the HTTP request 715, the web service 706 generates a second email 717 (unencrypted) including the passcode or passcode hint. The second email 717 is routed by the SMTP server 703 to the recipient's email client application 704. The recipient then uses the passcode or passcode hint and the decryption service 705 to decrypt the encrypted content 711 and obtain the unencrypted content 710. In various embodiments, the decryption service 705 is a native application of the same type that was used to encrypt the original content 710.

It should be appreciated that the URI in the form of the HTTP link, for example, in alternate embodiments, may lead the recipient to a web page or portal. The web page or portal may require the recipient to login using his credentials to further authenticate the recipient. Once authenticated, the recipient has access to the passcode or passcode hint available on the web page or portal. In some embodiments, the portal may use multiple layers of authentication before allowing access to the recipient. For example, in some embodiments, once the user logins into the portal an authentication SMS or email is automatically sent to the recipient's phone number or email client application. The authentication SMS or email may include a URI to eventually enable the recipient to access the passcode or passcode hint. In still other embodiments, the recipient can log into the portal and see a history of messages (basic metadata—such as subject of the messages) that he either initiated or was the recipient of. The request of the passcode can be initiated through the portal.

Figure 7E:
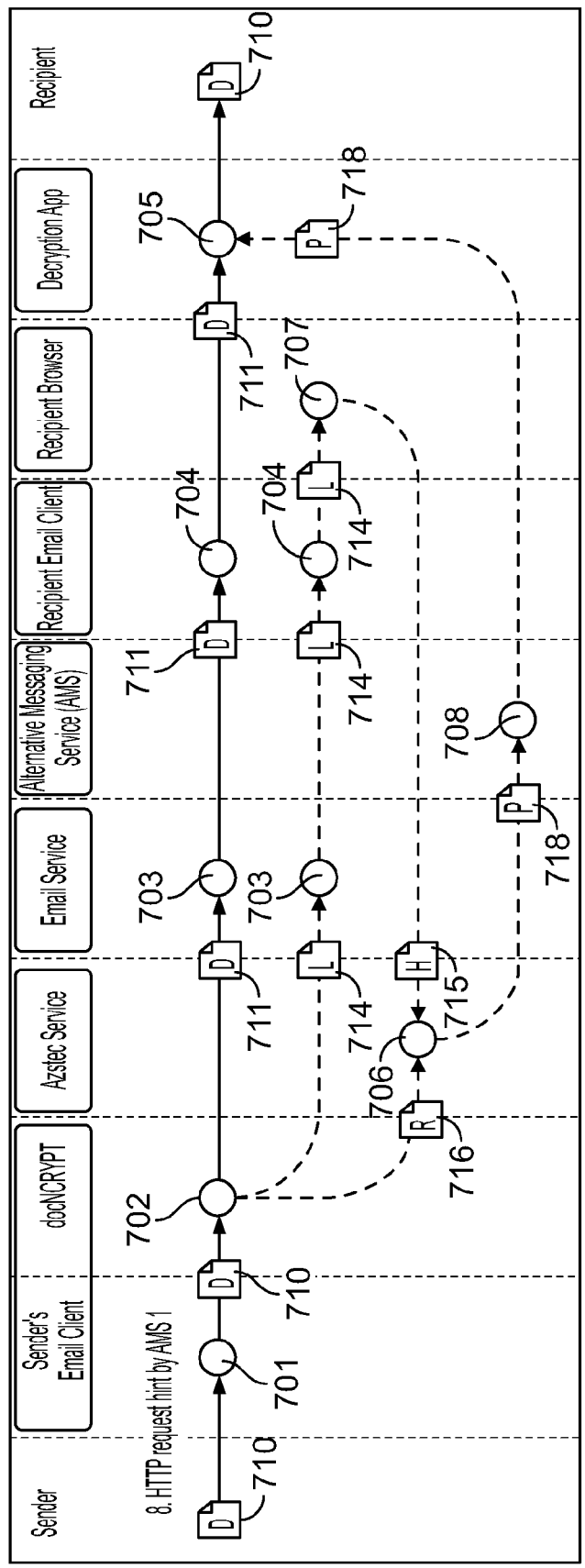
FIG. 7E is a flow diagram illustrating another exemplary process exemplary process for requesting and transmitting a passcode or a passcode hint on-demand, in accordance with some embodiments.

FIG. 7E is a flow diagram illustrating another exemplary process to request a passcode or a passcode hint on-demand, in accordance with some embodiments. Referring to FIG. 7E, a user prompts his email client application 701 to invoke a document encryption software application 702, of the present specification, that enables encryption of unencrypted content 710 (such as one or more files) to generate encrypted content 711 (such as one or more encrypted files). The encrypted content 711 is attached to an automatically generated standard first email (whose original email body may be optionally encrypted and attached as per steps 135, 145 and 155 of FIG. 1B) that is routed by an SMTP (Simple Mail Transfer Protocol) server 703 to a recipient's email client application 704. In one embodiment, the document encryption software application 702 also generates an unencrypted passcode request email 714 that includes a URI in the form of, for example, an HTTP (Hyper Text Transport Protocol) link such as of the form https://customers.azstec.com/xxxxxxxx where xxxxxxxx is a unique identifier that is used as a lookup to find the passcode hint. The passcode request email 714 is also routed by the SMTP server 703 to the recipient's email client application 704. When the recipient clicks the HTTP link, in the passcode request email 714, the recipient's browser 707 is invoked. As a result of the invocation, the browser 707 sends an HTTP request 715 (corresponding to the HTTP link) to the web service 706. The web service 706 automatically parses and interprets information (such as the unique identifier) from the HTTP link to take action on the HTTP request 715. In accordance with an embodiment, the web service 706 maintains a database 716 of passcode hints associated with each unique identifier. In one embodiment, the database 716 is updated and maintained by receiving regular database updates from the user's document encryption software application 702. Thus, in response to the HTTP request 715, the web service 706 generates a message 718, containing the passcode or passcode hint, and forwards it to a messaging service 708. The messaging service, in various embodiments, is an SMS messaging service or an instant messenger service, for example. The messaging service 708 sends the message 718 to the recipient's phone number, in the form of a SMS text message, for example. The recipient then uses the passcode or passcode hint and the decryption service 705 to decrypt the encrypted content 711 and obtain the unencrypted content 710. In various embodiments, the decryption service 705 is a native application of the same type that was used to encrypt the original content 710.

Figure 7F:
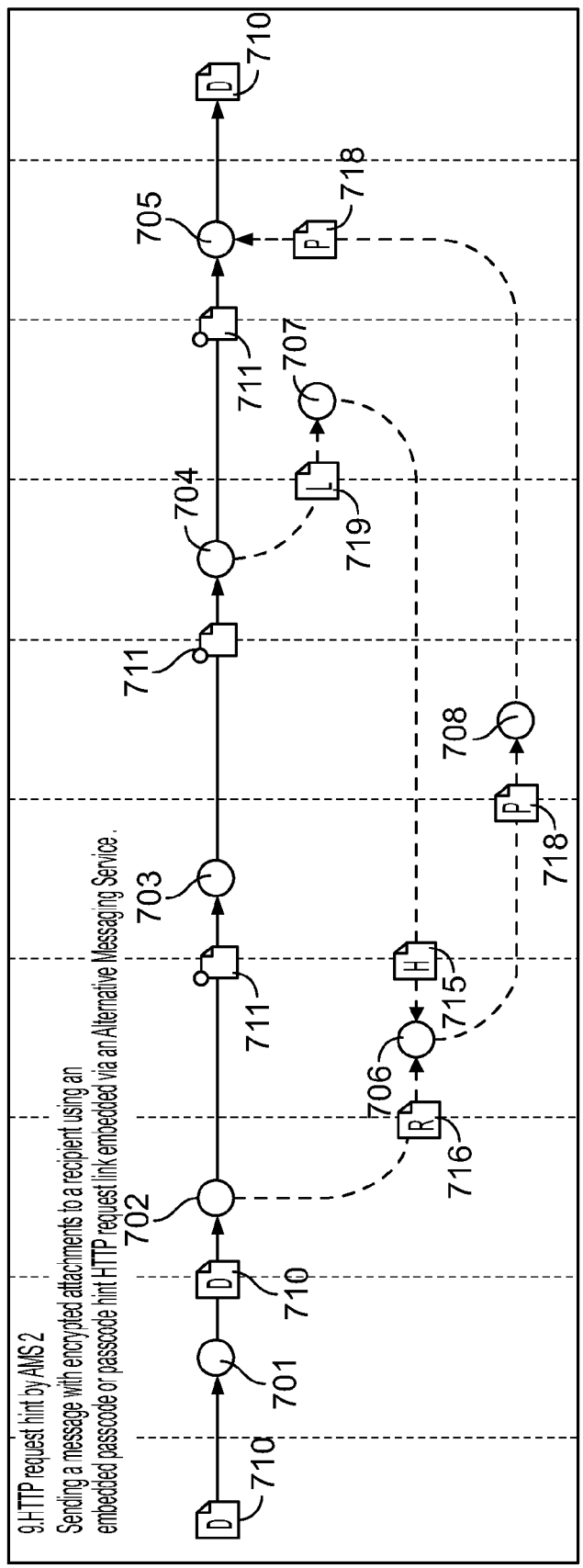
FIG. 7F is a flow diagram illustrating another exemplary process for requesting and transmitting a passcode or a passcode hint on-demand, in accordance with some embodiments.

FIG. 7F is a flow diagram illustrating another exemplary process to request a passcode or a passcode hint on-demand, in accordance with some embodiments. Referring to FIG. 7F, the user prompts his email client application 701 to invoke the document encryption software application 702, of the present specification, that enables encryption of unencrypted content 710 (such as one or more files) to generate encrypted content 711 (such as one or more encrypted files). The encrypted content 711 is attached to an automatically generated standard first email (whose original email body may be optionally encrypted and attached as per steps 135, 145 and 155 of FIG. 1B) that is routed by an SMTP (Simple Mail Transfer Protocol) server 703 to a recipient's email client application 704. In this embodiment, the first email also includes (within the body of the unencrypted email) a URI in the form of, for example, an HTTP (Hyper Text Transport Protocol) link 719 such as of the form https://customers.azstec.com/xxxxxxxx where xxxxxxxx is a unique identifier that is used as a lookup to find the passcode hint. When the recipient clicks the HTTP link 719, in the first email, the browser 707 sends an HTTP request 715 (corresponding to the HTTP link) to the web service 706. The web service 706 automatically parses and interprets information (such as the unique identifier) from the HTTP link 719 to take action on the HTTP request 715. In accordance with an embodiment, the web service 706 maintains a database 716 of passcode hints associated with each unique identifier. In one embodiment, the database 716 is updated and maintained by receiving regular database updates from the user's document encryption software application 702. Thus, in response to the HTTP request 715, the web service 706 generates a message 718, containing the passcode or passcode hint, and forwards it to the messaging service 708. The messaging service, in various embodiments, is an SMS messaging service or an instant messenger service, for example. The messaging service 708 sends the message 718 to the recipient's phone number, in the form of a SMS text message, for example. The recipient then uses the passcode or passcode hint and the decryption service 705 to decrypt the encrypted content 711 and obtain the unencrypted content 710. In various embodiments, the decryption service 705 is a native application of the same type that was used to encrypt the original content 710.

Figure 7G:
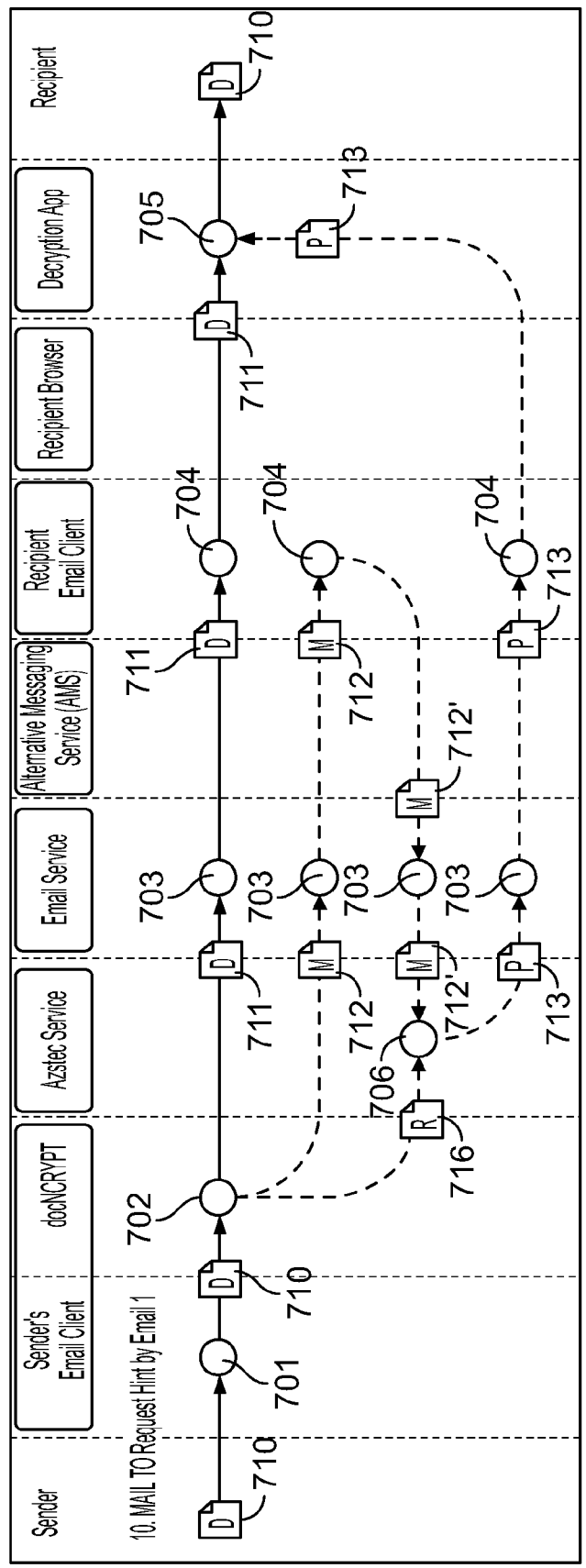
FIG. 7G is a flow diagram illustrating another exemplary process for requesting and transmitting a passcode or a passcode hint on-demand, in accordance with some embodiments.

FIG. 7G is a flow diagram illustrating another exemplary process to request a passcode or a passcode hint on-demand, in accordance with some embodiments. Referring to FIG. 7G, a user prompts his email client application 701 to invoke the document encryption software application 702, of the present specification, that enables encryption of unencrypted content 710 (such as one or more files) to generate encrypted content 711 (such as one or more encrypted files). The encrypted content 711 is attached to an automatically generated standard first email (whose original email body may be optionally encrypted and attached as per steps 135, 145 and 155 of FIG. 1B) that is routed by an SMTP (Simple Mail Transfer Protocol) server 703 to a recipient's email client application 704. In one embodiment, the document encryption software application 702 also generates an unencrypted passcode request email 712 that includes a Uniform Resource Identifier (URI). In one embodiment, the URI is a mailto link such as of the form mailto:service@azstec.com&subject=xxxxxxxx where xxxxxxxx is a unique identifier that the document encryption software application 702 uses as a lookup to find the passcode hint. The passcode request email 712 is also routed by the SMTP server 703 to the recipient's email client application 704. When the recipient clicks the mailto link, in the passcode request email 712, a second email 712' is automatically generated and sent to a web service 706. The second email 712' includes at least the unique identifier as a subject line or within the body of the second email 712'. The web service 706 automatically parses and interprets information (such as the unique identifier) from the second email 712'. In accordance with an embodiment, the web service 706 maintains a database 716 of passcode hints associated with each unique identifies. In one embodiment, the database 716 is updated and maintained by receiving regular database updates from the user's document encryption software application 702. Thus, in response to the second email 712', the web service 706 generates a third email 713 (unencrypted) including the passcode or passcode hint. The third email 713 is routed by the SMTP server 703 to the recipient's email client application 704. The recipient then uses the passcode or passcode hint and the decryption service 705 to decrypt the encrypted content 711 and obtain the unencrypted content 710. In various embodiments, the decryption service 705 is a native application of the same type that was used to encrypt the original content 710.

Figure 7H:
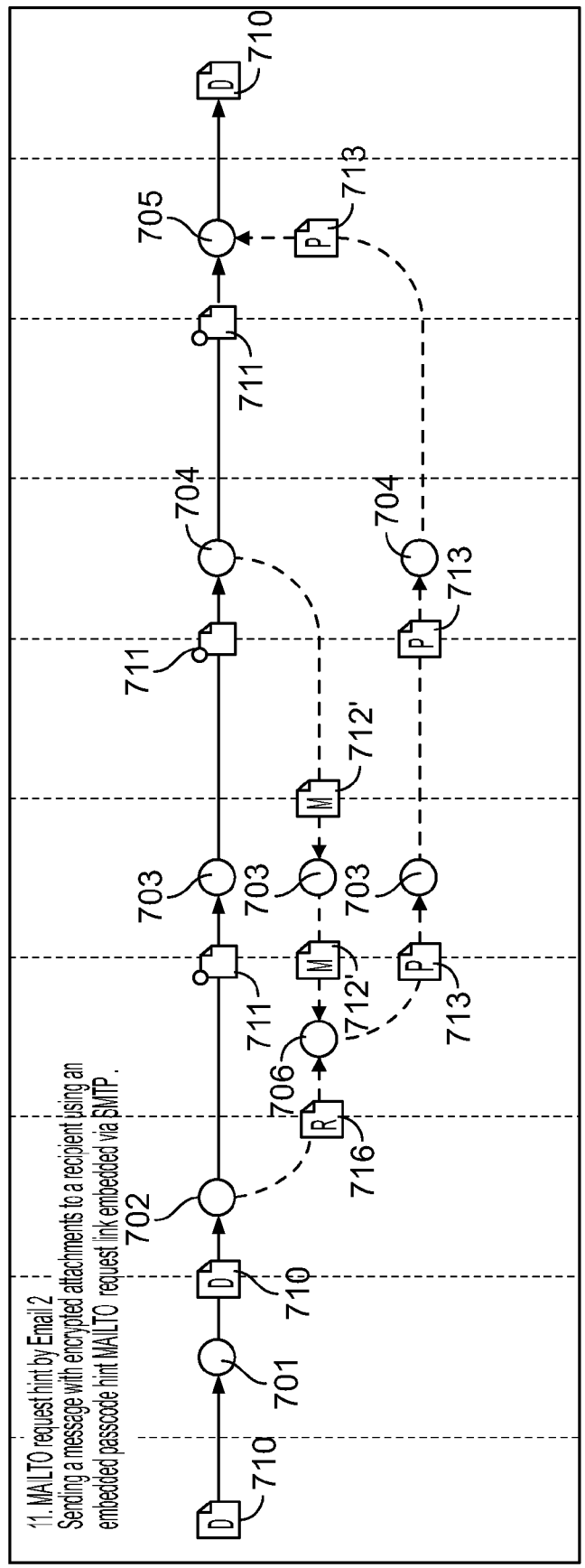
FIG. 7H is a flow diagram illustrating another exemplary process for requesting and transmitting a passcode or a passcode hint on-demand, in accordance with some embodiments.

FIG. 7H is a flow diagram illustrating another exemplary process to request a passcode or a passcode hint on-demand, in accordance with some embodiments. Referring to FIG. 7H, the user prompts his email client application 701 to invoke the document encryption software application 702, of the present specification, that enables encryption of unencrypted content 710 (such as one or more files) to generate encrypted content 711 (such as one or more encrypted files). The encrypted content 711 is attached to an automatically generated standard first email (whose original email body may be optionally encrypted and attached as per steps 135, 145 and 155 of FIG. 1B) that is routed by an SMTP (Simple Mail Transfer Protocol) server 703 to a recipient's email client application 704. In this embodiment, the first email also includes (within the body of the unencrypted email) a URI in the form of, for example, a mailto link such as of the form mailto:service@azstec.com&subject=xxxxxxxx where xxxxxxxx is a unique identifier that is used as a lookup to find the passcode hint. When the recipient clicks the mailto link, in the first email, a second email 712' is automatically generated and sent to a web service 706. The second email 712' includes at least the unique identifier as a subject line or within the body of the second email 712'. The web service 706 automatically parses and interprets information (such as the unique identifier) from the second email 712'. In accordance with an embodiment, the web service 706 maintains a database 716 of passcode hints associated with each unique identifier. In one embodiment, the database 716 is updated and maintained by receiving regular database updates from the user's document encryption software application 702. Thus, in response to the second email 712', the web service 706 generates a third email 713 (unencrypted) including the passcode or passcode hint. The third email 713 is routed by the SMTP server 703 to the recipient's email client application 704. The recipient then uses the passcode or passcode hint and the decryption service 705 to decrypt the encrypted content 711 and obtain the unencrypted content 710. In various embodiments, the decryption service 705 is a native application of the same type that was used to encrypt the original content 710.

Figure 7I:
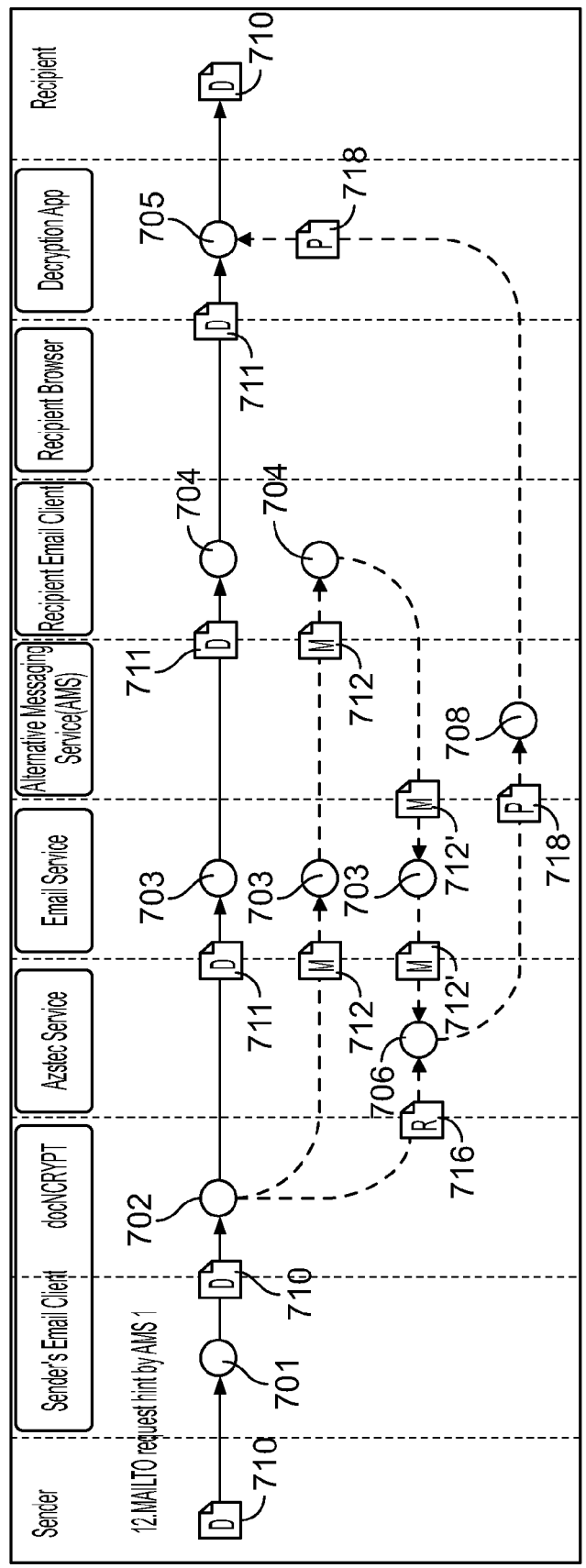
FIG. 7I is a flow diagram illustrating another exemplary process for requesting and transmitting a passcode or a passcode hint on-demand, in accordance with some embodiments; and, FIG. 7J is a flow diagram illustrating another exemplary process for requesting and transmitting a passcode or a passcode hint on-demand, in accordance with some embodiments.

FIG. 7I is a flow diagram illustrating another exemplary process to request a passcode or a passcode hint on-demand, in accordance with some embodiments. Referring to FIG. 7I, a user prompts his email client application 701 to invoke the document encryption software application 702, of the present specification, that enables encryption of unencrypted content 710 (such as one or more files) to generate encrypted content 711 (such as one or more encrypted files). The encrypted content 711 is attached to an automatically generated standard first email (whose original email body may be optionally encrypted and attached as per steps 135, 145 and 155 of FIG. 1B) that is routed by an SMTP (Simple Mail Transfer Protocol) server 703 to a recipient's email client application 704. In one embodiment, the document encryption software application 702 also generates an unencrypted passcode request email 712 that includes a Uniform Resource Identifier (URI). In one embodiment, the URI is a mailto link such as of the form mailto: service@azstec.com&subject=xxxxxxxx where xxxxxxxx is a unique identifier that is used as a lookup to find the passcode hint. The passcode request email 712 is also routed by the SMTP server 703 to the recipient's email client application 704. When the recipient clicks the mailto link, in the passcode request email 712, a second email 712' is automatically generated and sent to a web service 706. The second email 712' includes at least the unique identifier as a subject line or within the body of the second email 712'. The web service 706 automatically parses and interprets information (such as the unique identifier) from the second email 712'. In accordance with an embodiment, the web service 706 maintains a database 716 of passcode hints associated with each unique identifier. In one embodiment, the database 716 is updated and maintained by receiving regular database updates from the user's document encryption software application 702. Thus, in response to the second email 712', the web service 706 generates a message 718, containing the passcode or passcode hint, and forwards it to a messaging service 708. The messaging service, in various embodiments, is an SMS messaging service or an instant messenger service, for example. The messaging service 708 sends the message 718 to the recipient's phone number, in the form of a SMS text message, for example. The recipient then uses the passcode or passcode hint and the decryption service 705 to decrypt the encrypted content 711 and obtain the unencrypted content 710. In various embodiments, the decryption service 705 is a native application of the same type that was used to encrypt the original content 710.

Figure 7J:
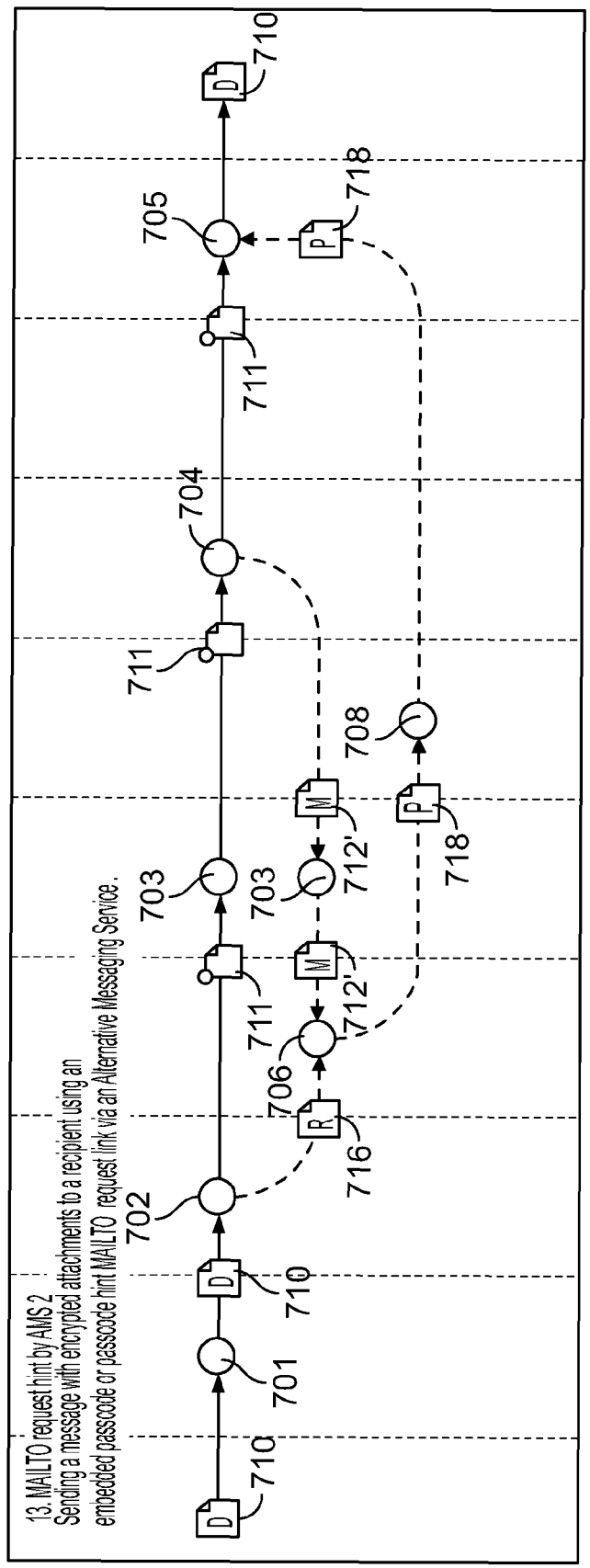
FIG. 7A is a flow diagram illustrating an exemplary process for requesting a passcode or a passcode hint on-demand, in accordance with some embodiments.
FIG. 7B is a flow diagram illustrating another exemplary process for requesting a passcode or a passcode hint on-demand, in accordance with some embodiments.

FIG. 7J is a flow diagram illustrating another exemplary process to request a passcode or a passcode hint on-demand, in accordance with some embodiments. Referring to FIG. 7J, the user prompts his email client application 701 to invoke the document encryption software application 702, of the present specification, that enables encryption of unencrypted content 710 (such as one or more files) to generate encrypted content 711 (such as one or more encrypted files). The encrypted content 711 is attached to an automatically generated standard first email (whose original email body may be optionally encrypted and attached as per steps 135, 145 and 155 of FIG. 1B) that is routed by an SMTP (Simple Mail Transfer Protocol) server 703 to a recipient's email client application 704. In this embodiment, the first email also includes (within the body of the unencrypted email) a URI in the form of, for example, a mailto link such as of the form mailto: service@azstec.com&subject=xxxxxxxx where xxxxxxxx is a unique identifier that is used as a lookup to find the passcode hint. When the recipient clicks the mailto link, in the first email, a second email 712' is automatically generated and sent to a web service 706. The second email 712' includes at least the unique identifier as a subject line or within the body of the second email 712'. The web service 706 automatically parses and interprets information (such as the unique identifier) from the second email 712'. In accordance with an embodiment, the web service 706 maintains a database 716 of passcode hints associated with each unique identifier. In one embodiment, the database 716 is updated and maintained by receiving regular database updates from the user's document encryption software application 702. Thus, in response to the second email 712', the web service 706 generates a message 718, containing the passcode or passcode hint, and forwards it to a messaging service 708. The messaging service, in various embodiments, is an SMS messaging service or an instant messenger service, for example. The messaging service 708 sends the message 718 to the recipient's phone number, in the form of a SMS text message, for example. The recipient then uses the passcode or passcode hint and the decryption service 705 to decrypt the encrypted content 711 and obtain the unencrypted content 710. In various embodiments, the decryption service 705 is a native application of the same type that was used to encrypt the original content 710.

In some embodiments, the encrypted contents 711 in FIGS. 7C through 7J are not sent as attachments to the standard first email. Instead, in such embodiments, the first email includes a separate URI link (such as to a webpage or a Dropbox link) to access the encrypted file(s) as per Step 392 in FIG. 3.

It should be appreciated that the decryption passcode or the hint associated with the decryption passcode may be communicated in any one of the following formats: Plain text, HTML, Proprietary format that is visible only on recipient's authenticated device if recipient's device has the associated proprietary software application, "Captcha" type of text, PDF file, Text file, Word processing file (e.g. MS WORD), Web Page, Picture file, Audio file, SMS Text Message, "Snapchat" type of SMS Text Message (text disappears after a certain duration). Table 1 illustrates a plurality of exemplary formats of communication depending upon a form of communication of the decryption passcode or hint associated with the decryption passcode:

TABLE 1

| Form of communication of decryption passcode or hint associated therewith | Format of communication |
|---|---|
| Within body of an email | Plain text, Rich text, HTML, 'Captcha' ('Completely Automated Public Turing test to tell Computers and Humans Apart') type of text, Proprietary format that is visible only on recipient's authenticated device if recipient's device has an associated proprietary software application |
| As file attachment of an email | HTML file, PDF file, Text file, Word processing file (e.g., MS Word), Webpage, Picture file (e.g., JPEG), Audio file, Proprietary format that is visible only on recipient's authenticated device if recipient's device has an associated proprietary software application |
| As a Uniform Resource Identifier (URI) within an email or SMS | The URI may be associated with a file on a cloud folder (e.g., Dropbox) wherein the file may be any of the following formats: HTML file, PDF file, Text file, Word processing file (e.g., MS Word), Webpage, Picture file (e.g., JPEG), Audio file, Picture file, Proprietary format that is visible only on recipient's authenticated device if recipient's device has an associated proprietary software application The URI may be associated with a webpage |
| As message to a recipient's mobile number | Plain text, Web page, Picture file, Audio file, "Snapchat" type of SMS Text Message, wherein the text disappears after a certain duration |

Referring to FIGS. 4N through 4S, the 'settings' interface 466, in various embodiments, comprises a plurality of additional interface tabs, discussed below.

In an optional embodiment, FIG. 4N shows a general settings tab 469 for setting a plurality of general parameters such as path 469a for a shared passcode folder, path 469b for a shared passcode log folder, path 469c indicating location of a folder to save shared encrypted files, path 469d for a private passcode folder, path 469e for a private passcode log folder, and path 469f indicating location of a folder to save private encrypted files. The user can select radio buttons 469g to enable/disable the functionality of sending a passcode notification automatically via the second email (when functionalities related to buttons 'send via cloud' 453 or 'send via Email' 454 of FIG. 4G are activated) or select radio buttons 469l to enable/disable the functionality of sending a passcode notification 'on demand' or on request by a recipient of the first email (when functionalities related to buttons 'send via cloud' 453 or 'send via Email' 454 of FIG. 4G are activated). Similarly, the user can select radio buttons 469h to enable/disable the functionality of adding a data and time stamp to file names of encrypted files. Clicking the 'save' button 469i stores the settings and clicking the 'close' button 469j allows the user to exit the settings interface 466. The user can 'cancel' saving of the settings by clicking the button 469k.

Figure 4O:
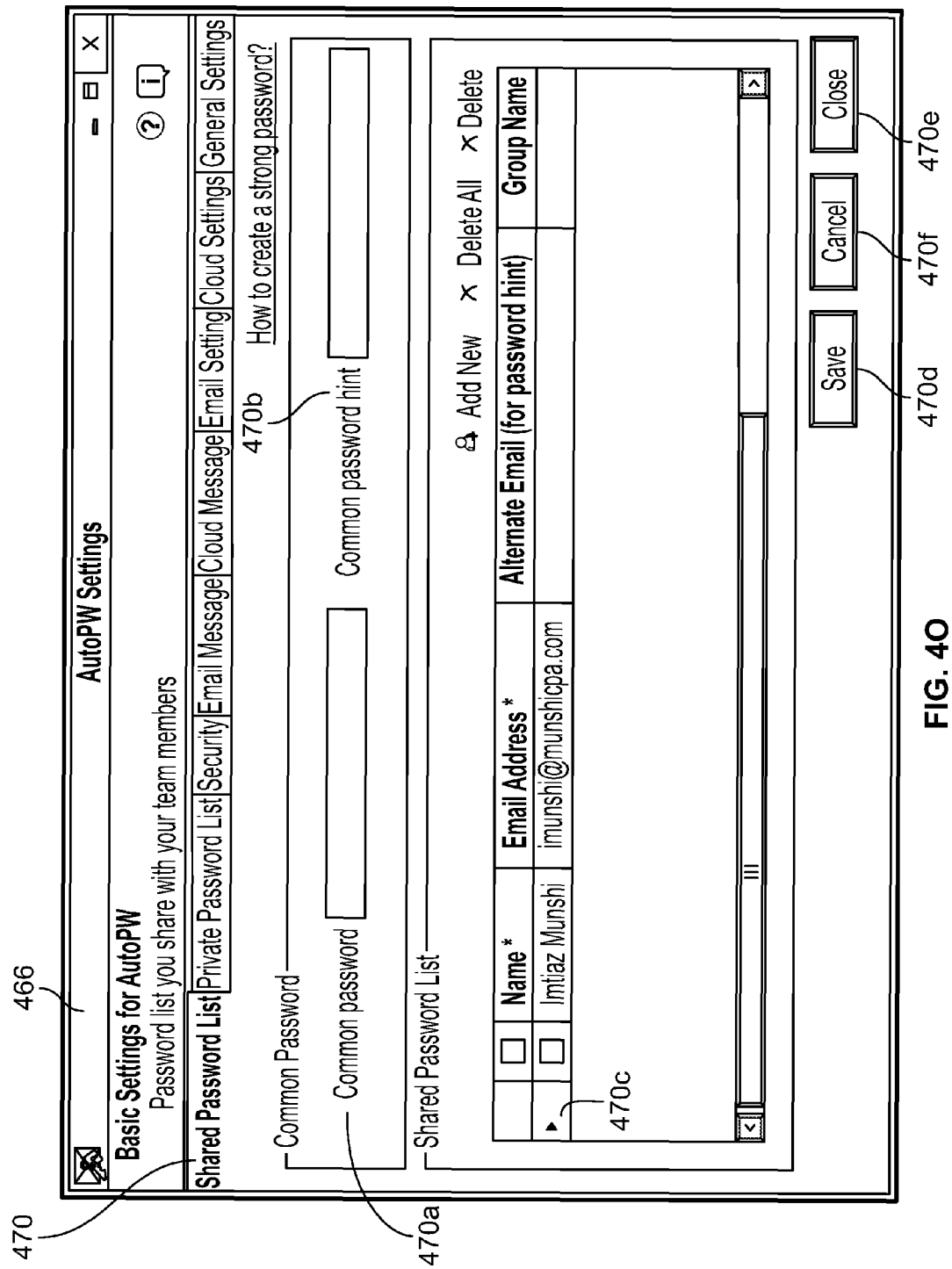
FIG. 4O illustrates an embodiment of an interface for storing a plurality of shared passcodes.

In an optional embodiment, FIG. 4O shows a shared passcode list tab 470 for setting and displaying a plurality of common passcode 470a and common passcode hint 470b combinations, and shared recipient passcode and passcode hint combinations along with recipient's name, primary email address, alternate email address, group name, and mobile telephone number 470c. The plurality of recipient passcode and hint combinations, once saved, are displayed in the list 470c. Clicking the 'save' button 470d stores the settings and clicking the 'close' button 470e allows the user to exit the settings interface 466. The user can 'cancel' saving of the settings by clicking the button 470f.

Figure 4P:
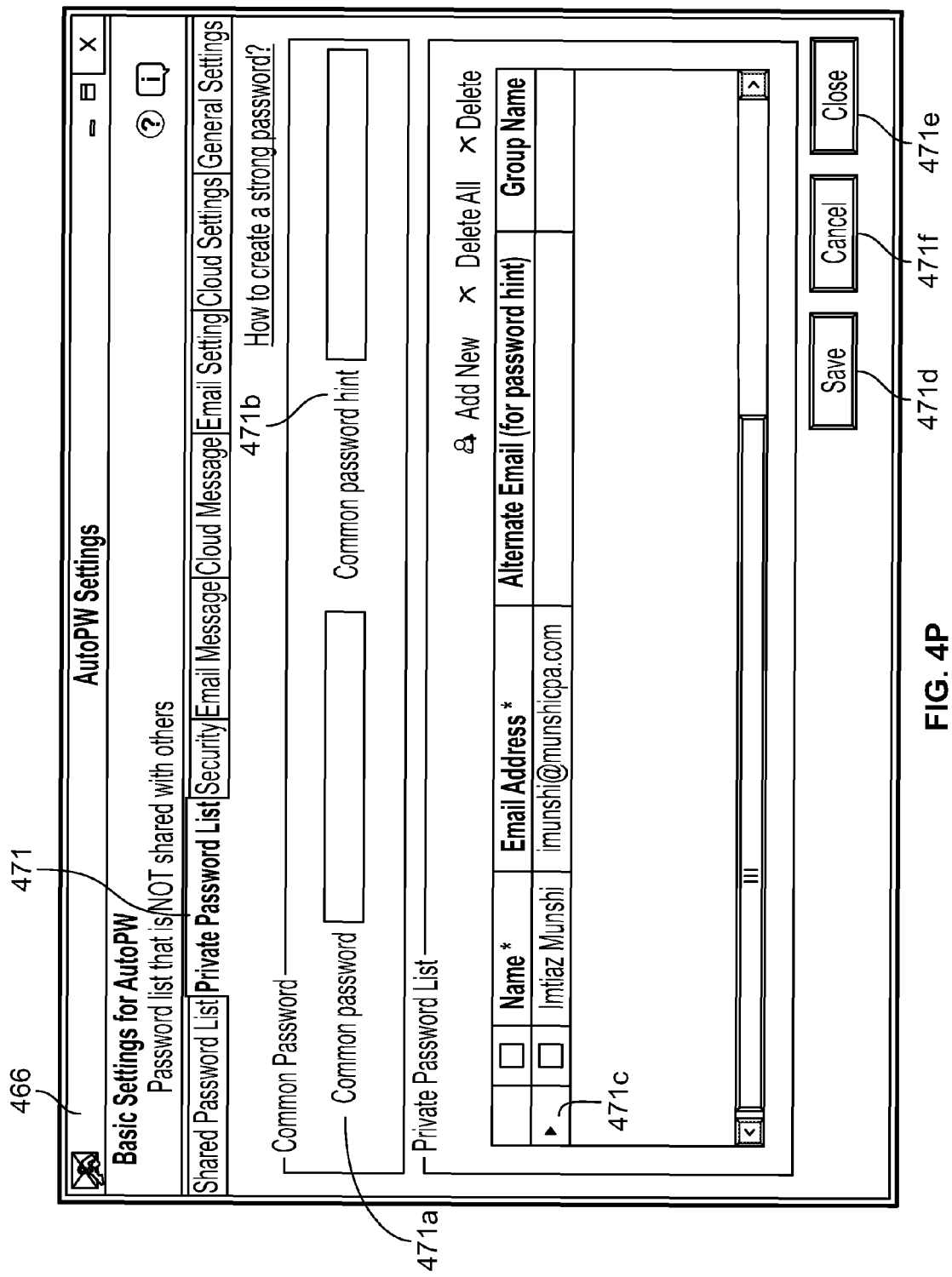
FIG. 4P illustrates an embodiment of an interface for storing a plurality of private passcodes.

In an optional embodiment, FIG. 4P shows a private passcode list tab 471 for setting and displaying a plurality of common passcode 471a and common passcode hint 471b combinations and private recipient passcode and passcode hint combinations along with recipient's name, primary email address, alternate email address, group name, and mobile telephone number 471c. The plurality of passcode and hint combinations, once saved, are displayed in the list 471c. Clicking the 'save' button 471d stores the settings and clicking the 'close' button 471e allows the user to exit the settings interface 466. The user can 'cancel' saving of the settings by clicking the button 471f.

In an optional embodiment, FIG. 4Q shows a security settings tab 472 for allowing an administrator to add/delete a plurality of users 472a (that are allowed access to the document encryption software application) and also assign them rights, such as, the ability to update the shared passcode list 472b and administrative rights 472c. Clicking the 'save' button 472d stores the settings and clicking the 'close' button 472e allows the user to exit the settings interface 466. The user can 'cancel' saving of the settings by clicking the button 472f.

Figure 4R:
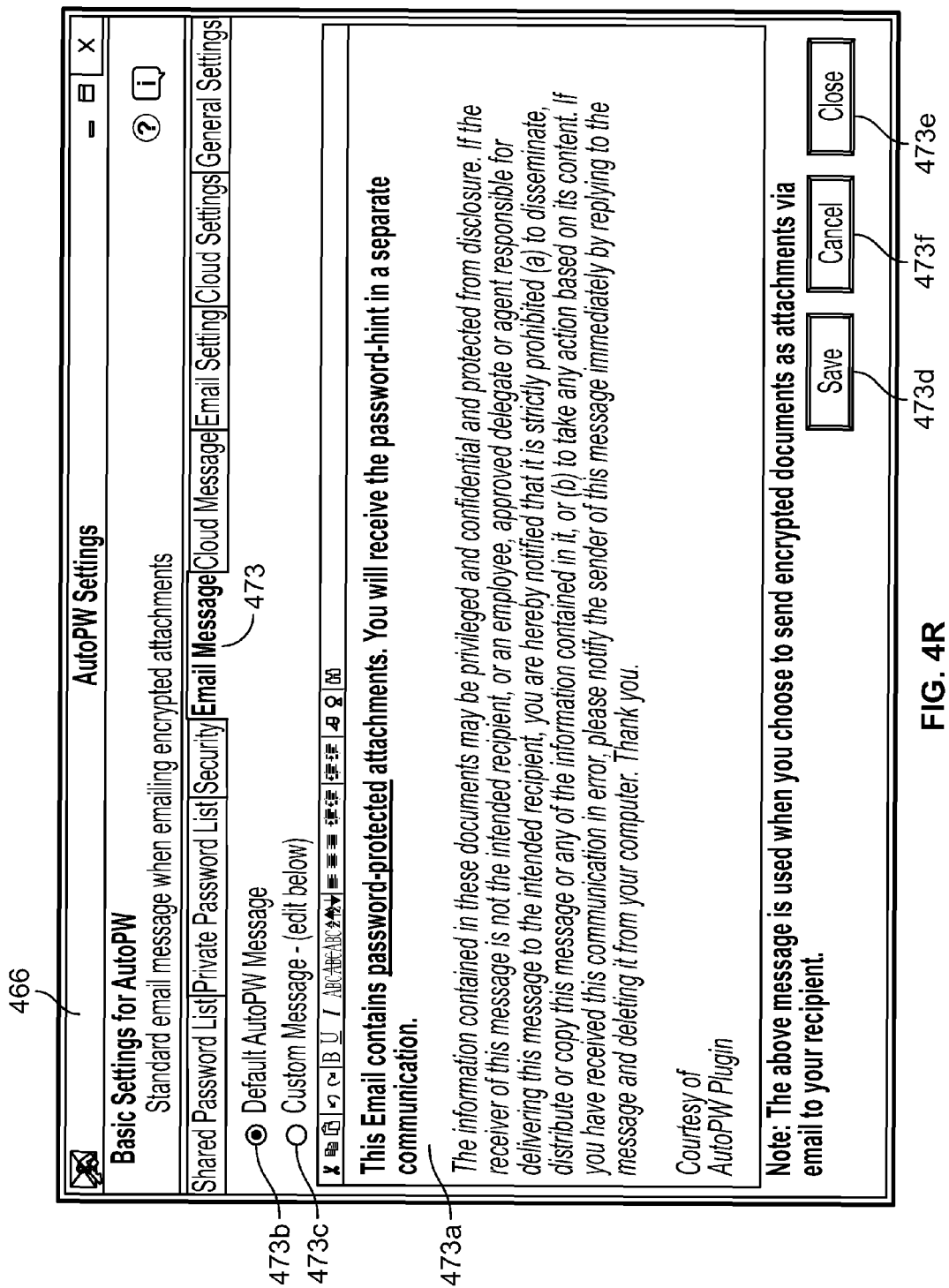
FIG. 4R illustrates an embodiment of an interface for customizing a message of a body of an email that carries at least one encrypted file as attachment(s)

In an optional embodiment, FIG. 4R shows an email message tab 473 for setting a default email message 473a (to be sent when the user chooses the 'send via email' functionality by clicking button 454 of FIG. 4G) by choosing radio button 473b or customizing/editing the email message 473a by choosing the radio button 473c. Clicking the 'save' button 473d stores the settings and clicking the 'close' button 473e allows the user to exit the settings interface 466. The user can 'cancel' saving of the settings by clicking the button 473f.

Figure 4S:
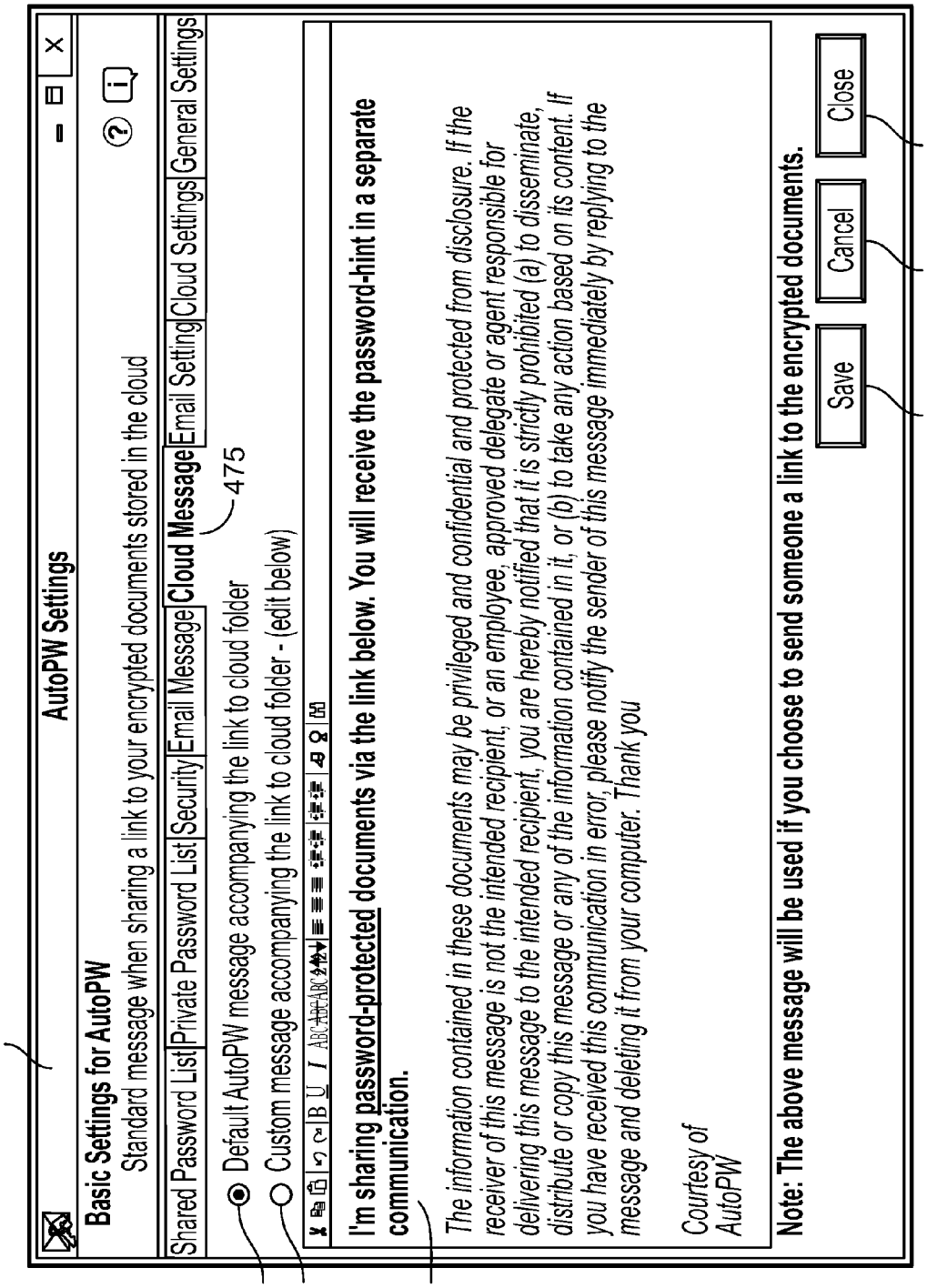
FIG. 4S illustrates an embodiment of an interface for customizing a message of a body of an email that carries at least one uniform resource identifier to at least one encrypted file saved/uploaded to the user's cloud account.

In an optional embodiment, FIG. 4S shows a cloud message tab 475 for setting a default cloud message 475a (to be sent when the user chooses the 'send via Cloud' functionality by clicking button 453 of FIG. 4G) by choosing radio button 475b or customizing/editing the email message 475a by choosing the radio button 475c. Clicking the 'save' button 475d stores the settings and clicking the 'close' button 475e allows the user to exit the settings interface 466. The user can 'cancel' saving of the settings by clicking the button 475f.

Referring back to FIGS. 1A, 1B and 2, in one embodiment, the automatic passcode protection service, invoked by the user's email application (such as Microsoft Outlook® installed on the user's computer), presents an additional option to the user to save the one or more encrypted files to the user's cloud folder, such as the Dropbox folder, on his computer (or a folder associated with any other Internet based file hosting service similar to Dropbox) and auto-send a Uniform Resource Identifier (URI) to the encrypted file(s) in Dropbox via an automatically generated editable standard first email, followed by an automatically generated second email comprising the decryption passcode or hint associated with the decryption passcode. This additional option is implemented in the dialog box 200 of FIG. 2, using a ' Send Via Cloud' button (not shown), for example. Dialog box 200 of FIG. 2 is invoked when the user indicates to his email application, installed on his computer (such as Microsoft Outlook®), a desire to activate the automatic passcode protection service using an icon, button, or other display element integrated into the email program (such as Microsoft Outlook®). It should be noted, that the cloud accessibility information (such as those described earlier with reference to FIG. 4M) is pre-configured by the user in the 'settings' interface 466 (FIG. 4M).

The first email with the URI to the encrypted file(s) (uploaded or synchronized with an Internet based file hosting service) is automatically generated and sent (by the email application). Thereafter, the email application automatically generates a second email with the same subject as in the original/first email but preceded by a passcode notification, wherein the passcode is listed in the text of the email and the email is automatically sent to one or more of the email addresses that were included on the original email (including cc's and bcc's). In one embodiment, the user is prompted to delete any email addresses that the user does not want to notify of the passcode. In one embodiment, the user has the option of pre-designating email recipients who should, and should not, receive the passcode. In one embodiment, a standard paragraph is automatically added explaining that the email attachment is encrypted in accordance with the firm's Privacy Policy, and referring to one or more guidelines, rules, or other standards to which the email complies. In another embodiment, the user is prompted to change any email address (for example if the user wishes to send the passcode notification to an alternate email address belonging to the recipient for added security). In another embodiment, the application automatically selects the alternate email address previously designated and saved by the user in the shared or private recipient passcode list(s) 470c and 471c. In another embodiment, the application automatically generates and sends a text message (not shown) to the mobile telephone number of the recipient(s) of the first email by selecting the mobile number telephone number previously designated and saved by the user in the shared or private recipient passcode list(s) 470c and 471c.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

We claim:

1. A method of encrypting a file and distributing the encrypted file over a network from a user computer to a remote computer, the method comprising:
   providing an interface to a file encryption application to a user for access on the user computer;
   receiving, from the user through said interface to the file encryption application over said network, an input designating an encryption option from among a plurality of encryption options;
   based upon said input designating an encryption option, and based upon a format of said file, causing a separate application specific to said format to encrypt said file, wherein said encrypted file is adapted to be decrypted using a passcode;
   generating a first email, for transmission to a recipient email address, comprising a uniform resource identifier and said encrypted file attached thereto, wherein said uniform resource identifier is configured such that, upon a user of the remote computer activating said uniform resource identifier, said remote computer is adapted to generate a second email requesting an indication of the passcode associated with said encrypted file to be transmitted to a phone number address stored in association with said recipient email address in a memory and wherein said indication of said passcode includes a uniform resource identifier to a passcode file associated with an Internet based file hosting service, wherein the passcode file includes said passcode;
   transmitting the first email with said encrypted file to said recipient email address over said network;
   after a period of time, receiving, from the recipient email address over the network, said second email, wherein the second email is generated as a result of said user of the remote computer activating the uniform resource identifier in the first email; and
   based upon said receipt of said second email, automatically transmitting a message to said phone number address, wherein the message contains said indication of said passcode.

2. The method of claim 1, wherein said interface to a file encryption application is provided to the user by enabling said user to download the file encryption application for installation on the user computer.

3. The method of claim 1, wherein said interface to a file encryption application is provided to the user by enabling said user to access, via the user computer, the file encryption application over the network.

4. The method of claim 3, wherein the file encryption application is invoked by activating a short-cut icon to said file encryption application located on a desktop of the user's computer.

5. The method of claim 1, wherein said separate application specific to said format is stored in a same physical storage device as said file encryption application.

6. The method of claim 1, wherein said separate application specific to said format is stored in a different physical storage device as said file encryption application.

7. The method of claim 1, wherein said file is encrypted by opening said file in the separate application specific to the format of said file and accepting an input from the user, from within the separate application, invoking an encryption of the file.

8. The method of claim 1, wherein the first email is generated using an email application that is hosted by a server separate and remote from the remote user computer.

9. The method of claim 1, wherein the first email is generated using an email application that is stored within, and executed by, the remote user computer.

10. The method of claim 1, wherein the uniform resource identifier is configured to have an expiration time period after which activating the uniform resource identifier will not cause the message with the indication of the passcode to be sent to the phone number address.

11. The method of claim 1, wherein the uniform resource identifier is configured to have no expiration time period and will remain functional to cause the message with the indication of the passcode to be sent to the phone number address for an unlimited time period.

12. The method of claim 1, wherein the uniform resource identifier is configured to have a predefined number of times that it can be used, after which activating the uniform resource identifier will not cause the message with the indication of the passcode to be sent to the phone number address.

13. The method of claim 1, wherein the uniform resource identifier is configured to be forward to a third email address through which activating the uniform resource identifier will still cause the message with the indication of the passcode to be sent to the phone number address.

14. The method of claim 1, wherein the uniform resource identifier is configured to only be useable by the recipient email address and not another email address.

15. The method of claim 1, wherein said file and said separate application are located remote from the user computer and wherein said separate application encrypts said file by opening said file over said network and applying an encryption native to said separate application.

16. The method of claim 1, wherein said file is located remote from the user computer, wherein said separate application is stored local to, and executed by, the user computer, and wherein said separate application encrypts said file by opening said file over said network and applying an encryption native to said separate application.

17. A method of encrypting a file and distributing the encrypted file over a network from a user computer to a remote computer, the method comprising:
   providing an interface to a file encryption application to a user for access on the user computer;
   receiving, from the user through said interface to the file encryption application over said network, an input designating an encryption option from among a plurality of encryption options;
   receiving, from the user through said interface to the file encryption application over said network, an input associating a phone number with a recipient email address and storing said phone number, recipient email address, and association in a memory;
   based upon said input designating an encryption option, and based upon a format of said file, causing a separate application specific to said format to encrypt said file, wherein said encrypted file is adapted to be decrypted using a passcode;
   generating a first email, for transmission to a recipient email address, comprising a uniform resource identifier, wherein said uniform resource identifier is configured such that, upon a user of the remote computer activating said uniform resource identifier, said remote computer is adapted to generate a first message requesting an indication of the passcode associated with said encrypted file to be transmitted to said phone number stored in association with said recipient email address, and wherein said indication of said passcode includes a uniform resource identifier to a passcode file associated with an Internet based file hosting service, wherein the passcode file includes said passcode;

transmitting the first email with said encrypted file to said recipient email address over said network;

after a period of time, receiving, from the remote computer over the network, said first message, wherein the first message is generated as a result of said user of the remote computer activating the uniform resource identifier in the first email; and based upon said receipt of said second email, automatically transmitting a second message to said phone number address, wherein the second message contains said indication of said passcode.

18. A method of encrypting a file and distributing the encrypted file over a network from a user computer to a remote computer, the method comprising:

providing an interface to a file encryption application to a user for access on the user computer;

receiving, from the user through said interface to the file encryption application over said network, an input designating an encryption option from among a plurality of encryption options;

based upon said input designating an encryption option, and based upon a format of said file, causing a separate application specific to said format to encrypt said file, wherein said encrypted file is adapted to be decrypted using a passcode;

generating a first email, for transmission to a recipient email address, comprising a uniform resource identifier, wherein said uniform resource identifier is configured such that, upon a user of the remote computer activating said uniform resource identifier, said remote computer is adapted to generate a first message requesting an indication of the passcode associated with said encrypted file to be transmitted to said recipient email address and wherein said indication of said passcode includes a uniform resource identifier to a passcode file associated with an Internet based file hosting service, wherein the passcode file includes said passcode;

transmitting the first email with said encrypted file to said recipient email address over said network;

after a period of time, receiving, from the remote computer over the network, said first message, wherein the first message is generated as a result of said user of the remote computer activating the uniform resource identifier in the first email; and based upon said receipt of said first message, automatically transmitting a second email to said recipient email address, wherein the second email contains said indication of said passcode.

19. A method of encrypting a file and distributing the encrypted file over a network from a user computer to a remote computer, the method comprising:

providing an interface to a file encryption application to a user for access on the user computer;

receiving, from the user through said interface to the file encryption application over said network, an input designating an encryption option from among a plurality of encryption options;

based upon said input designating an encryption option, and based upon a format of said file, causing a separate application specific to said format to encrypt said file, wherein said encrypted file is adapted to be decrypted using a passcode;

generating a first email, for transmission to a recipient email address, comprising a uniform resource identifier and said encrypted file attached thereto, wherein said uniform resource identifier is configured such that, upon a user of the remote computer activating said uniform resource identifier, said remote computer is adapted to generate a second email requesting an indication of the passcode associated with said encrypted file to be transmitted to a phone number address stored in association with said recipient email address in a memory and wherein said indication of said passcode includes a uniform resource identifier to a webpage that includes said passcode;

transmitting the first email with said encrypted file to said recipient email address over said network;

after a period of time, receiving, from the recipient email address over the network, said second email, wherein the second email is generated as a result of said user of the remote computer activating the uniform resource identifier in the first email; and based upon said receipt of said second email, automatically transmitting a message to said phone number address, wherein the message contains said indication of said passcode.

20. The method of claim 19, wherein said interface to a file encryption application is provided to the user by enabling said user to download the file encryption application for installation on the user computer.

21. The method of claim 19, wherein said interface to a file encryption application is provided to the user by enabling said user to access, via the user computer, the file encryption application over the network.

22. The method of claim 21, wherein the file encryption application is invoked by activating a short-cut icon to said file encryption application located on a desktop of the user's computer.

23. The method of claim 19, wherein said separate application specific to said format is stored in a same physical storage device as said file encryption application.

24. The method of claim 19, wherein said separate application specific to said format is stored in a different physical storage device as said file encryption application.

25. The method of claim 19, wherein said file is encrypted by opening said file in the separate application specific to the format of said file and accepting an input from the user, from within the separate application, invoking an encryption of the file.

26. The method of claim 19, wherein the first email is generated using an email application that is hosted by a server separate and remote from the remote user computer.

27. The method of claim 19, wherein the first email is generated using an email application that is stored within, and executed by, the remote user computer.

28. The method of claim 19, wherein the uniform resource identifier is configured to have an expiration time period after which activating the uniform resource identifier will not cause the message with the indication of the passcode to be sent to the phone number address.

29. The method of claim 19, wherein the uniform resource identifier is configured to have no expiration time period and will remain functional to cause the message with the indication of the passcode to be sent to the phone number address for an unlimited time period.

30. The method of claim 19, wherein the uniform resource identifier is configured to have a predefined number of times that it can be used, after which activating the uniform resource identifier will not cause the message with the indication of the passcode to be sent to the phone number address.

31. The method of claim 19, wherein the uniform resource identifier is configured to be forward to a third email address through which activating the uniform resource identifier will still cause the message with the indication of the passcode to be sent to the phone number address.

32. The method of claim 19, wherein the uniform resource identifier is configured to only be useable by the recipient email address and not another email address.

33. The method of claim 19, wherein said file and said separate application are located remote from the user computer and wherein said separate application encrypts said file by opening said file over said network and applying an encryption native to said separate application.

34. The method of claim 19, wherein said file is located remote from the user computer, wherein said separate application is stored local to, and executed by, the user computer, and wherein said separate application encrypts said file by opening said file over said network and applying an encryption native to said separate application.

35. A method of encrypting a file and distributing the encrypted file over a network from a user computer to a remote computer, the method comprising:
   providing an interface to a file encryption application to a user for access on the user computer;
   receiving, from the user through said interface to the file encryption application over said network, an input designating an encryption option from among a plurality of encryption options;
   based upon said input designating an encryption option, and based upon a format of said file, causing a separate application specific to said format to encrypt said file, wherein said encrypted file is adapted to be decrypted using a passcode;
   generating a first email, for transmission to a recipient email address, comprising a uniform resource identifier and said encrypted file attached thereto, wherein said uniform resource identifier is configured such that, upon a user of the remote computer activating said uniform resource identifier, said remote computer is adapted to generate a second email requesting an indication of the passcode associated with said encrypted file to be transmitted to a phone number address stored in association with said recipient email address in a memory and wherein the uniform resource identifier is configured to have an expiration time period after which activating the uniform resource identifier will not cause the message with the indication of the passcode to be sent to the phone number address;
   transmitting the first email with said encrypted file to said recipient email address over said network;
   after a period of time, receiving, from the recipient email address over the network, said second email, wherein the second email is generated as a result of said user of the remote computer activating the uniform resource identifier in the first email; and
   based upon said receipt of said second email, automatically transmitting a message to said phone number address, wherein the message contains said indication of said passcode.

36. The method of claim 35, wherein said interface to a file encryption application is provided to the user by enabling said user to download the file encryption application for installation on the user computer.

37. The method of claim 35, wherein said interface to a file encryption application is provided to the user by enabling said user to access, via the user computer, the file encryption application over the network.

38. The method of claim 37, wherein the file encryption application is invoked by activating a short-cut icon to said file encryption application located on a desktop of the user's computer.

39. The method of claim 35, wherein said separate application specific to said format is stored in a same physical storage device as said file encryption application.

40. The method of claim 35, wherein said separate application specific to said format is stored in a different physical storage device as said file encryption application.

41. The method of claim 35, wherein said file is encrypted by opening said file in the separate application specific to the format of said file and accepting an input from the user, from within the separate application, invoking an encryption of the file.

42. The method of claim 35, wherein the first email is generated using an email application that is hosted by a server separate and remote from the remote user computer.

43. The method of claim 35, wherein the first email is generated using an email application that is stored within, and executed by, the remote user computer.

44. The method of claim 35, wherein the uniform resource identifier is configured to have a predefined number of times that it can be used within said expiration time period.

45. The method of claim 35, wherein the uniform resource identifier is configured to be forward to a third email address through which activating the uniform resource identifier will still cause the message with the indication of the passcode to be sent to the phone number address.

46. The method of claim 35, wherein the uniform resource identifier is configured to only be useable by the recipient email address and not another email address.

47. The method of claim 35, wherein said indication of said passcode includes a uniform resource identifier to a passcode file associated with an Internet based file hosting service, wherein the passcode file includes said passcode or a hint associated with said passcode.

48. The method of claim 35, wherein said indication of said passcode includes a uniform resource identifier to a webpage that includes said passcode or a hint associated with said passcode.

49. The method of claim 35, wherein said file and said separate application are located remote from the user computer and wherein said separate application encrypts said file by opening said file over said network and applying an encryption native to said separate application.

50. The method of claim 35, wherein said file is located remote from the user computer, wherein said separate application is stored local to, and executed by, the user computer, and wherein said separate application encrypts said file by opening said file over said network and applying an encryption native to said separate application.

51. A method of encrypting a file and distributing the encrypted file over a network from a user computer to a remote computer, the method comprising:
   providing an interface to a file encryption application to a user for access on the user computer;

receiving, from the user through said interface to the file encryption application over said network, an input designating an encryption option from among a plurality of encryption options;

based upon said input designating an encryption option, and based upon a format of said file, causing a separate application specific to said format to encrypt said file, wherein said encrypted file is adapted to be decrypted using a passcode;

generating a first email, for transmission to a recipient email address, comprising a uniform resource identifier and said encrypted file attached thereto, wherein said uniform resource identifier is configured such that, upon a user of the remote computer activating said uniform resource identifier, said remote computer is adapted to generate a second email requesting an indication of the passcode associated with said encrypted file to be transmitted to a phone number address stored in association with said recipient email address in a memory and wherein the uniform resource identifier is configured to have a predefined number of times that it can be used, after which activating the uniform resource identifier will not cause the message with the indication of the passcode to be sent to the phone number address;

transmitting the first email with said encrypted file to said recipient email address over said network;

after a period of time, receiving, from the recipient email address over the network, said second email, wherein the second email is generated as a result of said user of the remote computer activating the uniform resource identifier in the first email; and based upon said receipt of said second email, automatically transmitting a message to said phone number address, wherein the message contains said indication of said passcode.

52. The method of claim 51, wherein said interface to a file encryption application is provided to the user by enabling said user to download the file encryption application for installation on the user computer.

53. The method of claim 51, wherein said interface to a file encryption application is provided to the user by enabling said user to access, via the user computer, the file encryption application over the network.

54. The method of claim 53, wherein the file encryption application is invoked by activating a short-cut icon to said file encryption application located on a desktop of the user's computer.

55. The method of claim 51, wherein said separate application specific to said format is stored in a same physical storage device as said file encryption application.

56. The method of claim 51, wherein said separate application specific to said format is stored in a different physical storage device as said file encryption application.

57. The method of claim 51, wherein said file is encrypted by opening said file in the separate application specific to the format of said file and accepting an input from the user, from within the separate application, invoking an encryption of the file.

58. The method of claim 51, wherein the first email is generated using an email application that is hosted by a server separate and remote from the remote user computer.

59. The method of claim 51, wherein the first email is generated using an email application that is stored within, and executed by, the remote user computer.

60. The method of claim 51, wherein the uniform resource identifier is configured to have an expiration time period for said predefined number of times it can be used.

61. The method of claim 51, wherein the uniform resource identifier is configured to have no expiration time period for said predefined number of times it can be used.

62. The method of claim 51, wherein the uniform resource identifier is configured to be forward to a third email address through which activating the uniform resource identifier will still cause the message with the indication of the passcode to be sent to the phone number address.

63. The method of claim 51, wherein the uniform resource identifier is configured to only be useable by the recipient email address and not another email address.

64. The method of claim 51 wherein said indication of said passcode includes a uniform resource identifier to a passcode file associated with an Internet based file hosting service, wherein the passcode file includes said passcode or a hint associated with said passcode.

65. The method of claim 51 wherein said indication of said passcode includes a uniform resource identifier to a webpage that includes said passcode or a hint associated with said passcode.

66. The method of claim 51, wherein said file and said separate application are located remote from the user computer and wherein said separate application encrypts said file by opening said file over said network and applying an encryption native to said separate application.

67. The method of claim 51, wherein said file is located remote from the user computer, wherein said separate application is stored local to, and executed by, the user computer, and wherein said separate application encrypts said file by opening said file over said network and applying an encryption native to said separate application.

* * * * *